United States Patent [19]
Funamizu et al.

[11] Patent Number: 5,867,279
[45] Date of Patent: Feb. 2, 1999

[54] COPYING MACHINE ADAPTED TO COPY IMAGES OF TWO OR MORE ORIGINALS ON A SINGLE SHEET OF PAPER

[75] Inventors: Yoshihiro Funamizu, Soka; Takashi Sugiura, Komae; Satoru Kutsuwada, Kawasaki, all of Japan

[73] Assignee: Canon Kabushiki Kaisha, Tokyo, Japan

[21] Appl. No.: 9,267

[22] Filed: Jan. 20, 1998

Related U.S. Application Data

[63] Continuation of Ser. No. 207,420, Mar. 8, 1994, abandoned.

[30] Foreign Application Priority Data

Mar. 9, 1993 [JP] Japan ................................. 5-047949
Feb. 28, 1994 [JP] Japan ................................. 6-030366

[51] Int. Cl.$^6$ ............................... H04N 1/00; H04N 1/46
[52] U.S. Cl. .......................... 358/296; 358/406; 358/504; 382/296
[58] Field of Search ..................... 358/296, 401, 358/406, 448, 451, 501, 504, 530, 537, 540; 382/216, 294, 296, 297, 298, 319

[56] References Cited

U.S. PATENT DOCUMENTS

| | | |
|---|---|---|
| 4,342,052 | 7/1982 | Rackley et al. .................. 358/450 |
| 5,051,843 | 9/1991 | Hayashi .................. 358/450 |
| 5,146,343 | 9/1992 | Fujii .................. 358/296 |
| 5,239,388 | 8/1993 | Matsumoto .................. 358/448 |
| 5,253,081 | 10/1993 | Shoji et al. .................. 358/450 |
| 5,289,570 | 2/1994 | Suzuki .................. 358/450 X |
| 5,357,348 | 10/1994 | Moro .................. 358/450 |
| 5,450,213 | 9/1995 | Kobori et al. .................. 358/450 |
| 5,461,459 | 10/1995 | Muramatsu et al. .................. 358/448 X |
| 5,475,475 | 12/1995 | Kohtani et al. .................. 358/296 X |

Primary Examiner—Edward H. Tso
Assistant Examiner—Gregory J. Toatley
Attorney, Agent, or Firm—Fitzpatrick, Cella, Harper & Scinto

[57] ABSTRACT

A copying machine includes an original feeding unit for feeding an original to a platen, a reading unit for reading an image of the original fed by the original feeding unit, a reducing unit for reducing the image supplied from the reading unit, a storing unit for storing a plurality of images supplied from the reducing unit in a predetermined area, an input unit for entering information regarding an orientation of the images of the original, a control unit for use in changing the area where the image is to be stored by the storing unit depending on the information regarding the orientation supplied from the input unit, and a recording unit for recording a plurality of images stored in the storing unit on a single sheet.

36 Claims, 44 Drawing Sheets

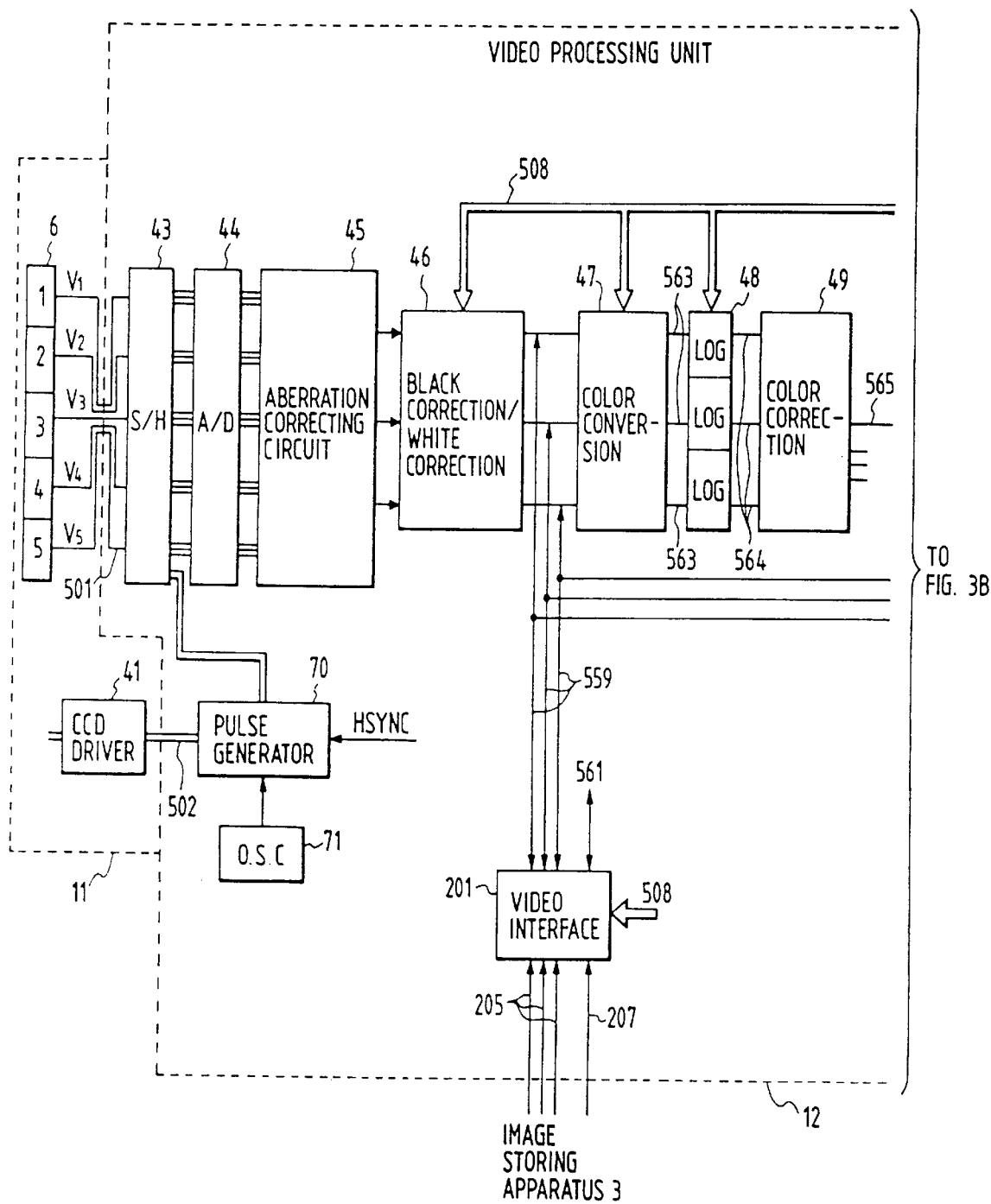

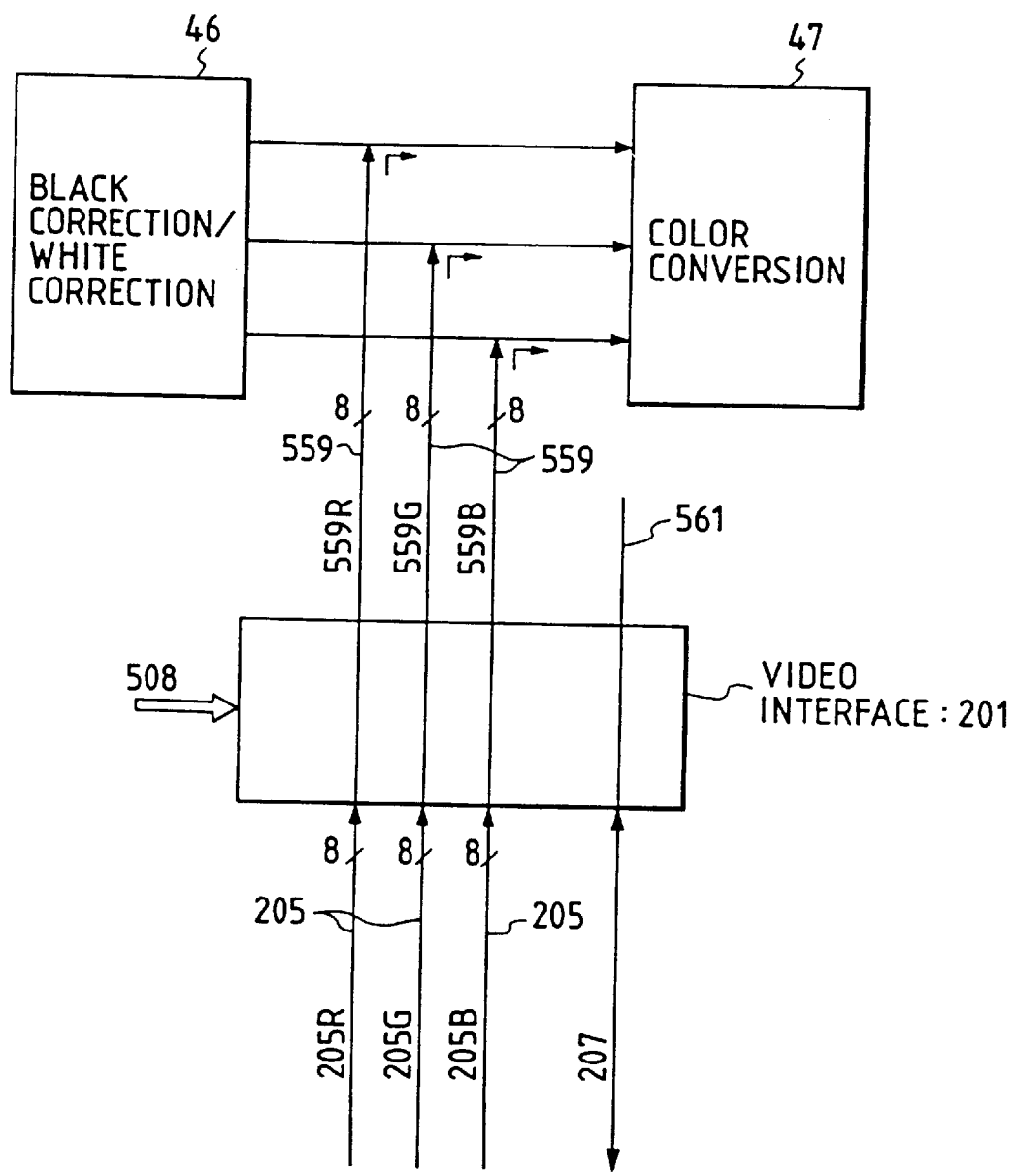

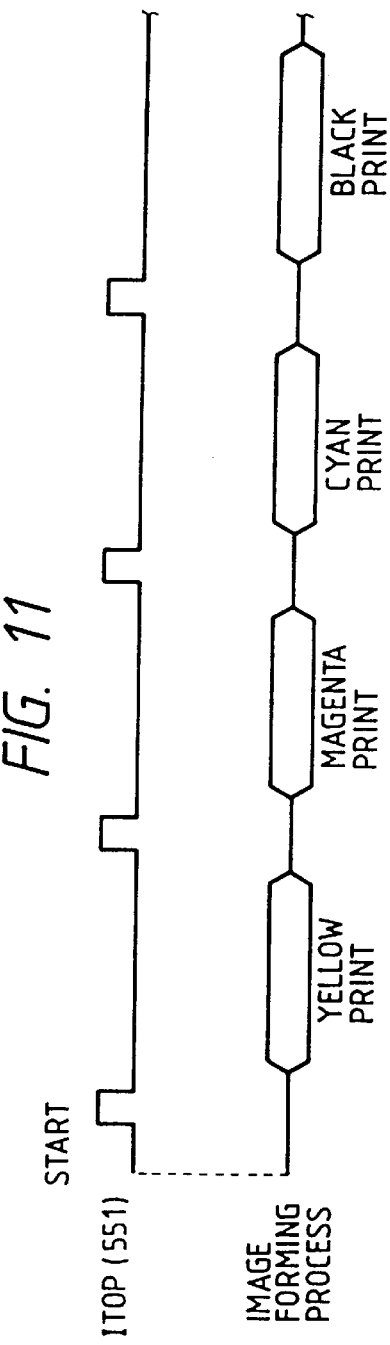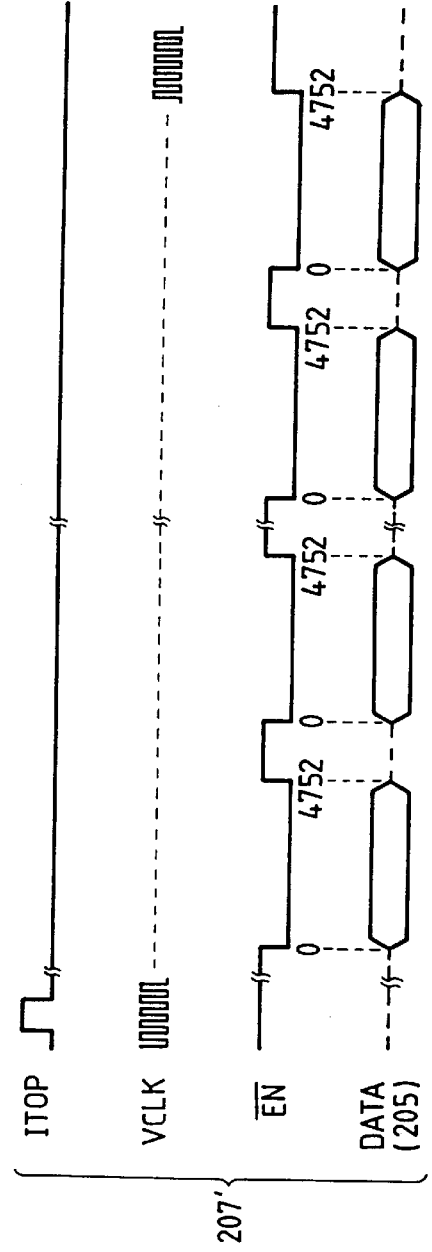

| FIG. 14A | FIG. 14B |

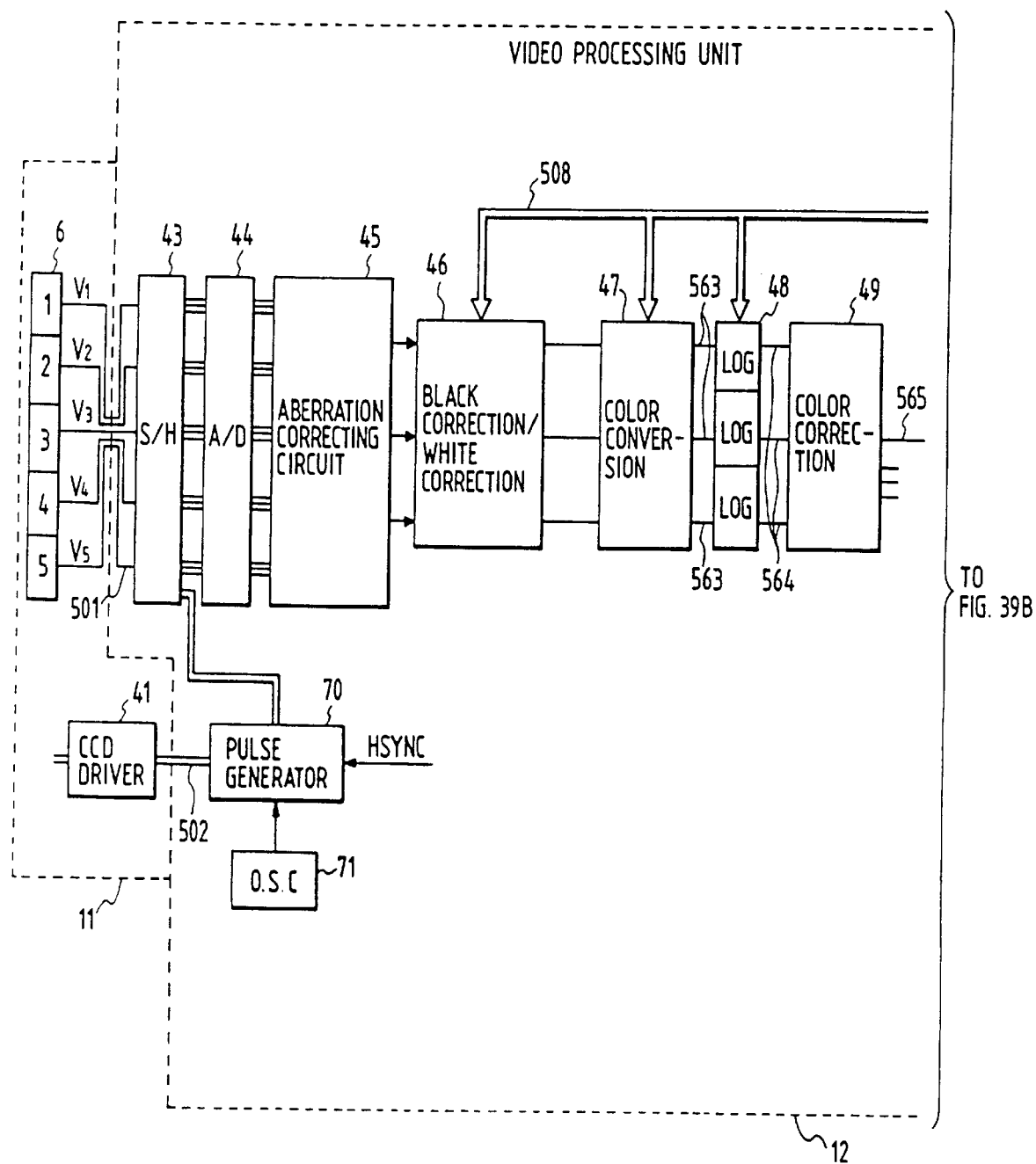

FIG. 44A

```
PLEASE SELECT ORIGINAL SIZE                    ⌐3138
  ► A5      B5      STMT
    A5R     B5R     STMTR
    A4      B4      LTR
    A4R             LTRR
    A3              LGL
                    LTR
```

```
PLEASE SELECT TYPE OF LAYOUT
  ► 2in1    4in1    8in1    9in1

PLEASE INPUT ORIGINAL SHEET NUMBER
    AUTO          · · SHEETS
```

```
PLEASE SELECT PAPER
    ► A4
      A3
```

FIG. 50
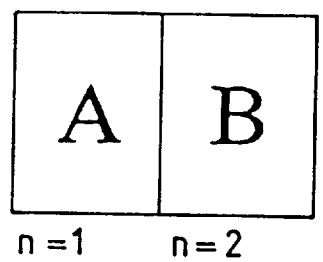
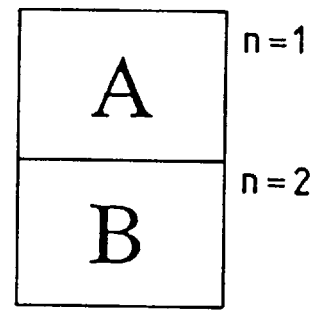
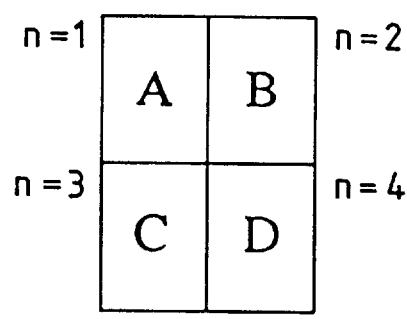
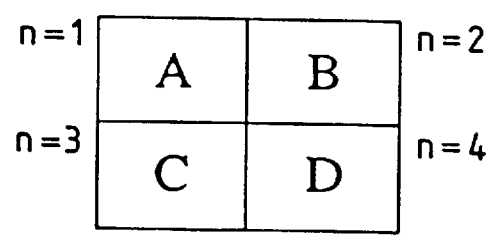

COPYING MACHINE ADAPTED TO COPY IMAGES OF TWO OR MORE ORIGINALS ON A SINGLE SHEET OF PAPER

This application is a continuation of Ser. No. 08/207,420 filed on Mar. 8, 1994, now abandoned.

BACKGROUND OF THE INVENTION

1. Field of the Invention

This invention relates to a copying machine adapted to copy images of two or more originals on a single sheet of paper.

2. Related Background Art

Conventionally, digital copying machines have been known that are capable of laying out images of two or more originals of a same size in an image memory to print them on a single sheet of paper.

The above mentioned conventional copying machines, however, unable to lay out images of the two or more originals that are different in size from each other in the image memory for printing.

In addition, orientation of the original may be portrait as shown in FIG. 51A or landscape as shown in FIG. 51B. To print the images of such originals on a single sheet of paper, the orientation of the original images becomes improper when a layout of the images in FIG. 51A is used for the images shown in FIG. 51B.

SUMMARY OF THE INVENTION

Accordingly, an object of the present invention is to provide a copying machine capable of overcoming the above mentioned problem.

Another object of the present invention is to provide a copying machine that is so structured as to lay out automatically in an image memory images of two or more originals of different sizes.

Yet another object of the present invention is to provide a copying machine directed to control the order of arrangement of originals by means of changing position of the originals depending on the orientation thereof.

These and other objects and features of the present invention will become more fully apparent from the following description and appended claims taken in conjunction with the accompanying drawing.

BRIEF DESCRIPTION OF THE DRAWINGS

FIG. 5 is a view for use in describing functions of a video interface according to this embodiment;

FIG. 11 is a timing chart during printing operation performed by the image copying machine according to this embodiment;

FIG. 12 is a timing chart during image storage in this embodiment;

FIGS. 44A to 44C are flow charts on a screen for setting a reduced layout mode;

FIG. 50 is a view for use in describing a position where an original is arranged during the reduced layout.

DETAILED DESCRIPTION OF THE PREFERRED EMBODIMENTS

A preferred embodiment of the present invention is now described in detail with reference to the accompanying drawings.

Figure 1:
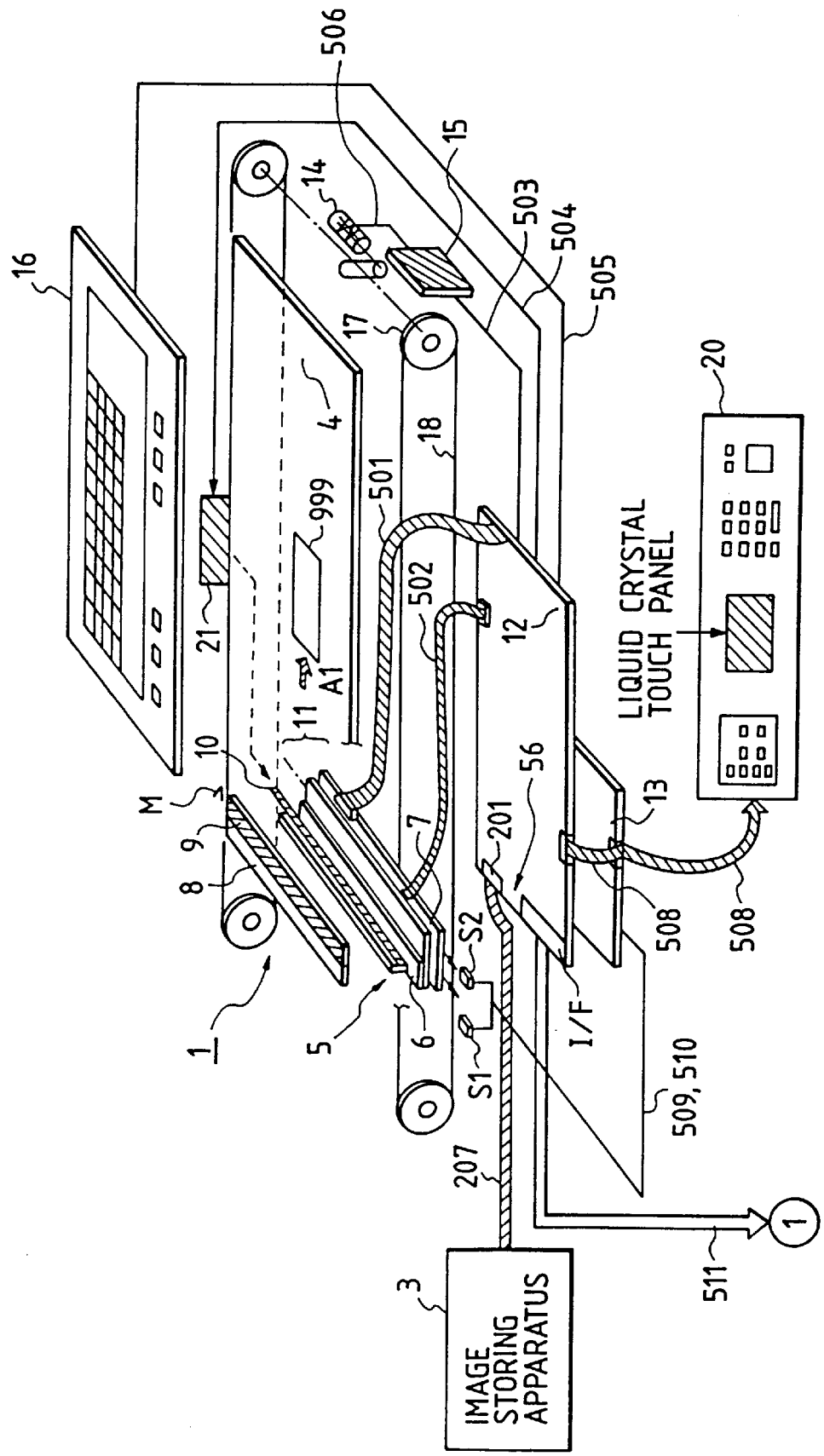
FIG. 1 is a view showing schematically an exemplified internal structure of an image copying machine according to one embodiment of the present invention.
Figure 2:
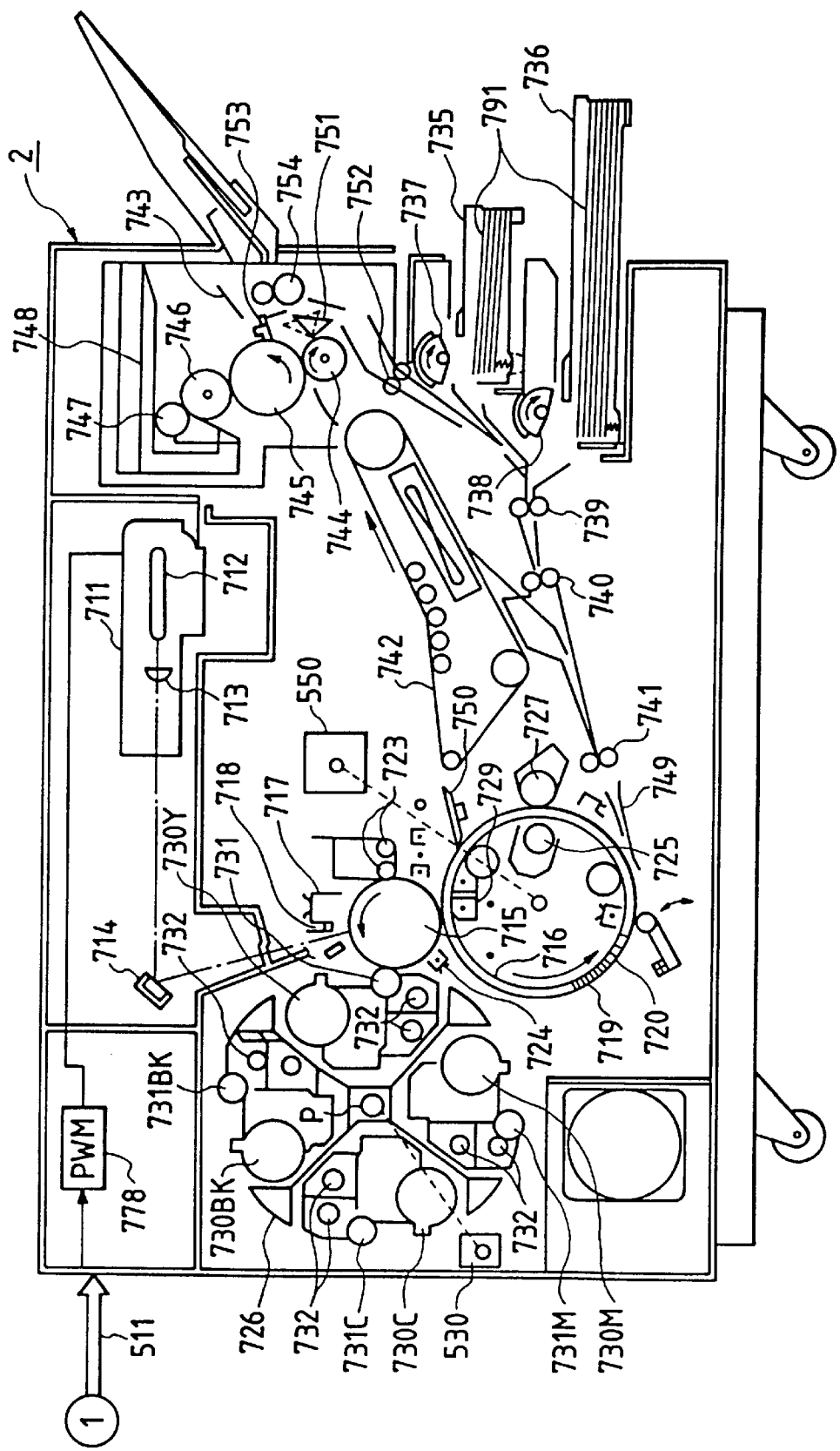
FIG. 2 is a view showing schematically an exemplified internal structure of an image copying machine according to one embodiment of the present invention.

FIGS. 1 and 2 are views showing schematically exemplified internal structures of an image copying machine according to one embodiment of the present invention. As fundamental components of an image copying machine shown in the figures, there are provided with a digital color image reader (hereinafter, referred to as a "color reader") 1 disposed at an upper portion thereof for use in reading digital color images; a digital color image printer (hereinafter, referred to as a "color printer") 2 disposed at a lower portion of the same copying machine for producing and printing digital color images; and an image storing apparatus 3.

The color reader 1 of this machine is a device for use in reading color image information for each color on an original to be read to convert it into an electrical digital image signal by means of color separating means described later and an photoelectric converting element formed of, for example, a charged-coupled-device (CCD). The color printer 2 is a laser beam printer employing an electronic photographic technique in which the color images are restricted for each color depending on the digital image signal to be produced, thereby transferring and recording on a sheet material of a recording medium, i.e., a recorded paper as a digital dot format in a plurality of times.

The image storing apparatus 3 is a device for storing the digital image information read by the color reader 1.

Details are described on each component. <Description of the Color Reader 1>

In the color reader 1 shown in FIG. 1, a reference numeral 999 represents an original. A reference numeral 4 represents a platen glass on which the original is mounted, a reference numeral 5 represents a rod array lens for use in collecting reflected light images from the original exposed to and scanned by a halogen exposure lamp 10 to image-input into a full-color sensor 6 of an equal-magnification type. A combination of the rod array lens 5, the full-color sensor 6 of the equal-magnification type, an amplifying circuit 7 for a sensor output signal and the halogen exposure lamp 10 serves as an original scanning unit 11 to expose and scan the original 999 in a direction depicted by an arrow (A1 in the figure).

Image information to be read from the original 999 is successively read by one line by means of exposing and scanning the original scanning unit 11. Color separation image signals being read are amplified by the amplifying circuit 7 into a predetermined voltage and applied through a signal line 501 to a video processing unit 12 where they are processed. The signal line 501 is formed of a coaxial cable to ensure a complete transmission of signals.

A signal line 502 is a signal line for use in supplying driving pulses for the full-color sensor 6 of the equal-magnification type. Necessary driving pulses are all generated in the video processing unit 12. Reference numerals 8 and 9 represent a white plate and a black plate, respectively, for use in white level correction and in black level correction on the image signals. Signal levels in predetermined densities can be obtained by means of illuminating the plates with the halogen exposure lamp 10 and thus they are used for white level correction and black level correction on video signals.

A reference numeral 12 represents the video processing unit described later while a reference numeral 13 represents a control unit controlling the entire color reader 1 forming the machine according to this embodiment that has a microcomputer. The control unit 13 carries out, through a bus 508, display in an operation panel 20, control of key input and control of the video processing unit 12. In addition, the control unit 13 detects a position of the original scanning unit 11 through signal lines 509 and 510 by using position sensors S1 and S2.

A control signal for controlling a stepping motor 14 is supplied through a signal line 503 to a stepping motor driving circuit 15. The stepping motor driving circuit 15 produces through a signal line 506 a pulse signal for use in pulse-driving the stepping motor 14. Rotation driving of the stepping motor 14 is transmitted to a pulley 17 and, in turn, transmitted to the original scanning unit 11 through a wire 18 to scan the original 999. An ON/OFF control and light control on the halogen exposure lamp 10 is carried out by an exposure lamp driver 21 through a signal line 504 to carry out, through a signal line 505, all controls for the color reader 1 such as control on a digitizer and a display unit.

A reference numeral 20 represents the operation panel of the color reader unit 1, which comprises a liquid crystal display panel serving also as a touch panel and keys for use in entering various commands. In addition, during exposing and scanning an original, the color image signal read by the above mentioned original scanning unit 11 is supplied to the video processing unit 12 through the amplifying circuit 7 and the signal line 501.

Next, details of the above mentioned original scanning unit 11 and the video processing unit 12 are described.

Figure 3B:
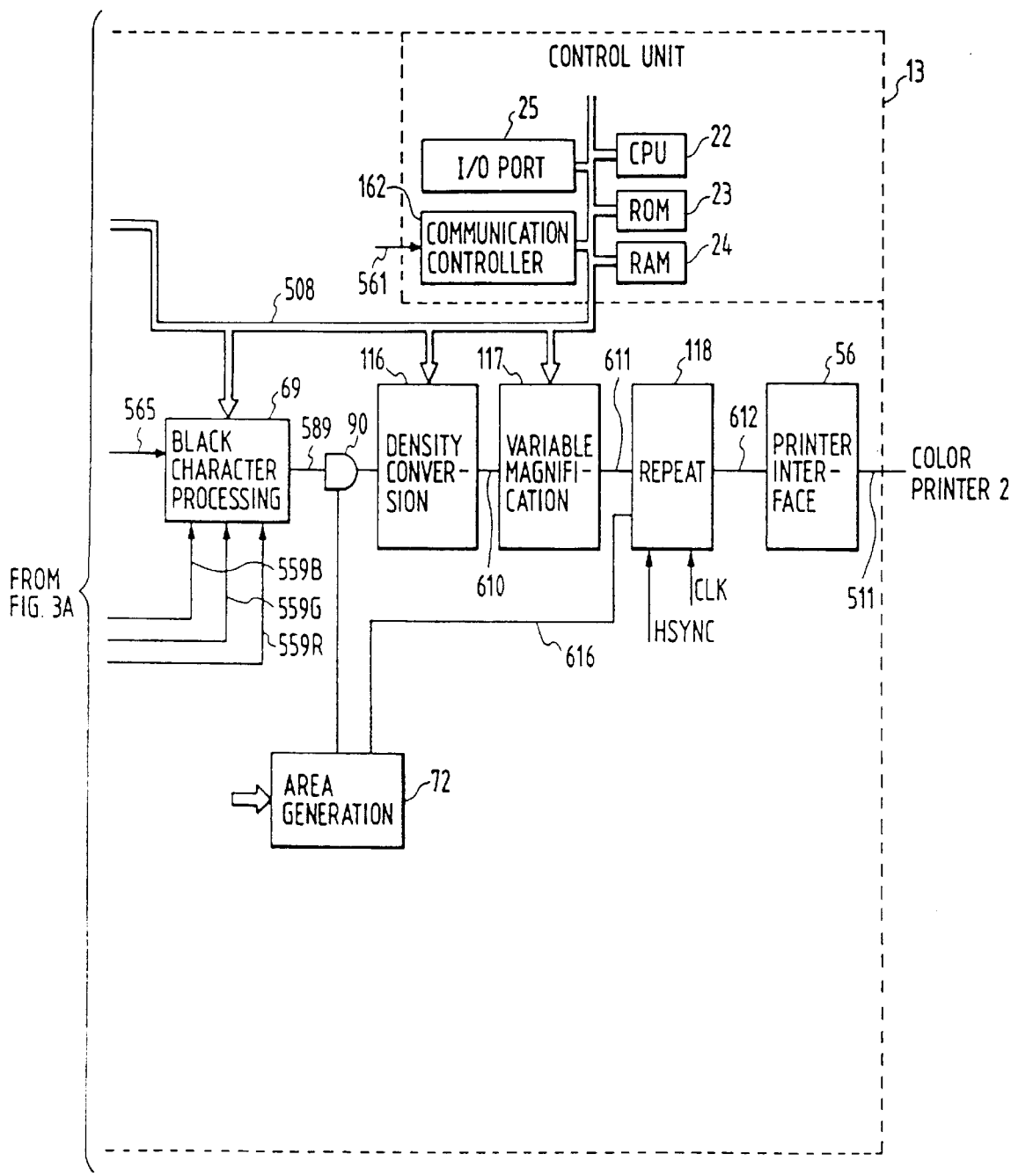
FIG. 3, comprised of FIGS. 3A and 3B, is a block diagram showing internal structures of an original scanning unit and a video processing unit in the image copying machine according to this embodiment.

FIGS. 3A and 3B are block diagrams showing inner structures of the original scanning unit and the video processing unit of the image copying machine according to this embodiment. In this figure, a reference numeral 71 represents a crystal oscillator (O.S.C) for oscillating reference pulses. A reference numeral 70 represents a pulse generator for generating predetermined pulses and supplies them to a CCD driver 41 and a sample and hold circuit (S/H) 43 described later in response to the reference pulses supplied from the O.S.C 71 and a horizontal synchronous signal. A reference numeral 41 represents the CCD driver for driving the full-color sensor 6 of the equal-magnification type. The CCD driver drives the sensor in response to the pulses supplied from the pulse generator 70. In the control unit 13, a CPU 22 therein executes programs in a ROM 23 storing control programs on a RAM 24 used as a work area. A reference numeral 25 represents an I/O port for input and output of data into and from outside.

The color image signal supplied to the video controlling unit 12 is separated by the sample and hold circuit (S/H) 43 into three colors, G (green), B (blue) and R (red). Each color image signal obtained as a result of separation is subjected to analog-to-digital conversion by an A/D converter 44 as a digital color image signal.

In this embodiment, the full-color sensor 6 of the equal-magnification type in the original scanning unit 11 is formed as a lattice partitioned into five divisions as shown in FIGS. 3A and 3B. The full-color sensor 6 of the equal-magnification type and an aberration correcting circuit 45 are used for correct any aberration in reading position between 2 and 4 channels previously scanned and remaining 1, 3 and 5 channels. A position aberration corrected signal supplied from the aberration correcting circuit 45 is supplied to a black correction/white correction circuit 46, in which it is subjected to correction on unevenness on dark of the full-color sensor 6 of the equal-magnification type, unevenness of light amount of the halogen exposure lamp 10, and distribution of sensitivity of the sensors by using the signal associated with the reflected light from the above mentioned white plate 8 and the black plate 9. The color image data in proportion to incident light amount to the full-color sensor 6 of the equal-magnification types is supplied to a video interface 201. The video interface 201 is connected to the image storing apparatus 3.

Figure 4:
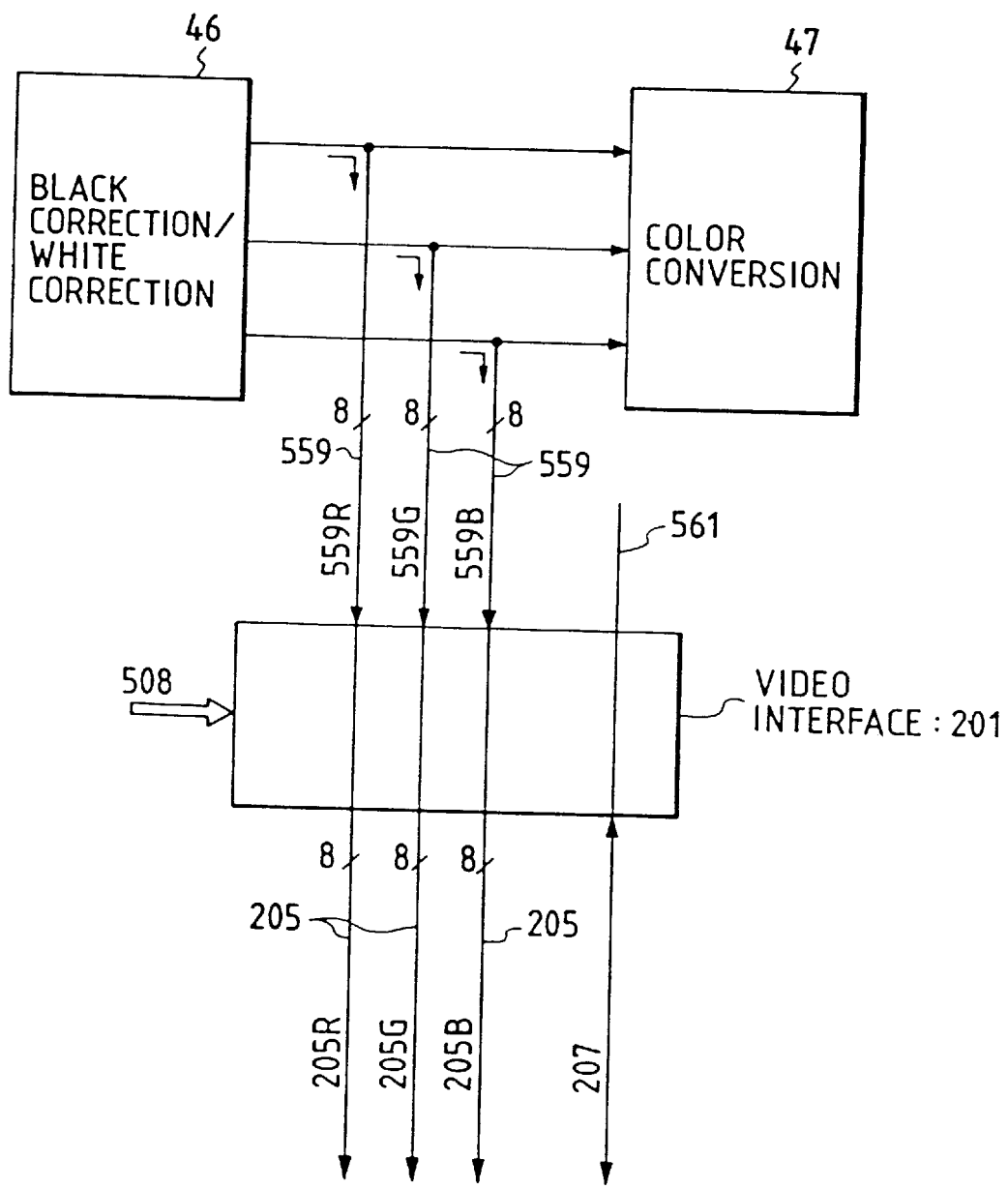
FIG. 4 is a view for use in describing functions of a video interface according to this embodiment.

FIGS. 4 and 5 are views for use in describing functions of the video interface 201. More specifically:

(1) a function of supplying a signal 559 from the black correction/white correction circuit 46 to the image storing apparatus 3 (FIG. 4);

(2) a function of supplying the signal 559 from the image storing apparatus 3 to a color conversion circuit 47 (FIG. 5); and (3) connection a communication line 561 between a control line 207 (lines for HSYNC, VSYNC, image enable EN and so on) between the image storing apparatus 3 and the color reader 1 and CPU. In particular, the CPU communication line 561 is connected to a communication controller 162 in the control unit 13 to transmit and receive various commands and area information.

Choice on the above mentioned three functions is switched as shown in FIGS. 4 and 5 through a CPU control line 508.

In this way, the video interface 201 has three functions, allowing transmission and reception in both directions on signal lines 205 and 207 thereof. Such structure permits two-way transmission, reducing the number of signal lines and thinning each cable. This reduces a total cost for the machine.

In FIGS. 3A and 3B, the image signal 559 from the black correction/white correction circuit 46 is supplied to the color conversion circuit 47. Operation and function of the color conversion circuit 47 will be described later.

An output signal 563 from the color conversion circuit 47 is supplied to a logarithmic conversion circuit (hereinafter, referred to as "LOG") 48 to process for making it proper to relative luminosity of human eyes. In this circuit, the signal is converted such that white=00H and black=FFH (H represents hexadecimal numbers) are achieved. In addition, data supplied for each of B, G and R corresponds to a density value of the output image and also corresponds to toner amounts of yellow, magenta and cyan relative to the B (blue), G (green) and R (red) signals, respectively. Accordingly, the subsequent color image data are associated with Y, M and C.

The color conversion circuit 47 is a circuit for use in detecting a specific color from the color image data R, G and B being supplied and in replacing it to another color. For example, it is for use in achieving a function of converting red portions in the original into blue or any other colors.

The image data from LOG 48 is supplied to a color correction circuit 49 through a signal line 564. The color correction circuit 49 carries out following color correction on yellow, magenta and cyan components.

FIGS. 6A, 6B, 7A and 7B are views for use in describing a method of color correction achieved by the machine according to the embodiment.

Figure 6A:
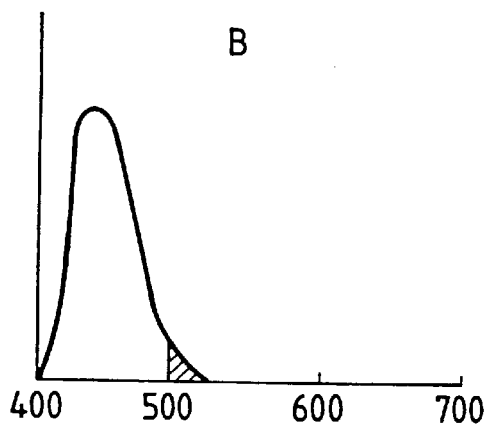
FIGS. 6A and 6B are views for use in describing a method of color correction achieved by the machine according to this embodiment.
Figure 7A:
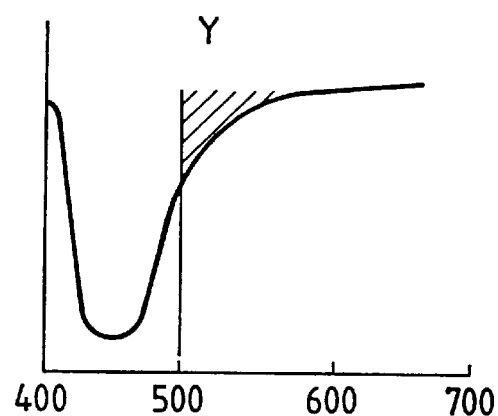
FIGS. 7A and 7B are views for use in describing a method of color correction achieved by the machine according to this embodiment.
Figure 6B:
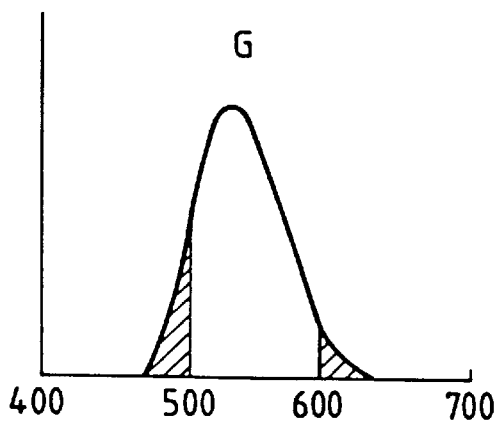
Figure 7B:
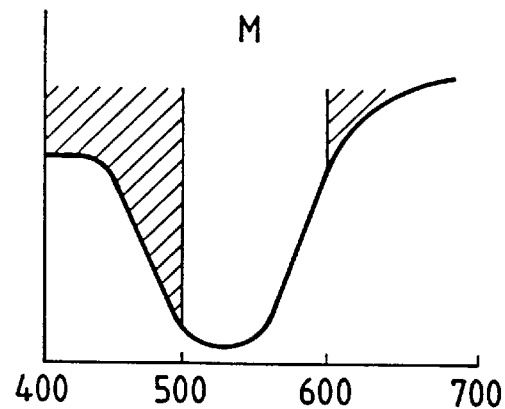

Spectral characteristics of color separation filters provided for one pixel on the color reading sensor have unnecessary transmission areas as depicted by hatched portions in FIGS. 6A and 6B. On the other hand, color toners (Y, M, C) transferred to a transfer paper are also known to have unnecessary absorbance components as shown in FIGS. 7A and 7B. In FIGS. 6A, 6B, 7A and 7B, illustrated are B, G and Y, M.

With this respect, for respective color component image data Yi, Mi and Ci, a masking correction for color correction is well known where a linear expression for each color is calculated as follows:

$$\begin{bmatrix} Y_0 \\ M_0 \\ C_0 \end{bmatrix} = \begin{bmatrix} aY1 & -bM1 & -Cc1 \\ -aY2 & bM2 & -Cc2 \\ -aY3 & -bM3 & -Cc3 \end{bmatrix} \begin{bmatrix} Yi \\ Mi \\ Ci \end{bmatrix} \quad (1)$$

In addition, Min (Yi, Mi, Ci) (the minimum value of Yi, Mi, Ci) is calculated according to Yi, Mi and Ci, with which as a black an undercolor removal (UCR) to reduce the amount of color materials to be added depending on a black component as well as addition of black toner later.

Next, a black character processing circuit 69 is described that improves a black character, a black expression, and color bleeding at or along edges of the black character or a black thin line on an original.

Figure 8:
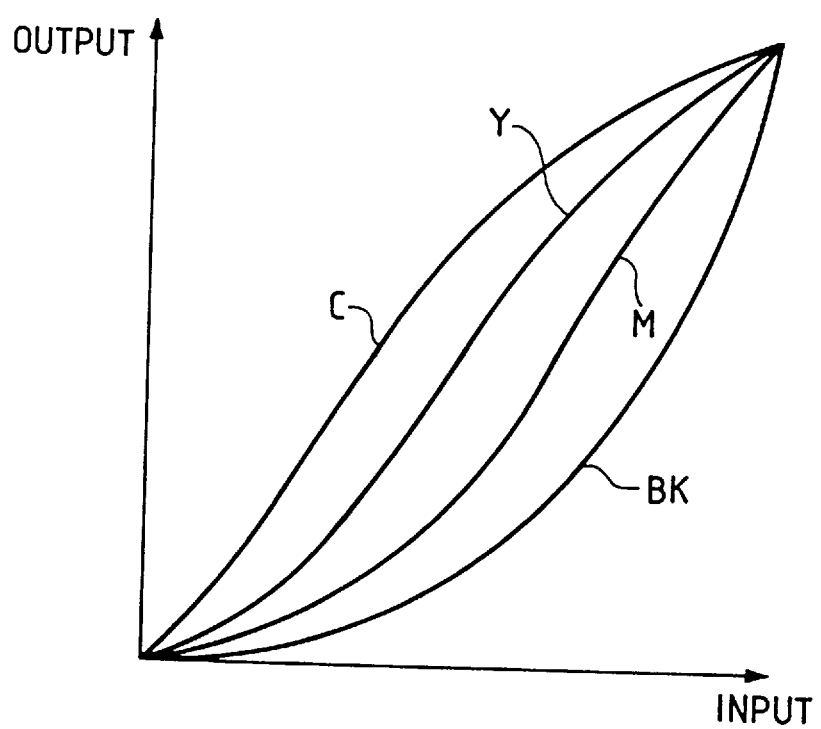
FIG. 8 is a view showing input and output characteristic curves of Y, M, C and Bk in the image copying machine according to this embodiment.

FIG. 8 is a view showing input and output characteristic curves of Y, M, C and Bk in the image copying machine according to this embodiment.

Color signals 559R, 559G and 559B for the respective colors R, G and B (red, green and blue) are subjected to masking and undercolor removal by the LOG 48 and the color correction circuit 49 after being subjected to the black level and white level correction by the black correction/white correction circuit 46 shown in FIGS. 3A and 3B. The color signal(s) to be supplied to the printer is/are selected and the selected color signal(s) is/are supplied to a signal line 565. Simultaneously, a luminosity signal Y and chrominance signals I and Q are calculated to detect from the signals R, G and B colorless portions of the original of edges, i.e., of the black character or the black thin line.

By using these Y, I and Q signals, black portions are represented as the thicker black with the amount of black toner increased for the black edges while the amount of Y, M and C toners reduced for the same portions. The signal 598 from the black character processing circuit 69 is supplied to an AND circuit 90. The AND circuit 90 serves as a switch to select whether the input signal 589 is transmitted to a density conversion circuit 116 in a subsequent stage. The AND circuit 90 is controlled by an area generation circuit 72.

The density conversion circuit 116 (FIGS. 3A and 3B) is adapted to vary the density and gradation for each color as shown in the characteristic curves in FIG. 8 and is formed of, for example, a look-up table (LUT). An output signal 610 from the density conversion circuit 116 is supplied to a variable magnification circuit 117. The variable magnification circuit 117 has a memory for one line to carry out variable magnification by means of varying writing and reading frequencies to the memory. As a result, the variable magnification is achieved in a main scanning direction. Variable magnification in a sub scanning direction may be performed by means of varying speed of scanning the original depending on a variable magnification rate.

An output signal 611 from the variable magnification circuit 117 is supplied to a repeat circuit 118 in a subsequent stage. This circuit is formed of FIFO as shown in FIG. 9.

Figure 9:
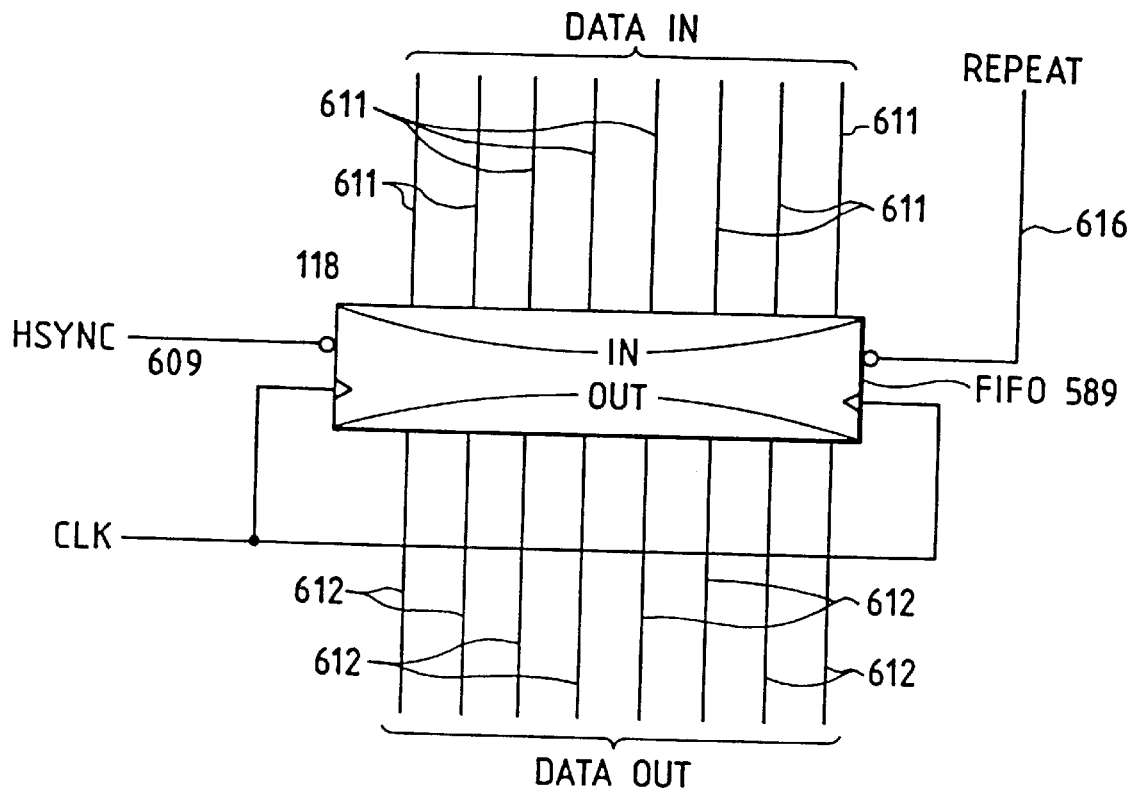
FIG. 9 is a block diagram showing a detailed structure of a repeat circuit according to this embodiment.
Figure 10:
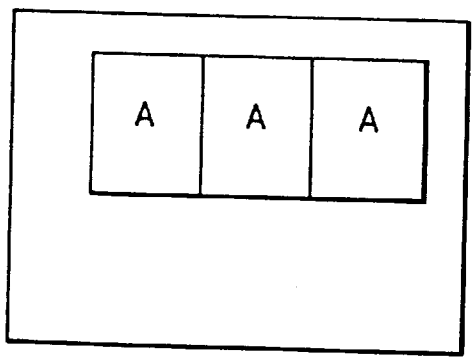
FIG. 10 is a view showing an exemplified output of the repeat circuit according to this embodiment.

FIG. 9 is a block diagram showing a detailed structure of the repeat circuit 118 while FIG. 10 is a view showing an exemplified output of the repeat circuit 118.

In FIG. 9, a reference numeral 609 represents a HSYNC signal. A single pulse of $L_0$ is supplied as a line synchronous signal by every line to initialize a WR (write) pointer (not shown) in the FIFO. A reference numeral 611 represents an input image data while a reference numeral 612 represents an output image data. A repeat signal 616 is a signal for initializing a RD (read) pointer of the FIFO. More specifically, the repeat signal 616 formed as the same one for each line is supplied to the FIFO, thereby repetition of the same image as shown in FIG. 10 can be achieved.

The image information processed by the video processing unit 12 is supplied through a printer interface 56 to the color printer 2.

<Description of the Color Printer 2>

Next, structure of the color printer 2 is described.

In the structure of the color printer 2 shown in FIG. 2, a reference numeral 711 represents a laser scanner. The laser scanner 711 comprises a laser output unit for converting an image signal supplied from the color reader 1 (FIG. 1) into a photo signal; a polygon mirror 712 that reflects a laser beam being emitted; a motor (not shown) to rotate the polygon mirror 712; and an f/θ lens (focusing lens) 713. A reference numeral 714 represents a reflection mirror for use in changing an optical path of the laser beam emitted by the scanner 711 depicted by a broken dot line in the figure. A reference numeral 715 represents a photosensitive drum.

The laser beam emitted by the laser output unit 711 is reflected from the polygon mirror 712 and scans linearly (raster scan) on a surface of the photosensitive drum 715 through the f/θ lens 713 and the reflection mirror 714 to form a latent image corresponding to the original image.

A reference numeral 717 represents a primary charger. A reference numeral 718 represents a full face exposure lamp and a reference numeral 723 represents a cleaner unit for recovering remaining toner not being transferred. A reference numeral 724 represents a pre-transfer charger. These components are arranged around the photosensitive drum 715. A reference numeral 726 represents a developer unit for developing an electrostatic latent image formed on the surface of the photosensitive drum 715 through the laser exposure. Reference numerals 731Y (for yellow), 731M (for magenta), 731C (for cyan) and 731Bk (for black) are development sleeves that contact with the photosensitive drum 715 to develop directly. Reference numerals 731Y, 731M, 731C and 731Bk are toner hoppers for holding supplemental toner and a reference numeral 732 represents a screw for use in carrying developing agents. The developer unit 726 is formed of these sleeves 731Y through 731Bk, the toner hoppers 730Y through and the screw 732. These members are arranged about a rotation axis P of the developer unit 726.

For example, to form a yellow toner image, the developer unit 726 performs yellow toner development at a position shown in FIG. 2. To form a magenta toner image, the developer unit 726 is rotated by a motor 530 about the axis P in the figure to move the development sleeve 731M within the magenta developer to such a position that contacts with the photosensitive drum 715. The developer unit 726 is also rotated about the axis P in the figure for development of cyan and black.

A reference numeral 716 represents an image transferring drum for transferring the toner images formed on the photosensitive drum 715 to a paper 791. A reference numeral 719 represents an actuator plate for use in detecting a moved position of the image transferring drum 716. A reference numeral 720 represents a position sensor that detects movement of the image transferring drum 716 to a home position by means of closing to the actuator plate 719. A reference numeral 725 represents an image transfer drum cleaner while a reference numeral 727 represents a paper press roller. Reference numerals 728 and 729 represent electric remover and a transfer charger, which are arranged around the image transferring roller 716.

Reference numerals 735 and 736 represent paper feeding cassettes for holding the paper 791 (paper sheets). Reference numerals 737 and 738 represent paper feeding rollers for feeding papers from the cassettes 735 and 736. Reference numerals 739, 740 and 741 are timing rollers for taking a timing of paper feeding and carriage. The paper fed and carried through them is introduced into a paper guide 749, of which end is rolled up to the image transferring drum 716 while being hold by a grimmer described later to proceed to an image formation process.

A reference numeral 550 represents a drum rotating motor to rotate synchronously the photosensitive drum 715 and the image transferring drum 716. A reference numeral 750 represents a stripping claw for use in removing the paper from the image transferring drum 716. A reference numeral 742 represents a conveyer belt for conveying the removed paper. A reference numeral 743 represents an image fixing unit for fixing images on the paper conveyed by the conveyer belt 742. In the image fixing unit 743, a rotation force of a motor 747 mounted on a motor mounting unit 748 is transmitted to a pair of thermal pressure rollers 744 and 745 through a transmission gear 746 to fix the images on the paper conveyed between the thermal pressure rollers 744 and 745.

The fixed paper is discharged to the outside of the machine by a paper discharge roller 754 when one-side copying is required. On the other hand, when perfect copying is required, a paper discharge flapper 715 comes into a condition depicted by a dotted line in the figure after the paper passes through a paper discharge sensor 753. The paper is carried to a perfect path 752 by means of inverting rotation of the paper discharge roller 754. The paper is then conveyed to the timing rollers 739, 740 and 741 and held again by the image transferring drum for image formation.

Accordingly, described is a printing out operation involved in the color printer 2 having the above mentioned structure.

FIG. 11 is a timing chart during printing in the image copying machine according to the embodiment. In the figure, ITOP (551) represents a synchronous signal in an image feeding direction (sub scanning direction) generated four times in total; once for feeding one screen, i.e., once for feeding the image of one color of the four colors (yellow, magenta, cyan and black). This synchronizes with the rotation of the image transferring drum 716 and the photosensitive drum 715 such that the image at the end of the original matches with the position when a paper end of the transfer paper rolled up around the image transferring drum 716 of the color printer 2 is subjected to transference of the toner images at a junction to the photosensitive drum 715. The synchronous signal is supplied to the video processing unit 12 through a cable which is not shown.

More specifically, a Y latent image having the yellow component is formed on the photosensitive drum 715 by the laser beam at the first ITOP, which is developed by the developing unit 731Y. Subsequently, the latent image is transferred to the paper on the image transferring drum 716 to perform a yellow printing operation. Then, the development unit 726 rotates about the axis P in FIG. 2.

Next, at the ITOP 551, a M latent image having the magenta component is formed on the photosensitive drum 715 by the laser beam. A magenta printing operation is performed in the same manner as described above. This operation is repeated for C and Bk in correspondence with the subsequent ITOPs 551 to perform cyan and black printing operations.

When the image formation process is completed in this way, the stripping claw 750 removes the paper from the drum. The removed paper is fixed in the image fixing unit 743. This completes a sequence of color image printing.

<Description of the Image Storing Apparatus>

Described in detail are a method of storing from the color reader 1 to the image storing apparatus 3 forming the image copying machine according to this embodiment, and operation of reading the image information out of the image storing apparatus, processing it and forming images by using the color printer 2.

First, image storing operation from the color reader 1 is described.

Figure 13:
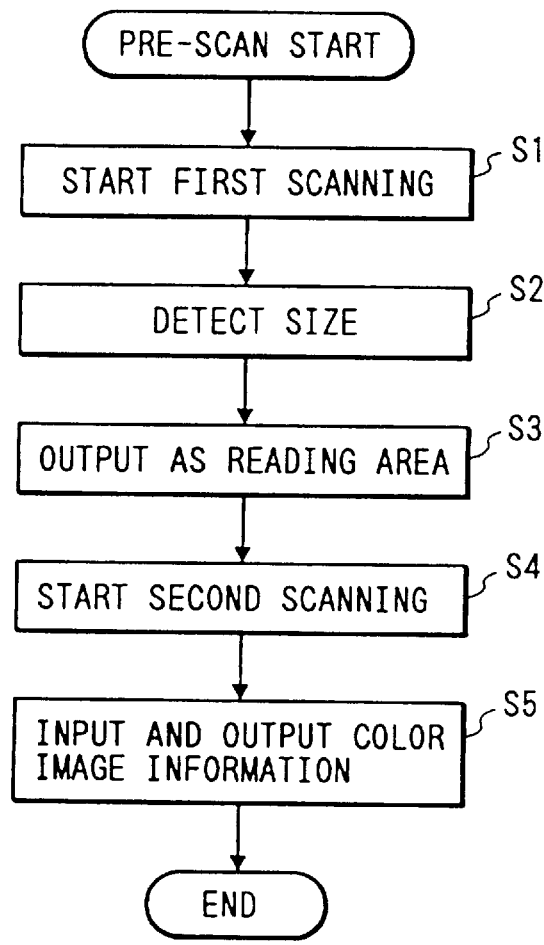
FIG. 13 is a flow chart for use in describing a reading operation carried out by a CPU 22 in the image copying machine according to this embodiment.

FIG. 12 is a timing chart during image storage in this embodiment while FIG. 13 is a flow chart for use in describing reading operation performed by the CPU 22 in the image copying machine according to this embodiment.

An area read by the color reader 1 is set by means of pre-scanning the original 999 through the original scanning unit 11 shown in FIG. 1. More specifically, the original 999 is scanned by the original scanning unit 11 (step S1) in FIG. 13 to sense the size of the original by the CPU 22 in the control unit 13 (step S2).

The size of the original, i.e., information regarding to the read area is supplied to the video interface 201 through a communication line 501 in FIG. 1. The input read area information supplied to the video interface 201 is supplied to the image storing apparatus 3 through the signal line 207 (step S3).

The color reader 1 supplies a VCLK signal, the ITOP, an EN signal shown in the timing chart in FIG. 12 together with an image data 205 through the signal line 207 to the image storing apparatus 3. Data flow in the video interface 201 is shown in FIG. 4.

As shown in FIG. 12, the stepping motor 14 is driven in response to depression of a start button in the operation unit 20. The original scanning unit 11 starts scanning (step S4). When the scanning reaches an end of the original, the ITOP signal becomes a logic "1" and the original scanning unit 11 reaches the area designated by the print scan. The EN signal becomes a logic "0" during scanning of this area. Accordingly, read color image information (DATA 205) is read during the EN signal indicates "0".

As shown in FIG. 12, during image data transmission from the color reader 1, with control signals of the ITOP and the EN signal as well as the VCLK being supplied from the video interface 201 as a signal 207' by means of controlling the video interface 201 as shown in FIG. 4, an R data 205R, a G data 205G and a B data 205B are supplied to the image storing apparatus 3 in a real time manner in synchronism with the signal 207' (step S5).

Next, a specific storing operation is described more in detail that is carried out by the image storing apparatus 3 in response to these image data and the control signals.

Figures 14, 14A:
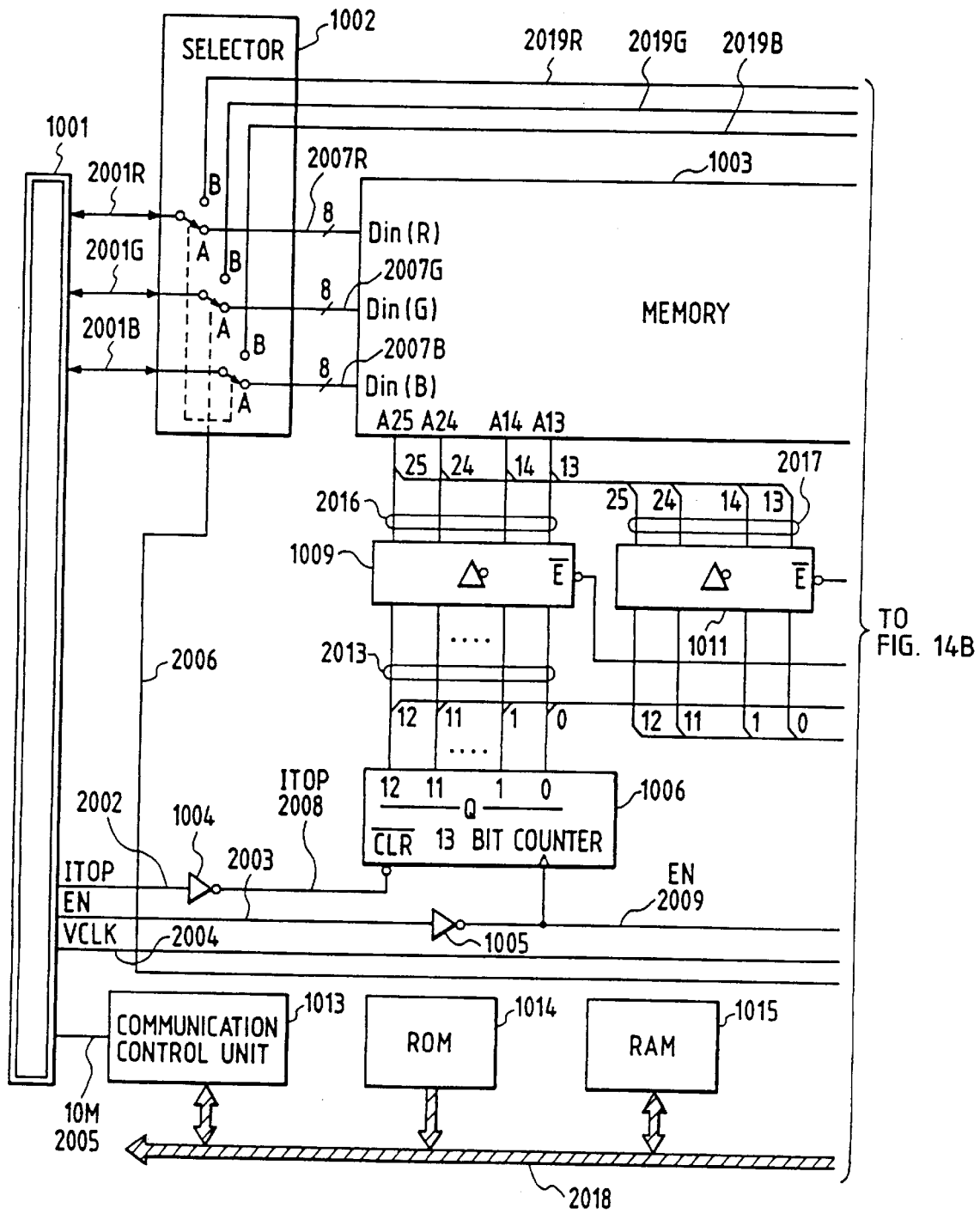
FIG. 14, comprised of FIGS. 14A and 14B, is a detailed circuit diagram showing structure of an image storing apparatus 3 in the image copying machine according to this embodiment.
Figure 14B:
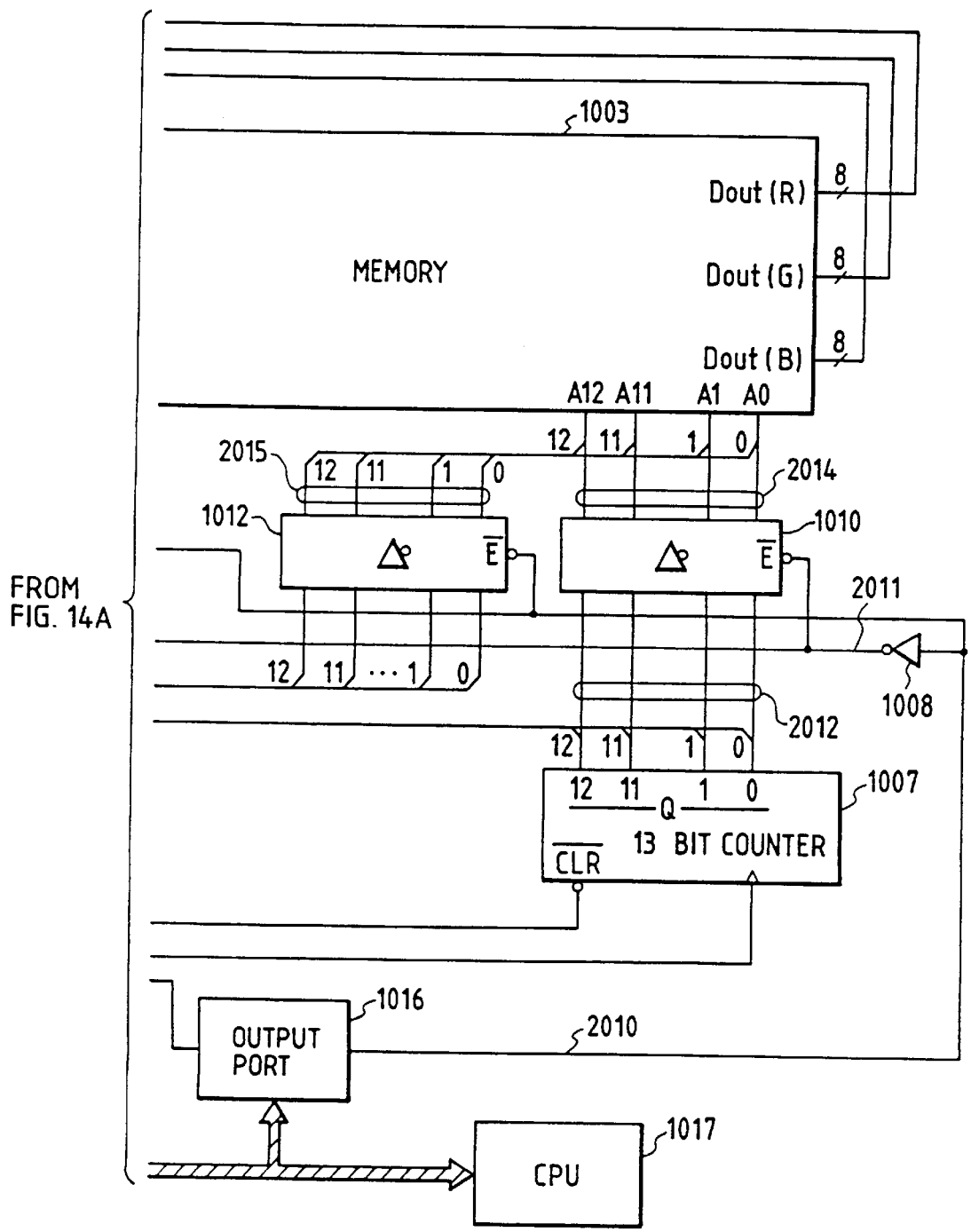

FIGS. 14A and 14B are detailed circuit diagrams showing a structure of the image storing apparatus 3 in the image copying machine according to this embodiment. In the figure, a reference numeral 1001 represents a connector and a reference numeral 1002 represents a selector. A reference numeral 1003 represents a memory. Reference numerals 1004, 1005 and 1008 represent invertors while reference numerals 1006 and 1007 represent 13-bit counters. Reference numerals 1009, 1010, 1011 and 1012 represent tri-state buffers and a reference numeral 1013 represents a communication control unit. A reference numeral 1017 represents a CPU for use in controlling the entire system of the image storing apparatus 3. A reference numeral represents a read-only memory (ROM) storing programs used for operating the CPU 1017. A reference numeral 1015 represents a random-access memory (RAM) that serves as a work area used by the CPU 1017 for executing the programs stored in the ROM 1014. A reference numeral 1016 represents an output port.

Reference numerals 2001R, 2001G, 2001B, 2007R, 2007G, 2007B, 2019R, 2019G, 2019B and 2012 through 2017 represent signal lines. A reference numeral 2002 represents an ITOP signal while a reference numeral 2003 represents an EN signal. A reference numeral 2004 represents a video clock (VCLK) and a reference numeral 2005 represents a communication signal (COM). A reference numeral 2006 represents a select signal. A reference numeral 2008 represents an ITOP signal. A reference numeral 2009 represents an EN signal. A reference numeral 2010 represents a control signal. A reference numeral 2018 represents a bus line for use in transmitting an address signal, data and a control signal.

Next, operation of the above mentioned structure is described.

The connector 1001 is connected to the video interface 201 in the color reader 1 shown in FIGS. 3A and 3B through a cable. The R data 205R, the G data 205G and B data 205B are supplied through the connector 1001 to the signal lines 2001R, 2001G and 2001B, respectively. The control signal and the signal 207 or the communication signal are also supplied to the signal lines 2002–2005 through the connector 1001.

Image signals on the signal lines 2001R, 2001G and 2001B (hereinafter, referred to as "2001R'", "2001G'", and "2001B'") are supplied to the selector 1002. During image storage, the selector 1002 is set to an A side in the figure in response to the select signal 2006. The input image signals 2001R', 2001G' and 2001B' (generally referred to as the "image information 2001") are supplied to the memory 1003 through the signal lines 2007R, 2007G and 2007B.

The ITOP signal 2002 is inverted in the invertor 1004 and supplied as the ITOP signal 2008 to a clear terminal of the counter 1006. In addition, the EN signal 2003 is inverted in the invertor 1005 and supplied as the EN signal 2009 to a clock input terminal of the counter 1006 as well as a clear terminal of the counter 1007. The VCLK 2004 is supplied to a clock input terminal of the counter 1007.

Next, a method of storing the memory 1003 is described in detail in conjunction with a case where the original has a size of A4.

Figure 15:
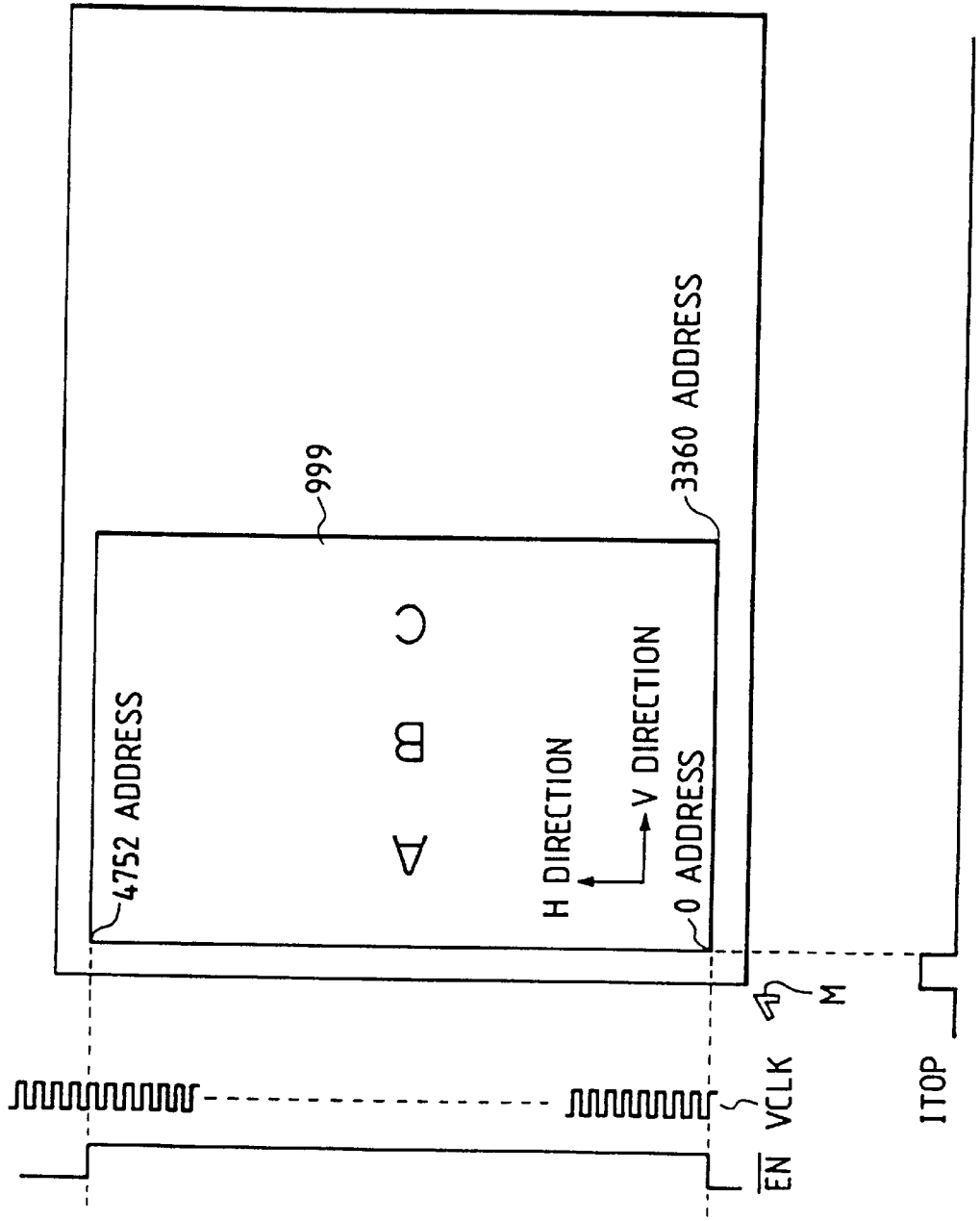
FIG. 15 is a view showing an A4 original disposed on a platen glass of the image copying machine according to this embodiment.

FIG. 15 shows an example of the A4 original 999 mounted on the platen glass 4 of the color reader 1 forming the image copying machine according to this embodiment. The illustration is for the perspective from the underside of the platen glass 4. In this figure, the control signal supplied from the video processing unit 12 is also illustrated.

The original scanning unit 11 according to this embodiment reads the original 999 at 16 dots per millimeter and converts it into digital information to supply to the image storing apparatus 3.

In FIG. 15, as for the orientation, when the original 999 is set with being aligned with a reference mark indicated by "M", a horizontal (H) direction of the original corresponds to 0 through 4752 addresses. On the other hand, a vertical (V) direction corresponds to 0 through 3360 addresses. The control signal 207' (EN, VCLK, ITOP) described above is generated at the timing shown in FIG. 15 and supplied to the image storing apparatus 3.

Figure 16:
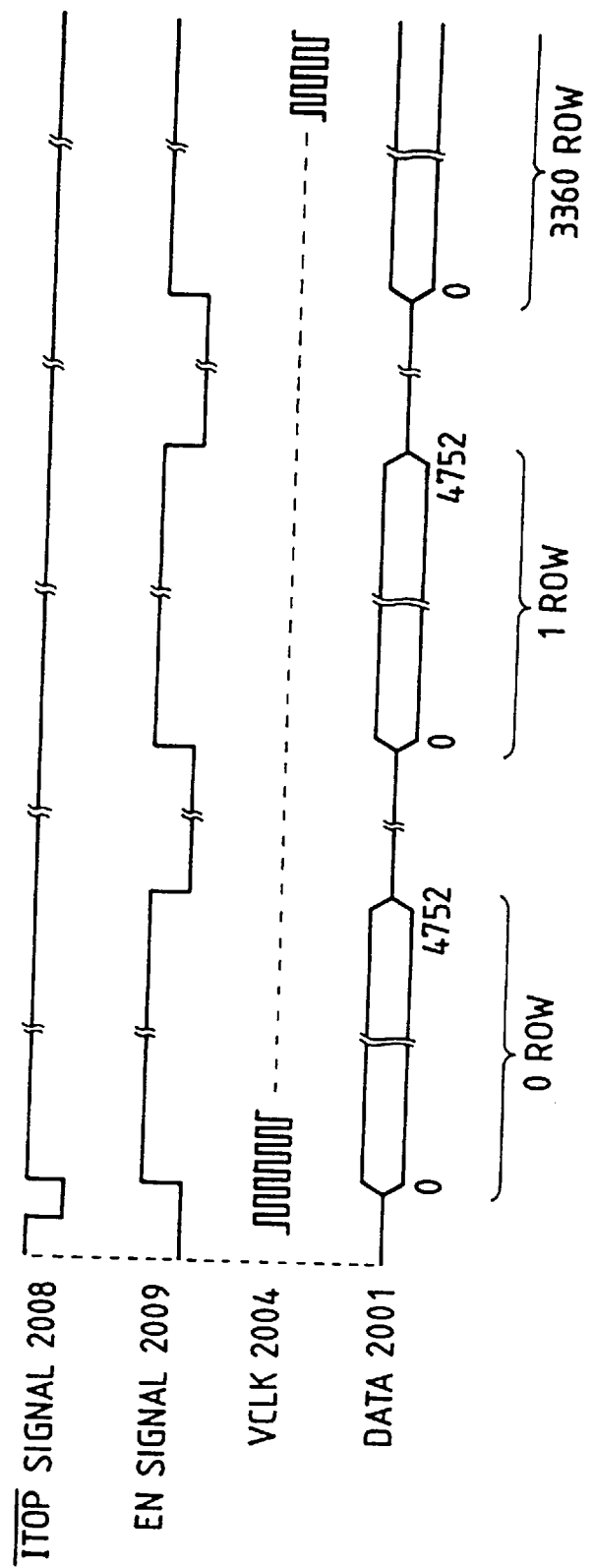
FIG. 16 is a timing chart for signals corresponding to an image signal and a control signal supplied from a video processing unit 21 according to this embodiment.

FIG. 16 is a timing chart for signals in the image storing apparatus 3 corresponding to the control signal 207' and the image signal 205 from the video processing unit 12.

The counter 1006 is cleared when the ITOP signal 2008 indicates the logic "0" and all counter outputs 2013 indicate the logic "0". In this event, the EN signal 2009 represents "0" and the counter 1007 is cleared. Accordingly, all counter outputs supplied on the signal line 2012 represent "0". When the ITOP signal "0" is changed into "1", effective image information 2001 on the original is produced. In addition, the EN signal 2009 changes from "0" to "1". The connector 1001 constantly produces the VCLK 2004.

When the EN signal 2009 becomes "1", the clear status of the counter 1007 is released and a value obtained by counting up in synchronism with the VCLK 2004 is supplied to the signal line 2012. The EN signal 2009 is changed again into "0" when a time corresponding to 4752 VCLKs 2004 has elapsed after the signal level of "0" had changed into "1". The output of the counter 1007 has a value ranging from 0 to 4752 according to control by the above mentioned EN signal 2009.

In FIG. 15, as for the orientation, when the original 999 is set with being aligned with a reference mark indicated by "M", a horizontal (H) direction of the original corresponds to 0 through 4752 addresses. On the other hand, a vertical (V) direction corresponds to 0 through 3360 addresses. The control signal 207' (EN, VCLK, ITOP) described above is generated at the timing shown in FIG. 15 and supplied to the image storing apparatus 3.

FIG. 16 is a timing chart for signals in the image storing apparatus 3 corresponding to the control signal 207' and the image signal 205 from the video processing unit 12.

The counter 1006 is cleared when the ITOP signal 2008 indicates the logic "0" and all counter outputs 2013 indicate the logic "0". In this event, the EN signal 2009 represents "0" and the counter 1007 is cleared. Accordingly, all counter outputs supplied on the signal line 2012 represent "0". When the ITOP signal "0" is changed into "1", effective image information 2001 on the original is produced. In addition, the EN signal 2009 changes from "0" to "1". The connector 1001 constantly produces the VCLK 2004.

When the EN signal 2009 becomes "1", the clear status of the counter 1007 is released and a value obtained by counting up in synchronism with the VCLK 2004 is supplied to the signal line 2012. The EN signal 2009 is changed again into "0" when a time corresponding to 4752 VCLKs 2004 has elapsed after the signal level of "0" had changed into "1". The output of the counter 1007 has a value ranging from 0 to 4752 according to control by the above mentioned EN signal 2009.

The counter 1006 is cleared by the ITOP signal 2008 in the manner described above, following which it is counted up by one as the EN signal 2009 is changed from "0" into "1". More specifically, the counter 1007 produces an address in the H direction while the counter 1006 produces an address (row) in the V direction. The output of the counter 1007 is supplied to the tri-state buffers 1010 and 1011 through the signal line 2012. In addition, the output of the counter 1006 is also supplied to the tri-state buffers 1009 and 1012 through the signal line 2013.

When the image information is stored in the memory 1003 through the signal lines 2007R, 2007G, 2007B, the tri-state buffers 1009 and 1010 are so controlled as to be effective by using the control signal 2010 supplied from the output port 1016. More specifically, the output of the counter 1007 is supplied to A0 through A12 of the memory 1003 through the signal line 2012, the tri-state buffer 1010 and the signal line 2014. The output of the counter 1006 is supplied to A13 through A25 of the memory 1003 through the signal line 2013, the tri-state buffer 1009 and the signal line 2016. The memory 1003 comprises addresses of 26 bits of from A0 to A25. The addresses A0 to A12 and A13 to A25 are controlled by the outputs of the different counters 1006 and 1007, respectively.

Figure 17:
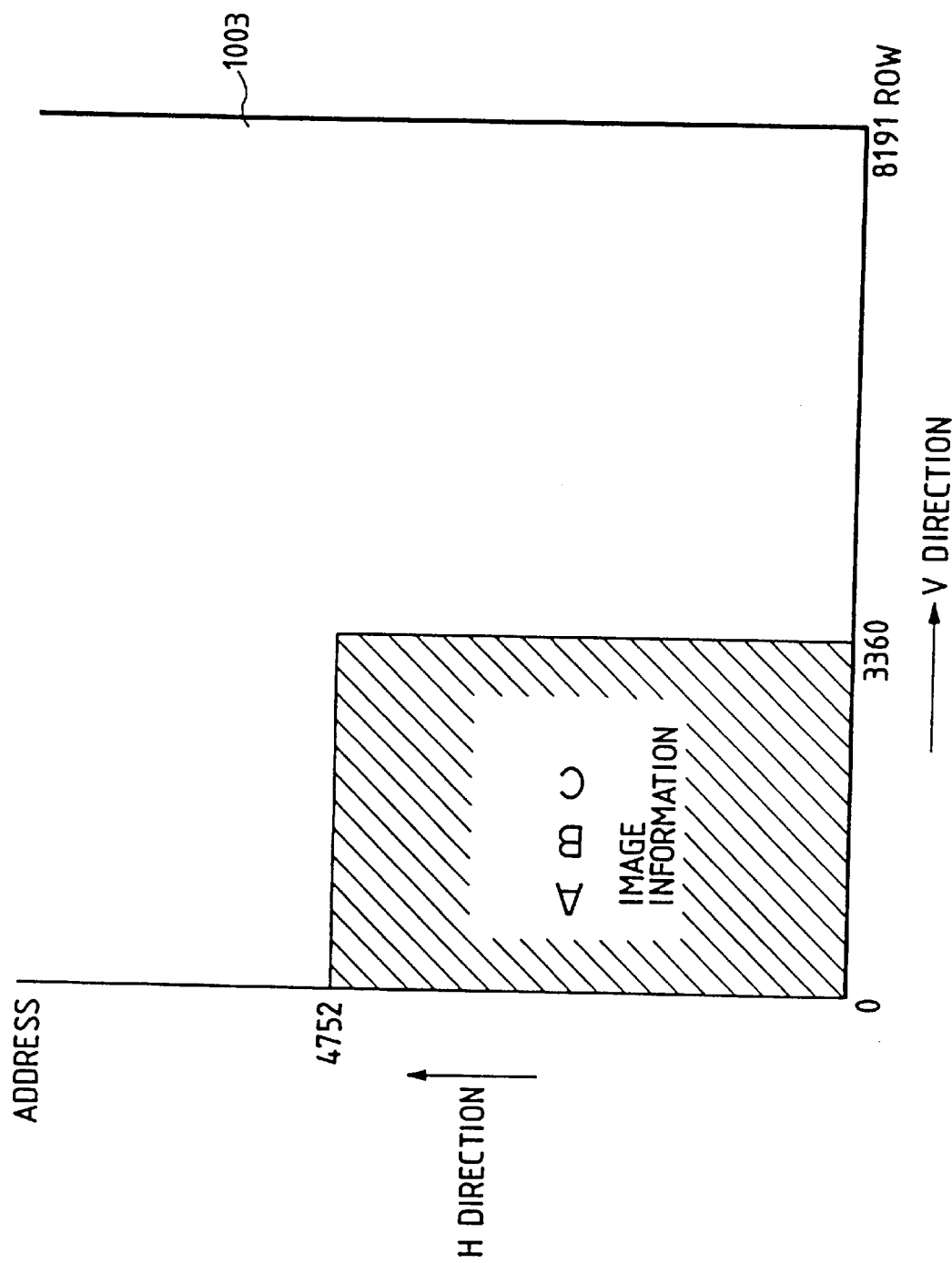
FIG. 17 is a view showing an address space in a memory 1003 in this embodiment.

FIG. 17 shows an address space of the memory 1003 in the present embodiment.

As shown in FIGS. 14A and 14B, each output of the counters 1006 and 1007 has thirteen bits that are supplied to the addresses A0 through A12 or A13 through A25 of the memory 1003. Accordingly, the H direction corresponds to an address space of from 0 address to 8191 address. On the contrary, the V direction corresponds to an address space of from 0 line to 8191 line. When the image information 2001 is supplied to the memory space shown in FIG. 17 at a timing shown in FIG. 16, an occupying area thereof is indicated by a hatched portion in FIG. 17.

In this embodiment, the image information 2001 is stored in the memory 1003 in relation to the addresses for the original 999 in FIG. 5. In other words, the image information of A4 size is stored in the memory 1003. However, the image information may be supplied directly from the color reader 1 to the color printer rather than being stored in the memory 1003 when the output paper is the same in the orientation as the original.

Next, described is a processing of reading the image information out of the memory 1003 in the image storing apparatus 3.

Figure 18:
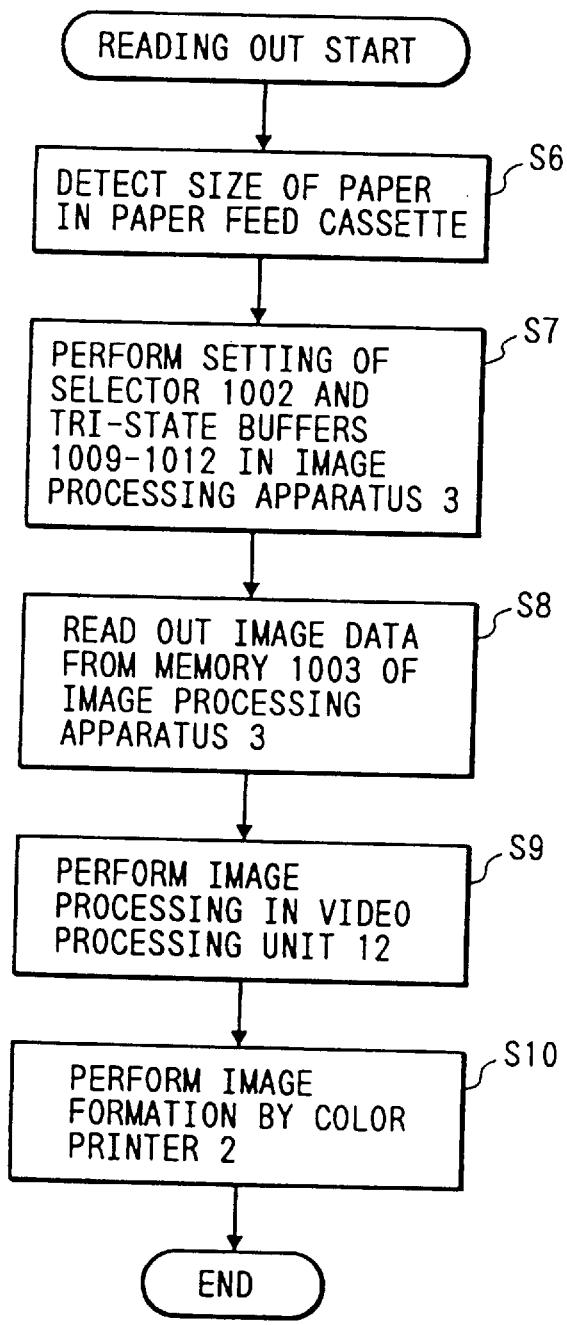
FIG. 18 is a flow chart for use in describing and image reading operation carried out by a CPU 1017 in the image copying machine according to this embodiment.

FIG. 18 is a flow chart for use in describing an image reading operation carried out by the CPU 1017 of the image copying machine according to this embodiment. At step S6 in this figure, the types of the papers stored and set in the paper feeding cassettes 735 and 736 of the color printer 2 are sensed. In this embodiment, these cassettes are provided with A4R and A3 papers, respectively.

With this respect, described is processing to form images on the A4R paper stored in the paper feeding cassette 735 in an upper stage. (The recording density on the image formation of the color printer 2 is also set to 16 dots per millimeter as in the case of the color reader 1.)

Figure 19:
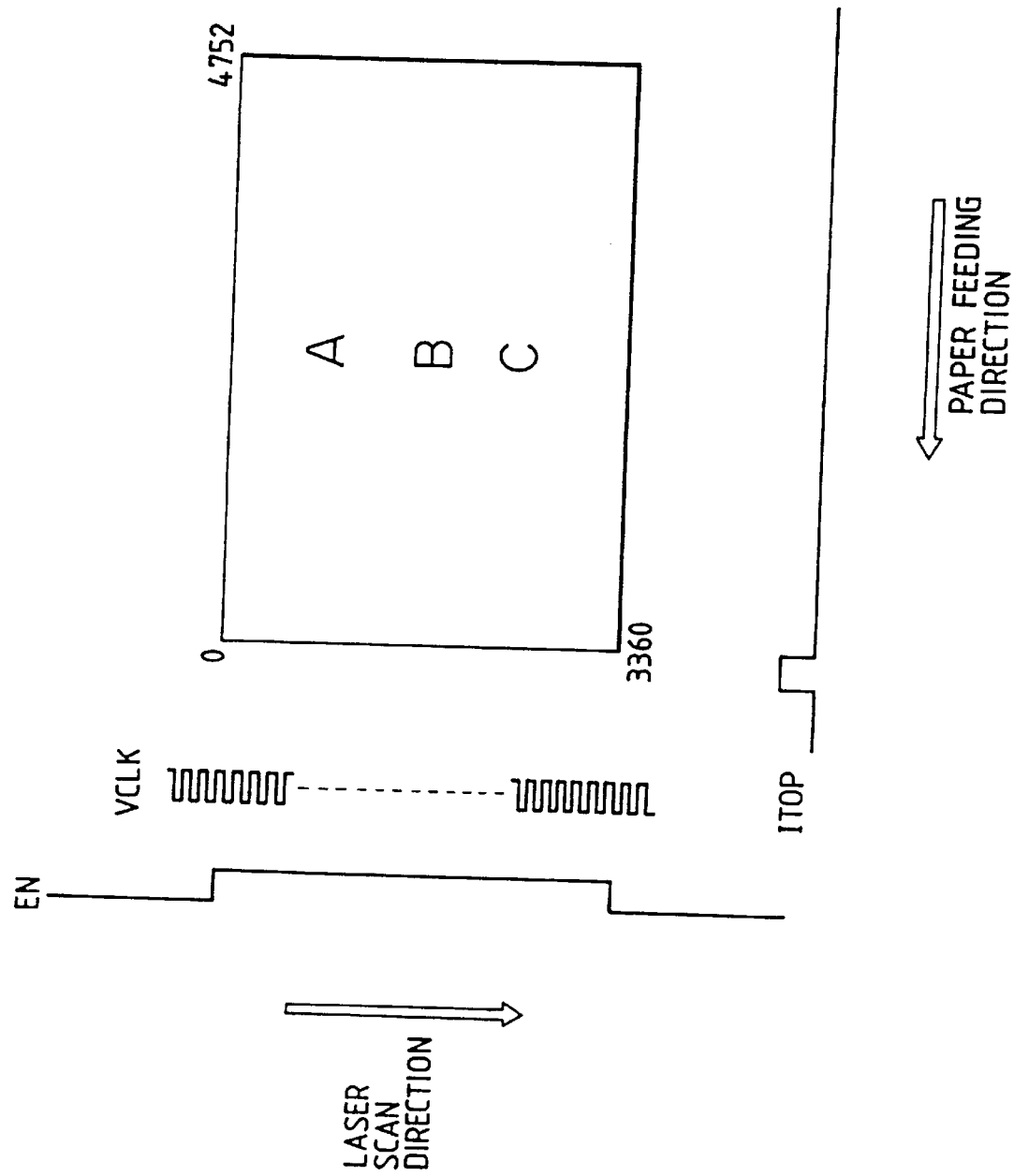
FIG. 19 is a view showing an exemplified output obtained in a case where image information stored in the memory 1003 is produced on an A4R paper in this embodiment.

FIG. 19 is a view showing an exemplified output obtained in a case where the image information stored in the memory 1003 is reproduced on the A4R paper. As shown in the figure, the image information stored in the memory 1003 is read with being rotated by 90° when it is reproduced on the A4R recording paper.

A reading method with this 90-degree rotation is described below.

First, the video interface of the color reader 1 is set as shown in FIG. 5 before 90° rotation. The image information is transmitted from the image storing apparatus 3 to the video processing unit 12. The CPU 1017 of the image storing apparatus 3 sets the selector 1002 to a B side by means of controlling the output port 1016. The tri-state buffers 1011 and 1012 are set effective while the tri-state buffers 1009 and 1010 are set into a high-impedance condition (step S7 in FIG. 18).

The control unit 13 in the color reader 1 obtains information regarding the type of papers set in the paper feeding cassette 735 of the color printer 2 through the cable 511. In this embodiment, the A4R papers are held in the upper stage and thus the video processing unit in the color reader 1 produces, according to this information, the EN signal, the VCLK and the ITOP signal during formation of the images.

The ITOP signal is generated when the A4R paper is fed and rolled on the image transferring drum and the end of the paper is detected. The EN signal becomes the logic "0" by the amount corresponding to the width of the A4R paper by means of detecting the laser beam emitted from the laser emitting unit 711 (FIG. 2).

The VCLK generates continuously a frequency corresponding to one pixel of the laser. The storing density is equal to 16 dots per millimeter, so that the number of the VCLKs in the laser scanning direction is 210 (mm)×16 (dot/mm)=3360 dots. The EN signal becomes the logic "0" during 3360 clocks are entered. The control signal supplied from the video processing unit 12 to the image storing apparatus 3 is supplied to the counters 1006 and 1007. The EN signal is supplied to the clock input terminal of the counter 1006 and the clear terminal of the counter 1007. The VCLK signal is supplied to the clock input terminal of the counter 1007 while the ITOP signal is supplied to the clear terminal of the counter 1006.

Figure 20:
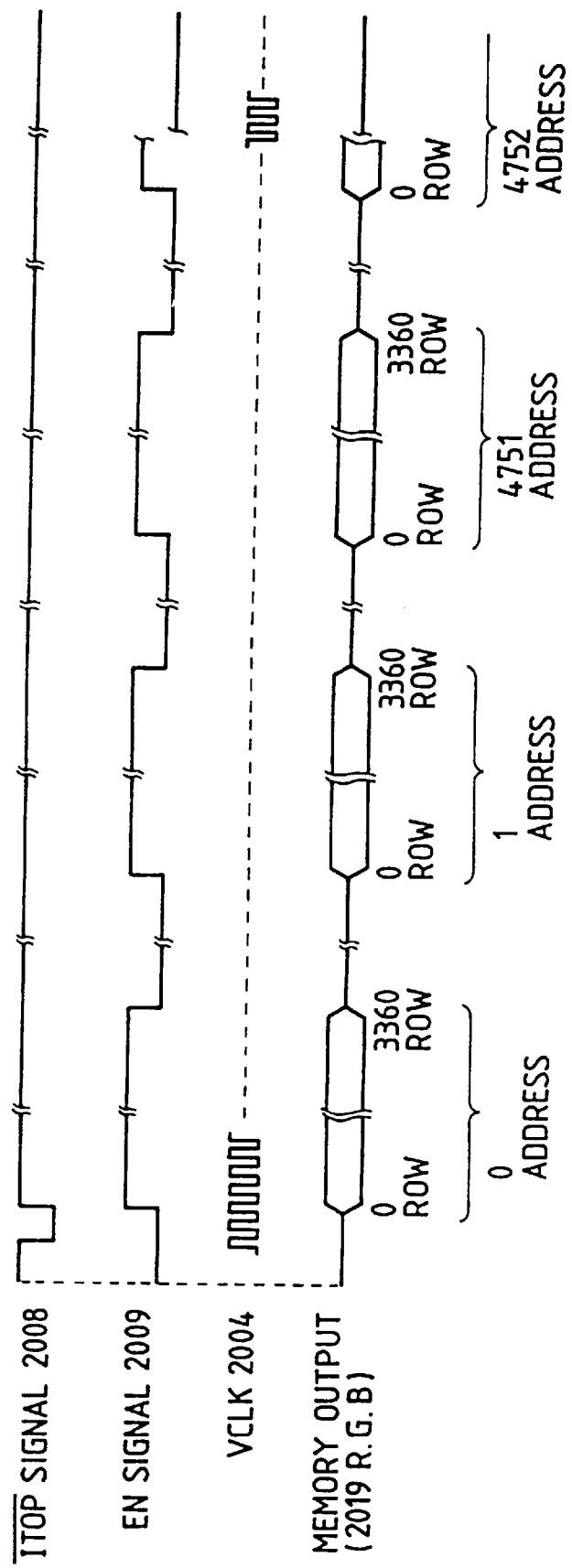
FIG. 20 is a timing chart for a control signal in the image copying machine according to this embodiment.

FIG. 20 is a timing chart for the control signal in the image copying machine according to this embodiment. When the EN signal 2009 shown in this figure is in the logic "0", the counter 1007 is cleared and all counter outputs supplied to the signal line 2012 are in the logic "0". When the ITOP signal 2008 is in the logic "0", the counter 1006 is cleared and thus all counter outputs supplied to the signal line 2013 are in the logic "0".

As for the counter 1007, an output counted up by one is supplied to the signal line 2012 when the VCLK 2004 is entered after the EN signal 2009 becomes the logic "1". The counter output supplied to the signal line 2012 is supplied to address terminals A13 through A25 of the memory 1003 through the tri-state buffer 1011 in the effective state. As for the counter 1006, an output counted up by one is supplied to the signal line 2016 when the EN signal 2009 is entered after the ITOP signal 2008 becomes the logic "1". The counter output of the counter 1006 is supplied to address terminals A0 through A13 of the memory 1003 through the tri-state buffer 1012 in the effective state.

In this manner, that the terminals A0 through A12 of the memory are supplied with the output signal of the counter 1006 and that the terminals A13 through A25 are supplied with the output signal of the counter 1007 indicate the outputs of the counters 1006 and 1007 during the image storage are replaced by each other.

To read the image information shown in FIG. 17, the information in the V direction in FIG. 17 is first read to count up the output of the counter 1006 in the D direction as one line is read out because the outputs of the counters are replaced with each other. A processing for reading the subsequent signal line in the V direction is then carried out.

This processing is shown in FIG. 20. In this figure, the memory output or the output signal supplied to the signal lines 2019R, 2019G and 2019B is data obtained by means of reading at the 0th address in the H direction the data in the lines 0 through 3360 in the V direction and reading from 0th to 3360th lines in the V direction at the first address in the H direction. This processing is repeated up to the 4752th address, which allows reading the image processing of the A4 original out of the memory 1003 in the form of A4R with being rotated by 90°.

Figure 21:
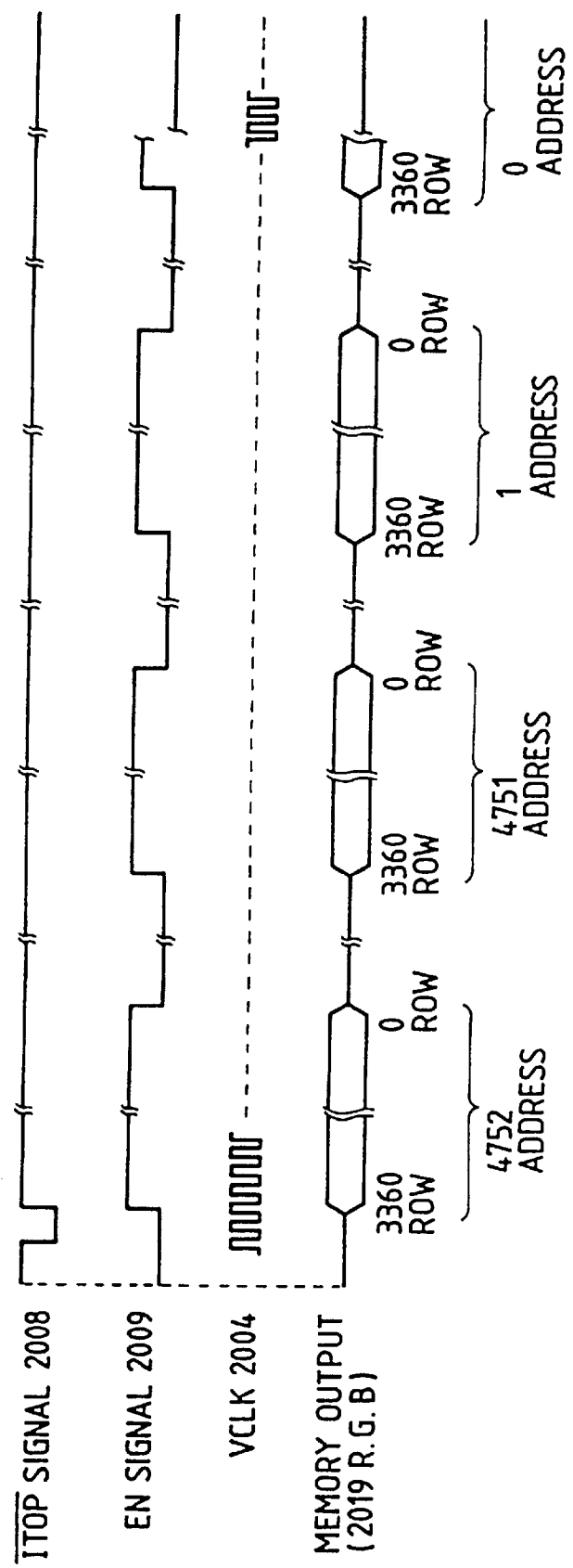
FIG. 21 is a timing chart for a control signal in the image copying machine according to this embodiment.

As shown in FIG. 21, the memory output or the output signal supplied to the signal lines 2019R, 2019G and 2019B is data obtained by means of reading at the 4752th address in the H direction the data in the lines 3350 through 0 in the direction opposite to the V direction and reading from 3360th to 0th lines in direction opposing to the V direction at the 4751th address in the H direction. This processing is repeated up to the 4752th address, which allows reading the image processing of the A4 original out of the memory 1003 in the form of A4R with being rotated by 90° in the opposite direction as in FIG. 20 described above.

Figure 22:
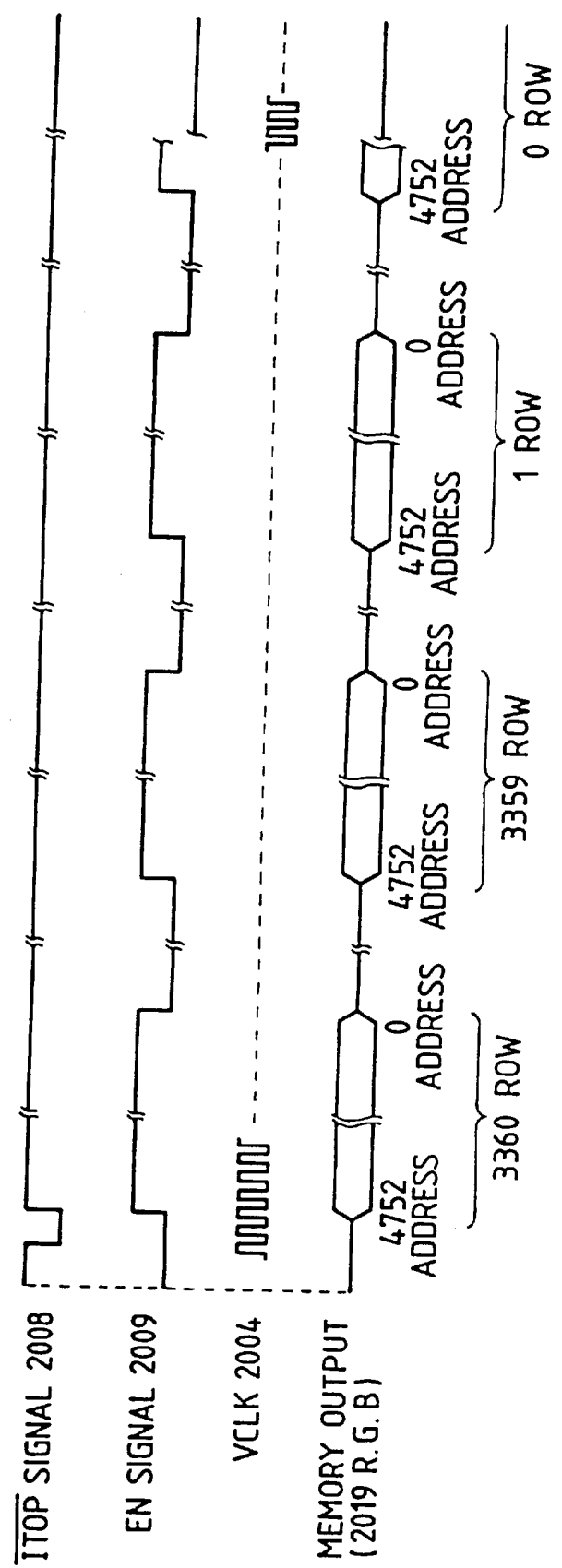
FIG. 22 is a timing chart for a control signal in the image copying machine according to this embodiment.

To produce the image information of the A4 original on the A4 paper with being rotated by 180° in the inverse, the image rotated by 180° can be obtained by means of reading the image in the inverse manner as during the writing as shown in FIG. 22. More specifically, the signal supplied to the signal lines 2019R, 2019G and 2019B reads the data in the 4752 through 0th addresses in the H direction at the 3360th line in the V direction and then the data in the 4752 through 0th addresses at the 3359th line in the v direction. This operation is repeated until the 0th line in the V direction reaches, which allows reading of the image rotated by 180° (step S8 in FIG. 18).

The image information from the memory 1003 is supplied to the connector 1001 through the signal lines 2019R, 2019G, 2019B and the selector 1002. This information is transmitted to the video interface 201 in the color reader unit 1 shown in FIGS. 3A and 3B. The image information supplied to the video interface 201 is subjected to processing in the color conversion circuit 47, the LOG 48, the color correction circuit 49, the black character processing circuit 69, the density conversion circuit 116, the variable magnification circuit 117 and the repeat circuit 118, and is then produced through the printer interface 56 to perform image formation in the color printer 2.

The image information transmitted from the color reader unit 1 is supplied to a PWM circuit 778 (see FIG. 2) in the color printer 2. The PWM circuit 778 binarizes multivalent image information by using pulse width modulation. The binarized image information is supplied to the laser output unit 711. The laser beam emitted from the laser output unit 711 is reflected from the polygon mirror 712 and scans linearly the surface on the photosensitive drum 715 through the f/θ lens 713 and the reflection mirror 714 to form the latent image associated with the memory 1003 (step S10 in FIG. 18).

The processing carried out at and after step S10 are similar to those described in conjunction with the above mentioned color printer 2. Accordingly, description thereof will be omitted here.

The image rotation described above is based on the method carried out during reading out of the memory 1003. However, the image rotation may be made during writing in the memory 1003 by using the similar address designation method. Reduction or enlargement of the original may be achieved by means of thinning or interpolating the data during writing into the memory 1003. Accordingly, it becomes possible to synthesize the reduced and rotated images by means of reducing in size and rotating the images in the image storing apparatus 3.

<Reduced Layout for two or more originals each having different size>

Figure 23:
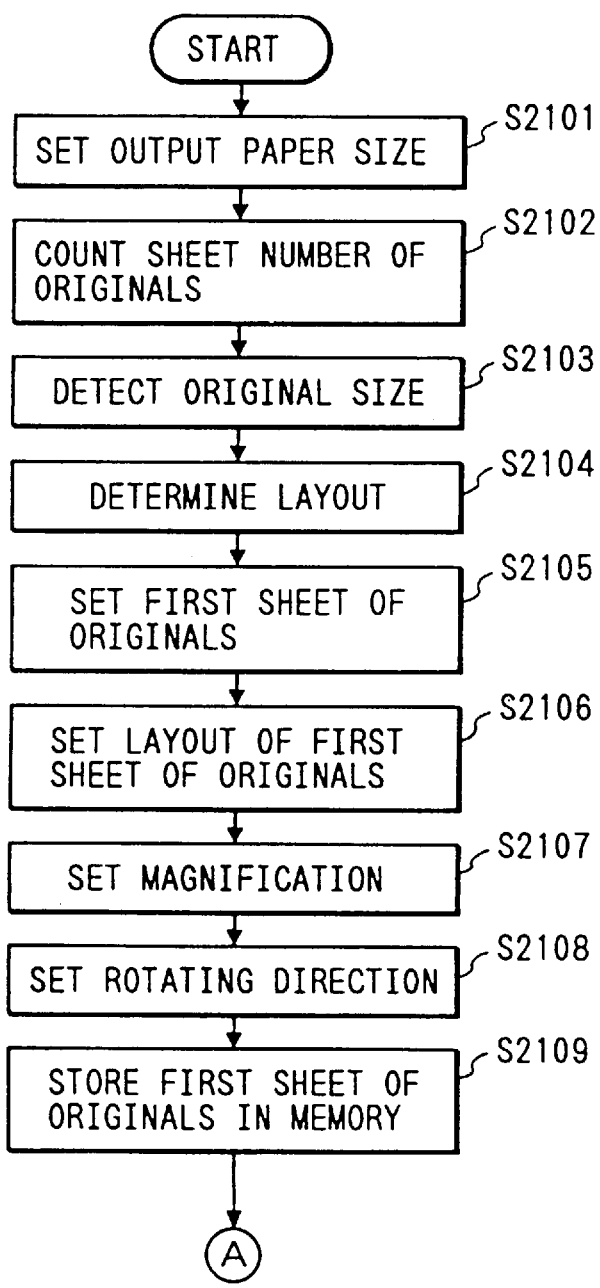
FIG. 23 is a flow chart illustrating a reduced layout operation, directed to two or more originals each having different size, in a CPU of a control unit in the image copying machine according to this embodiment.
Figure 24:
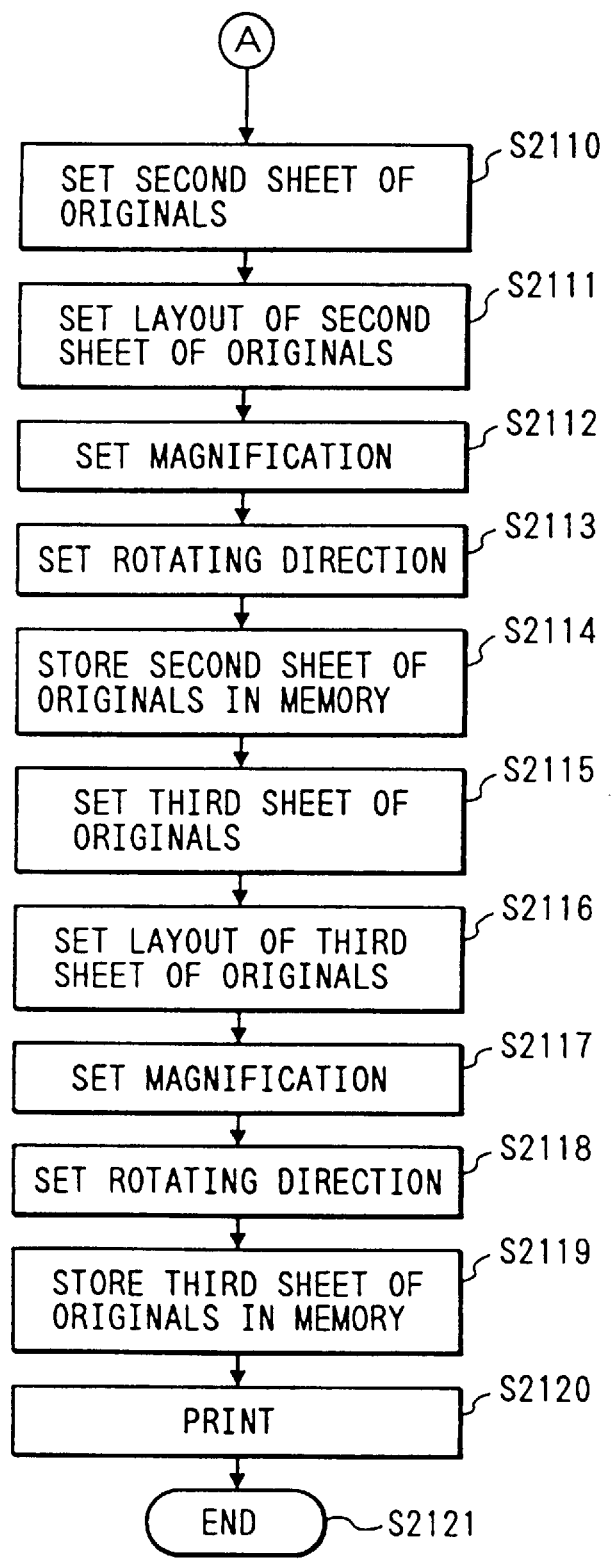
FIG. 24 is a flow chart illustrating a reduced layout operation, directed to two or more originals each having different size, in a CPU of a control unit in the image copying machine according to this embodiment.

FIGS. 23 and 24 are flow charts illustrating operations during automatic layout carried out by the CPU 22 in the control unit 13 of the image copying machine according to this embodiment. These figures illustrate operational flows executed after a copying mode of the automatic reduction layout is set by the operation unit 20. In this embodiment, described is an operation in a case where three originals— the first original has a size of A4, the second one has A4 and the third one has A3—are reduced and printed (laid out) on a single sheet of an A4 output paper.

First, the output paper size of A4 is set from the operation unit 20 (step S2101). Next, the number of originals set, i.e., three is counted by an original feeder which is not shown (S2102). The color reader 1 reads the edges of the original fed to the original feeder. The size of the original is detected by the CPU 22 in the control unit 13. The sizes of the first through third originals detected as A4, A4 and A3 are stored in the RAM 24 with being associated with the order of the originals (S2103). This detection of the original size is performed for all originals set. In addition, these originals are fed back to the original position after the sizes are detected.

Information regarding the original size is also supplied to the video interface 201 through the communication line 501 shown in FIG. 1. In this event, the information regarding the original size is produces as the read area as in the processing at step S3 in FIG. 13 described above.

Subsequently, at step S2104, the CPU 22 in the control unit 13 determines a layout of the images of two or more originals to be recorded on a single sheet of paper according to the number of the originals and the original sizes stored in the RAM 24. The layout determined is stored in the RAM 24. Alternatively, these original sizes and the number of the originals may be entered by using the operation unit 20.

Operational flows for determining the layout is described below.

Figure 31:
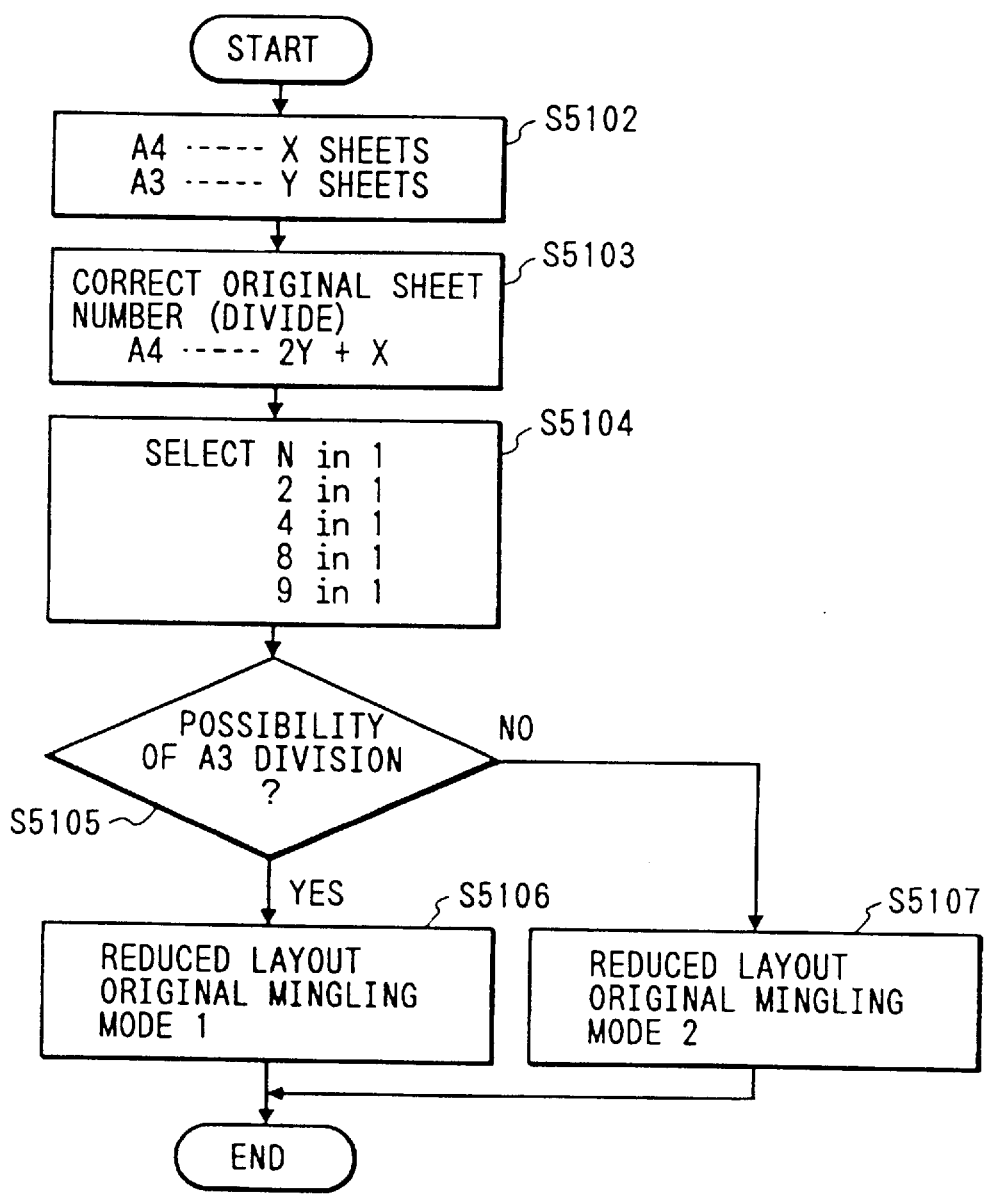
FIG. 31 is a flow chart illustrating procedures of reduced layout.

FIG. 31 is a flow chart for use in determining the layout. At step S5102 in FIG. 31, the number of the originals sensed at the steps S2102 and S2103 in FIG. 23 and the original sizes are ordered into the number of the originals for each size of the original. More specifically, the number of the A4 sheets is equal to X and that of the A3 sheets is equal to Y.

At step S5103, the number of the original sheets is corrected. More specifically, a user is allowed to determine whether the A3 original is divided into two portions.

Figure 32:
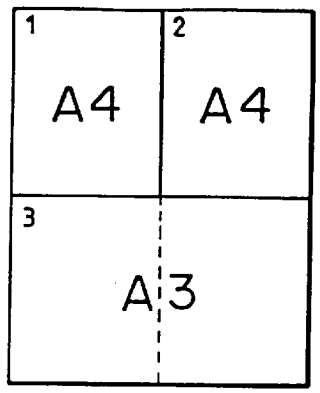
FIG. 32 is a view showing a specific example of a reduced layout.
Figure 33:
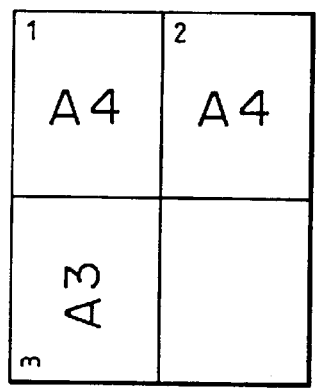
FIG. 33 is a view showing a specific example of a reduced layout.

FIGS. 32 through 35 are views showing exemplified layouts. FIG. 32 shows a 4 in 1 copy in a case where the layout to divide the A3 original into two portions is selected. More specifically, this layout is selected when, for example, the original contains two pages of A4 originals in one sheet of A3 paper such as a copy of facing pages of a book. On the other hand, the A3 original not being divided into two may be laid out as the 4 in 1 layout shown in FIG. 33.

At the step S5103, the number of the originals is corrected when division of the original is selected. More specifically, the number of the A4 originals is corrected as, for example, A4 . . . 2Y+X to deal with one A3 original as two A4 originals. On the other hand, if the division of the original is not selected, no correction of the number of the originals is performed at this step. At step S5104, it is determined how many originals are to be reduced and laid out on a single sheet of paper. In this embodiment, description is made in conjunction with a case where the 4 in 1 is selected.

At step S5105, in the case of the 4 in 1, a user is allowed to determine whether three divisions can be obtained to modify, if necessary, the layout depending on whether the A3 original is incorporated as the second page or the third page.

If division is selected, the control passes to a reduced layout original mingling mode 1 at step S5106. An exemplified layout in this case is shown in FIG. 34.

Figure 34:
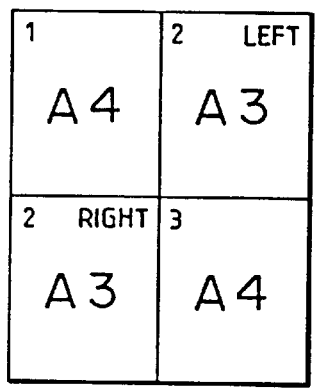
FIG. 34 is a view showing a specific example of a reduced layout.
Figure 35:
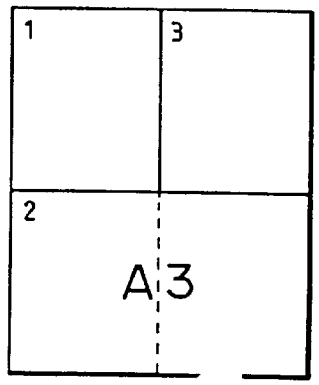
FIG. 35 is a view showing a specific example of a reduced layout.

FIG. 34 is a view showing a case where the A3 original is divided into two portions and the right and left sides of the A3 original are laid out as one A4 original. FIG. 35 is a layout for a case where the A3 original is not divided, in which the original is avoided to be divided in upper and lower rows.

The set original is then fed to the original feeder to set the first original on the platen 4 (S2105). Next, a coordinate address for storing the first original in the image memory 1003 is set. More specifically, a start preset address of 2346th address in the H direction and the start preset address of 0th address in the V direction are set (step S2106).

Thereafter, the reduction magnification of 50% is set (S2107) and a rotating direction of 0° is also set (S2108) to scan the original and the first original is stored in the image memory 1003 (S2109).

Subsequently, the second original is set on the platen by using the original feeder (S2110). Next, a coordinate address for storing the second original in the image memory 1003 is set. More specifically, a start preset address of 2365th address in the H direction and the start preset address of 1653th address in the V direction are set (step S2111).

Thereafter, the reduction magnification of 50% is set (S2112) and a rotating direction of 0° is also set (S2113) to scan the original and the second original is stored in the image memory 1003 (S2114).

Subsequently, the third original is set on the platen by using the original feeder (S2115). Next, a coordinate address for storing the third original in the image memory 1003 is set. More specifically, a start preset address of 0th address in the H direction and the start preset address of 0th address in the V direction are set (step S2116). Thereafter, the reduction magnification of 50% is set (S2117) and a rotating direction of 0° is also set (S2118) to scan the original and the third original is stored in the image memory 1003 (S2119).

At step S2120, the three original images stored in the image memory 1003 are printed on an A4 output paper through the printer, completing the copying operation (S2121).

Figure 25:
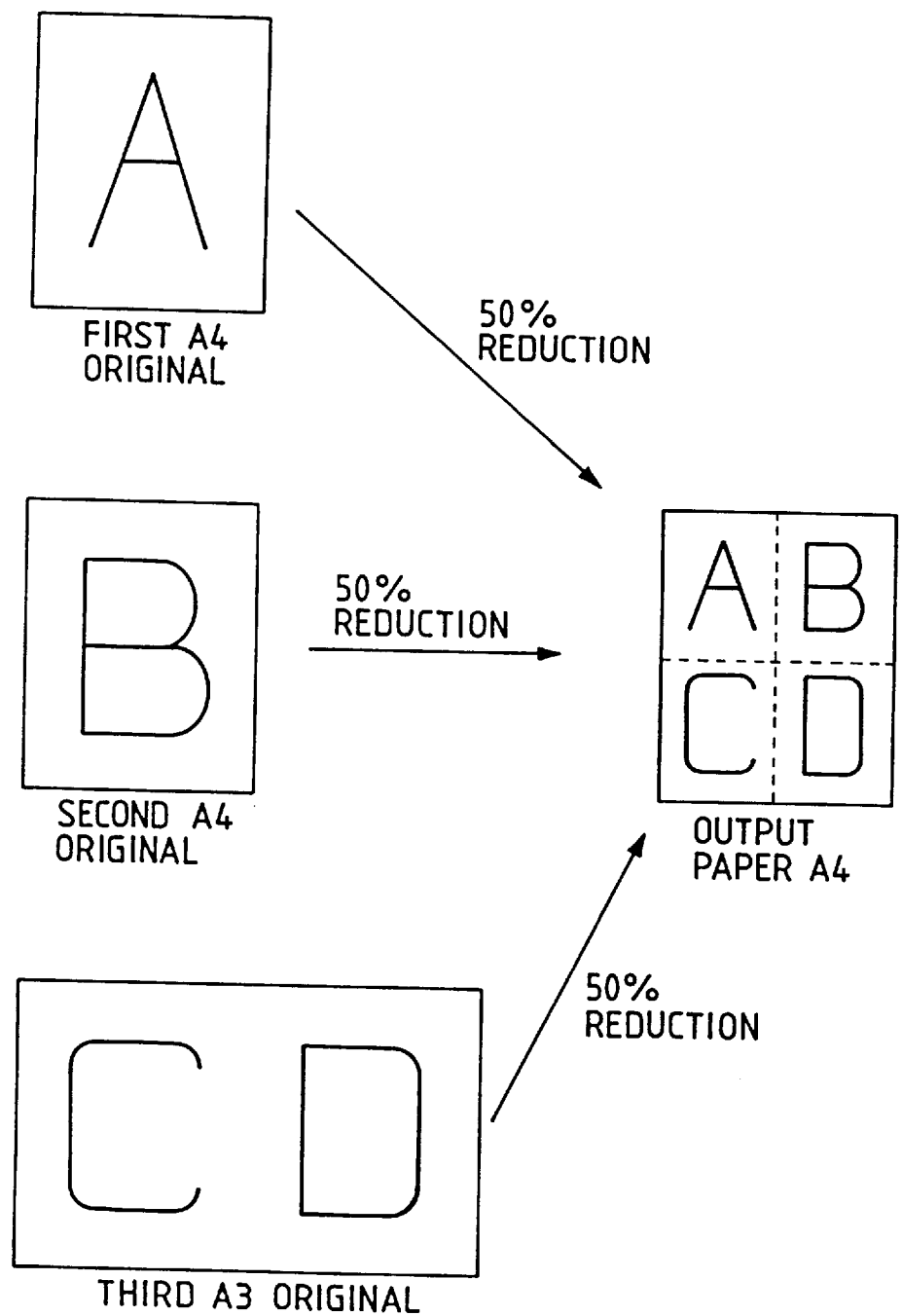
FIG. 25 is a view showing a case where three originals are printed on a single sheet of an output paper (a reduced layout) in one embodiment of the present invention.

FIG. 25 is a view showing a printed product of three originals on a single sheet of paper (reduced layout) according to this embodiment.

Second Embodiment

Next, an automatic rotation reduced layout is described as a second embodiment of the present invention.

The image copying machine comprising the control circuit according to this embodiment is similar in structure and in operation to the image copying machine described above. Accordingly, description thereof will be omitted.

Figure 26:
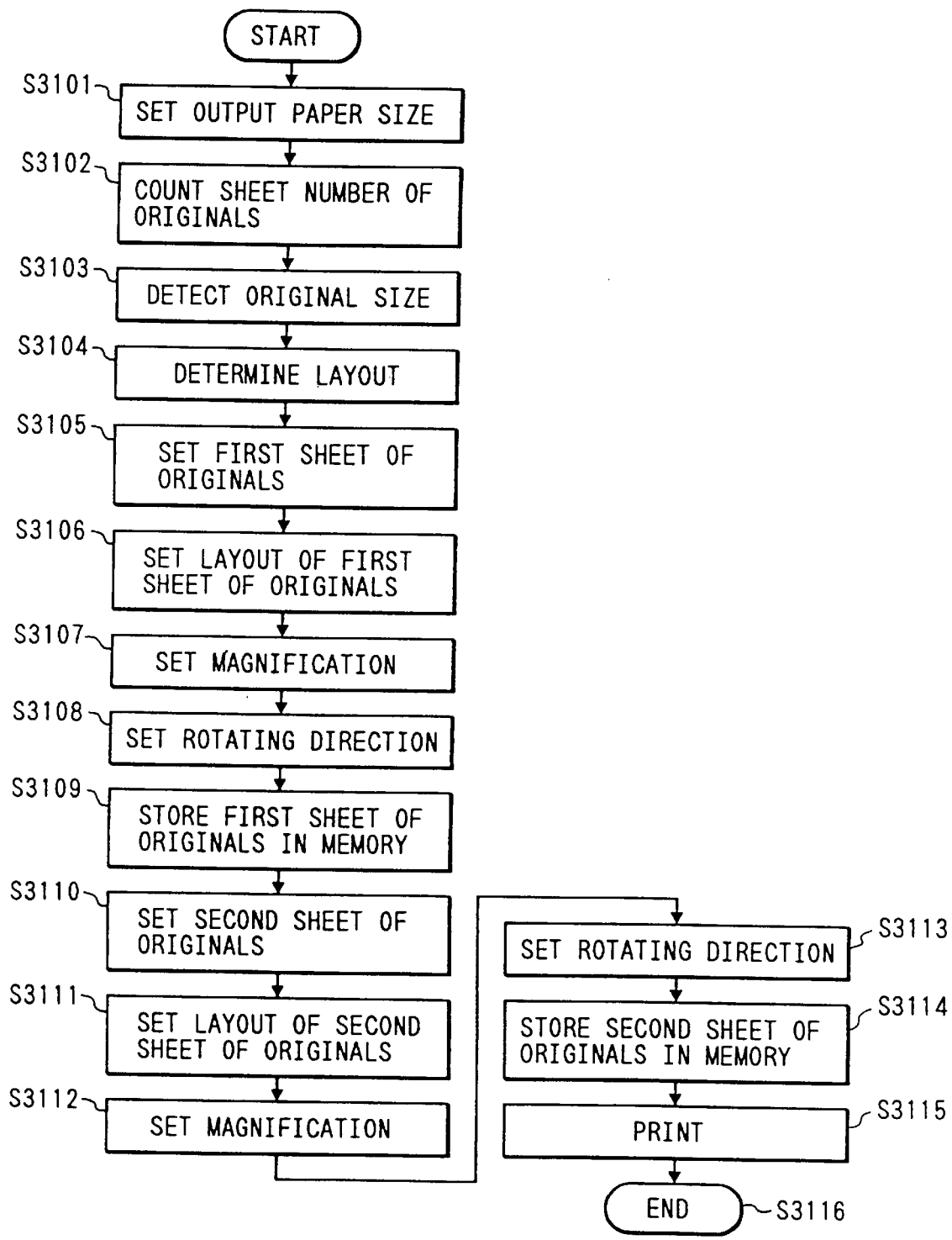
FIG. 26 is a flow chart illustrating a reduced layout operation, directed to two or more originals each having different size, in a CPU of a control unit in the image copying machine according to this embodiment.

FIG. 26 is a flow chart illustrating operation during the automatic layout carried out by the CPU 22 in the control unit 13 of the image copying machine according to this embodiment. This figure involves in a flow executed after a copy mode of the automatic rotation reduced layout is set through the operation unit 20.

In this embodiment, described is an operation in a case where two originals—the first original has a size of A3 and the second one has A4—are reduced and printed (laid out) on a single sheet of an A3 output paper.

First, the output paper size of A3 is set from the operation unit 20 (step S3101). Next, the number of originals set, i.e., two is counted by an original feeder which is not shown (S3102). The size of the original is detected by the CPU 22 in the control unit 13.

The sizes of the originals detected as A3 and A4 are stored in the RAM 24 (S3103). Information regarding the original size is also supplied to the video interface 201 through the communication line 501 shown in FIG. 1. In this event, the information regarding the original size is produced as the read area as in the processing at step S3 in FIG. 13 described above.

Subsequently, at step S3104, the CPU 22 in the control unit 13 determines a layout according to the number of the originals and the original sizes stored in the RAM 24. The layout determined is stored in the RAM 24. Alternatively, these original sizes and the number of the originals may be entered by using the operation unit 20.

Figure 36:
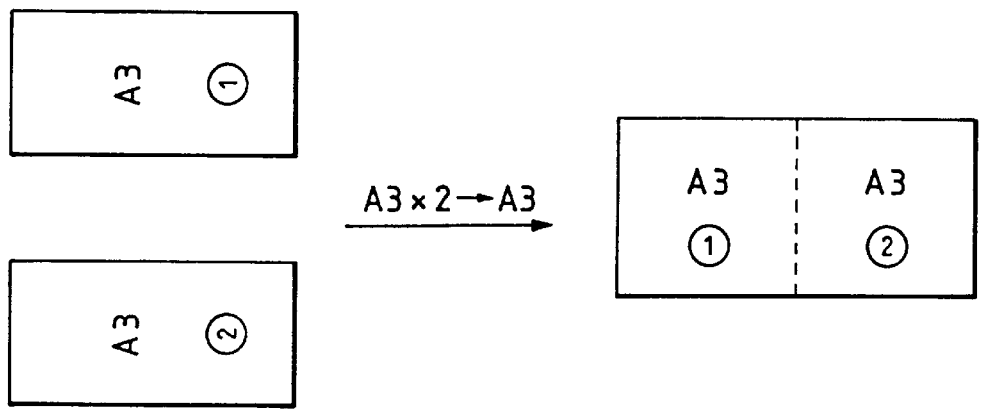
FIG. 36 is a view showing a specific example of an automatic rotation reduced layout.
Figure 37:
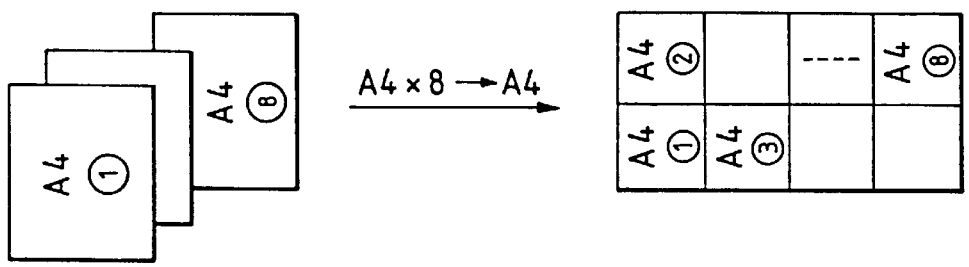
FIG. 37 is a view showing a specific example of an automatic rotation reduced layout.
Figure 38:
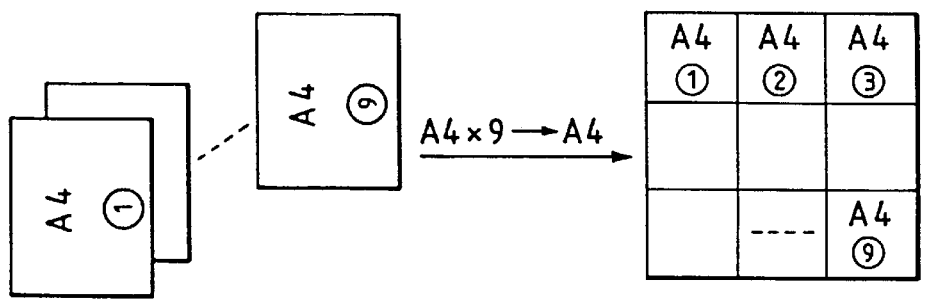
FIG. 38 is a view showing a specific example of an automatic rotation reduced layout.

A plurality of layout patterns are previously determined, some of which are shown in FIGS. 36 through 38.

FIG. 36 is a view showing a case where two A3 originals are laid out on a single sheet of A3 paper. FIG. 37 is a view showing a case where eight A4 originals are laid out on a single sheet of A4 paper while FIG. 38 is a view showing a case where nine A4 originals are laid out in a single sheet of the A4 paper.

The set original is then fed to the original feeder to set the first original on the platen 4 (S3105).

Next, a coordinate address for storing the first original in the image memory 1003 is set. More specifically, a start preset address of 4693th address in the H direction and start preset address of 0th address in the V direction are set (step S3106). Thereafter, the reduction magnification of 70% is set (S3107) and a rotating direction of 90° is also set (S3108) to scan the original and the first original is stored in the image memory 1003 (S3109).

Subsequently, the second original is set on the platen by using the original feeder (S3110). Next, a coordinate address for storing the second original in the image memory 1003 is set. More specifically, a start preset address of 4693th address in the H direction and the start preset address of 3307th address in the V direction are set (step S3111). Thereafter, the reduction magnification of 70% is set (S3112) and a rotating direction of 90° is also set (S3113) to scan the original and the second original is stored in the image memory 1003 (S3114).

Finally, two originals stored in the image memory 1003 are printed on the A3 output paper at step S3130, completing the copying operation (S3115).

Figure 27:
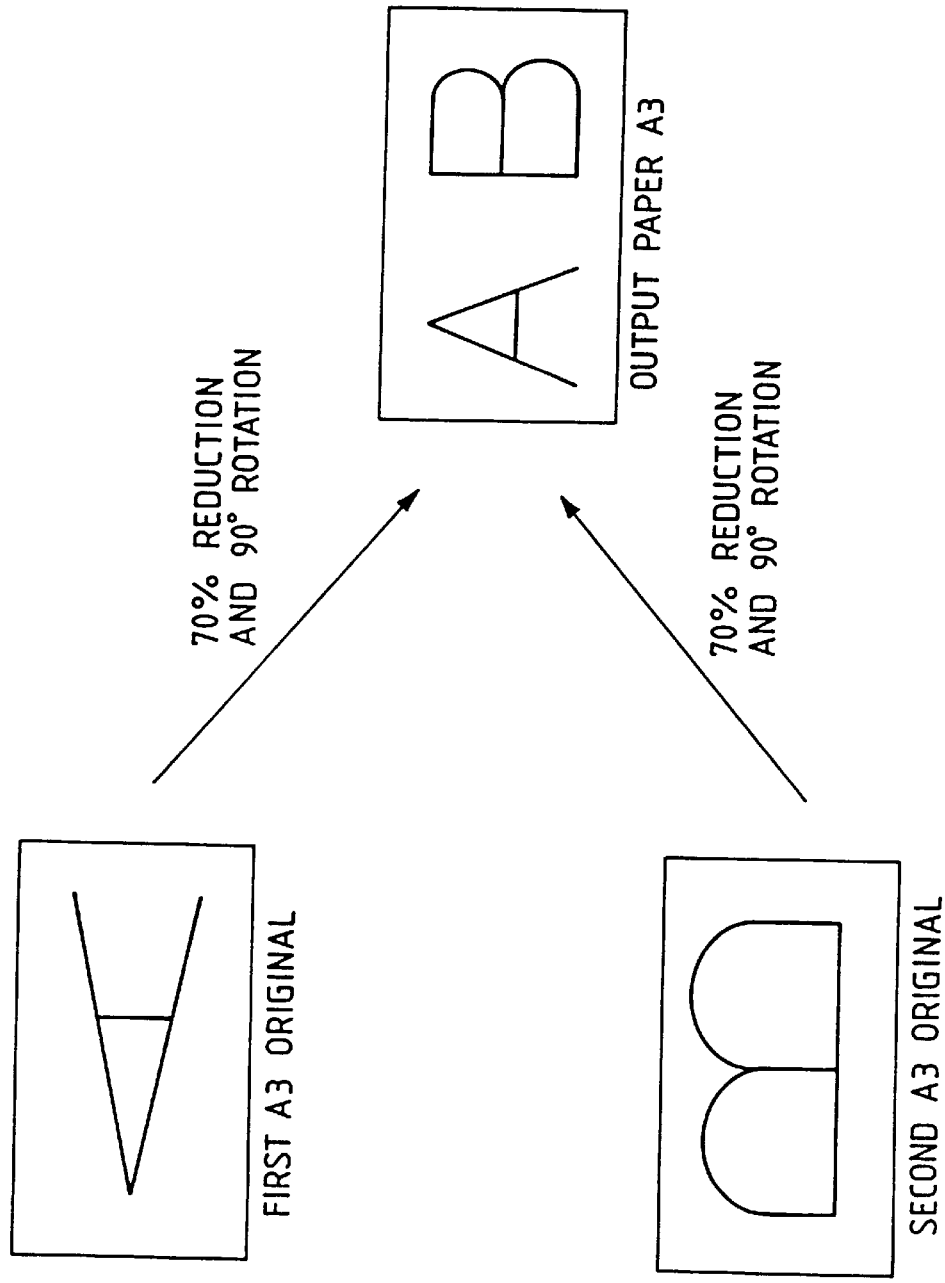
FIG. 27 is a view showing a case where two originals are printed on a single sheet of an output paper (a reduced layout) in another embodiment of the present invention.

FIG. 27 is a view showing a printed product of two originals on a single sheet of paper (reduced layout) according to this embodiment.

Third Embodiment

Next, a layout based on area designation with a marker is described as a second embodiment of the present invention.

The image copying machine comprising the control circuit according to this embodiment is similar in structure and in operation to the image copying machine described above. A marker processing of area designation means is known to those skilled in the art. Accordingly, description thereof will be omitted.

Figure 28:
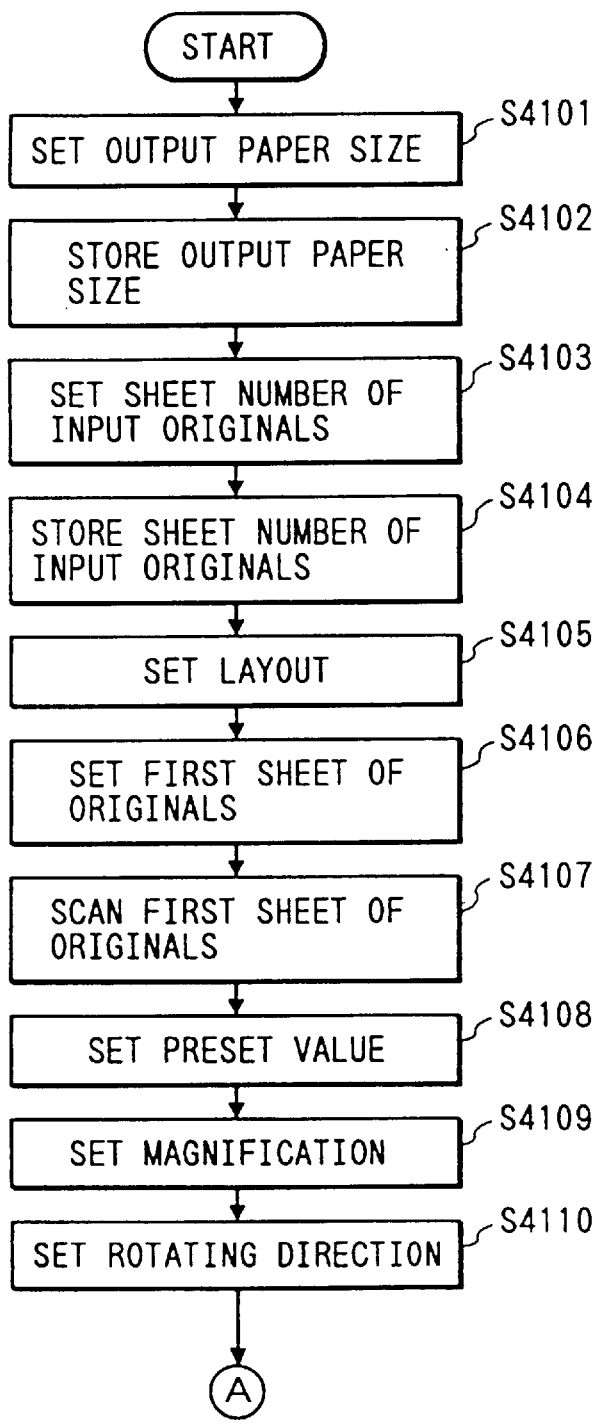
FIG. 28 is a flow chart illustrating operation according to another embodiment of the present invention.
Figure 29:
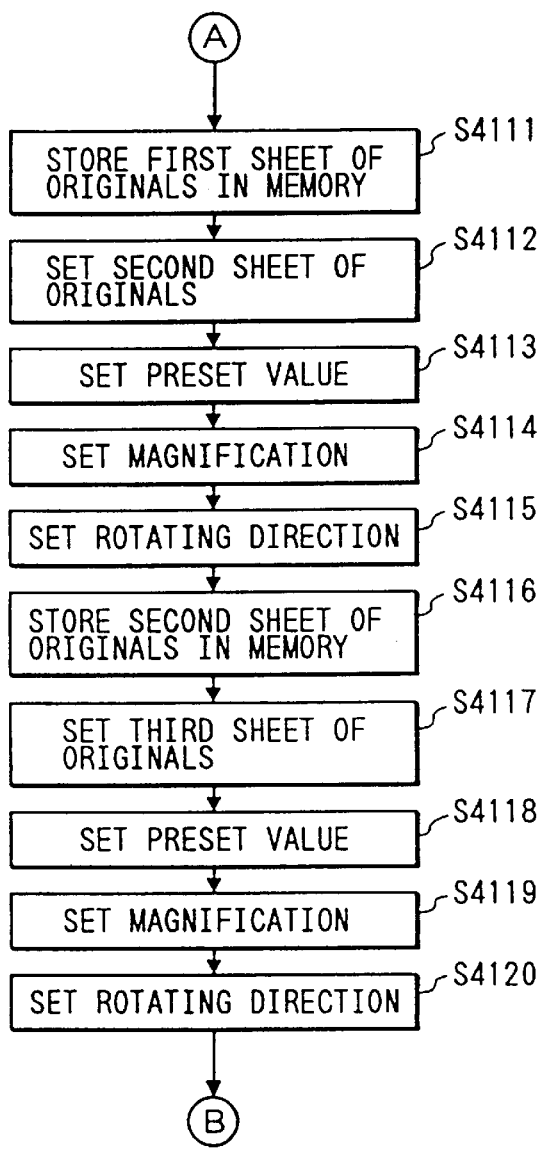
FIG. 29 is a flow chart illustrating operation according to another embodiment of the present invention.
Figure 30:
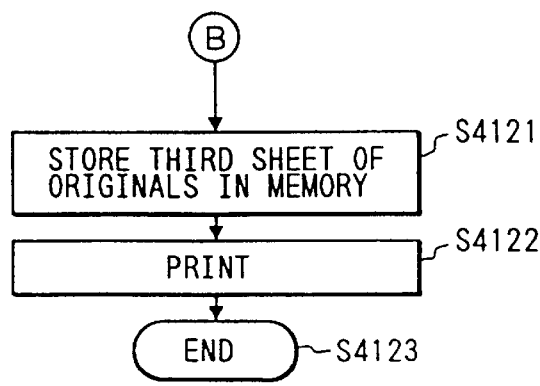
FIG. 30 is a flow chart illustrating operation according to another embodiment of the present invention.

FIGS. 28 through 30 are flow charts illustrating operation during the layout based on area designation with a marker carried out by the CPU 22 in the control unit 13 of the image copying machine according to this embodiment. This figure involves in a flow of operation of the layout based on area designation with a marker carried out by the CPU 22 through the operation unit 20.

In this embodiment, described is an exemplified operation of the layout (trimming) in which only the images within an area designated with a marker of each of the fourth original are stored in the image memory 1003.

First, the output paper size of A4 is set from the operation unit 20 (step S4101). The sizes of the originals is stored in the RAM 24 (S4102).

Subsequently, at step S4105, the CPU 22 in the control unit 13 determines a layout according to the number of the originals and the original sizes stored in the RAM 24. The layout determined is stored in the RAM 24. The first original is set on the platen 4 after an area is designated by the marker (step S4106). Of course, the first original may be set on the platen 4 previously.

Next, the first original on the platen 4 is scanned (S4107) and the image information within the area designated with the marker is also supplied to the video interface 201 through the communication line 501 shown in FIG. 1. In this event, the area information designated with the marker is produced as a read area as in the processing at the step S3 in FIG. 13.

Next, a coordinate address for storing the first original in the image memory 1003 is set. More specifically, a start preset address of 2346th address in the H direction and the start preset address of 0th address in the V direction are set (step S4108). Thereafter, the reduction magnification of 50% is set (S4109) and a rotating direction of 0° is also set (S4110) to scan the original and the first original is stored in the image memory 1003 (S4111).

Subsequently, the second original is set on the platen by using the original feeder which is not shown (S4112). Next, a coordinate address for storing the second original in the image memory 1003 is set. More specifically, a start preset address of 2365th address in the H direction and the start preset address of 1653th address in the V direction are set (step S4113). Thereafter, the reduction magnification of 50% is set (S4114) and a rotating direction of 0° is also set (S4115) to scan the original and the second original is stored in the image memory 1003 (S4116).

Subsequently, the third original is set on the platen by using the original feeder (S4117). Next, a coordinate address for storing the third original in the image memory 1003 is set. More specifically, a start preset address of 0th address in the H direction and the start preset address of 0th address in the V direction are set (step S4118). Thereafter, the reduction magnification of 50% is set (S4119) and a rotating direction of 0° is also set (S4120) to scan the original and the third original is stored in the image memory 1003 (S4121).

Finally, three originals stored in the image memory 1003 are printed on the A4 output paper at step S4122, completing the copying operation (S4123).

FIG. 25 is a view showing a printed product of three originals on a single sheet of paper (reduced layout) according to this embodiment.

As mentioned above, it becomes possible to lay out two or more originals each having different size in the image memory depending on the size of the output paper for printing.

Figure 39B:
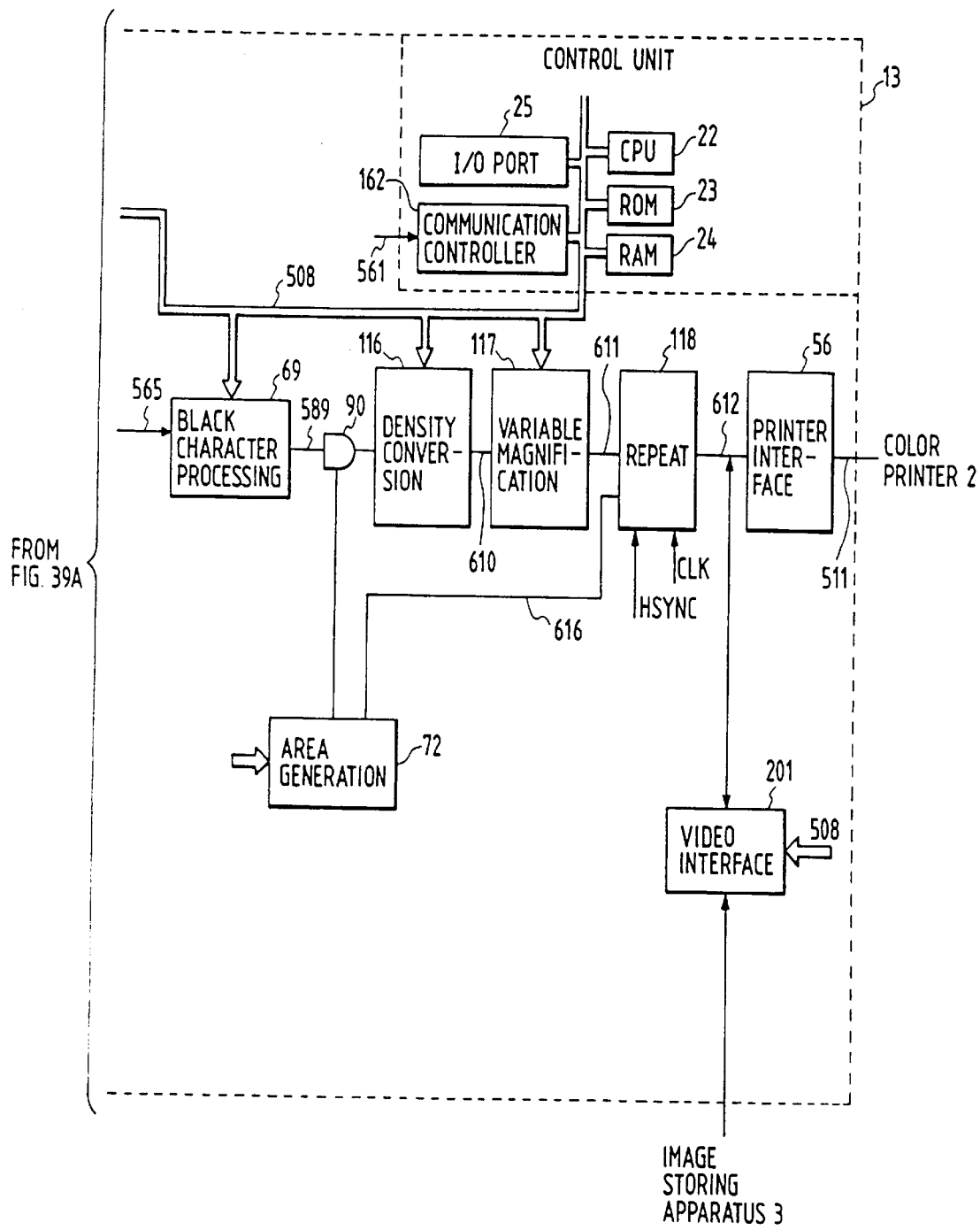
FIG. 39, comprised of FIGS. 39A and 39B, is a block diagram of a copying machine.

As shown in FIGS. 39A and 39B, the image reduced by the variable magnification circuit 117 may be transmitted to the image storing apparatus, where they are rotated and synthesized to produce a product as described above.

Fourth Embodiment

Figure 40:
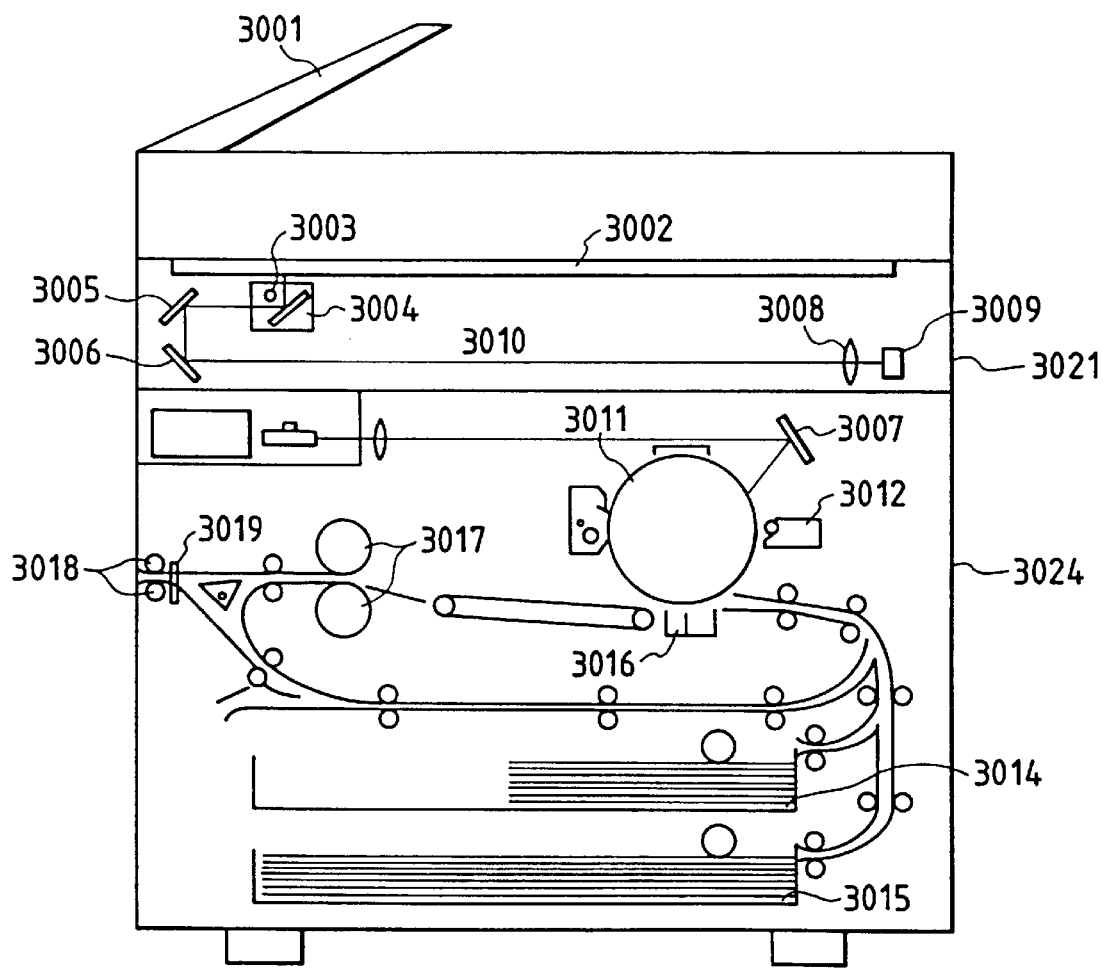
FIG. 40 is an entire view of an image forming device.

FIG. 40 is a schematic sectional view for use in describing structure of an image forming apparatus according to a fourth embodiment of the present invention.

In the figure, originals mounted with being faced up on an original feeder 3001 is carried one by one to a glass platen 3002. When the original is carried, a lamp of a scanner 3003 is turned on to illuminate the original by moving a scanner unit 3004. Reflected light from the original is directed to an image sensor unit 3009 through mirrors 3005 to 3007 and a lens 3008. The image supplied to the image sensor unit 3009 is processed in response to a signal controlled by a CPU circuit unit 3027 shown in FIG. 41 described later. The processed image is then supplied directly to an exposure controlling unit 3010. Alternatively, the processed image may be stored temporarily in an image memory which is not shown and read again out of it before being supplied to the exposure controlling unit 3010. The exposure controlling unit 3010 converts the image into a photo signal and modifies the photo signal depending on the image signal to illuminate a photosensitive body 3011. During this illumination, a latent image formed on the photosensitive body 3011 is developed by a developer 3012. Matched with the development timing, a transfer paper is conveyed from a untransferred paper mounting unit 3014 or 3015. A toner image developed is transferred in a transferring unit 3016. The transferred toner image is fixed to the transfer paper at a fixing unit 3017 and then discharged through a paper discharging unit 3018 to the outside the apparatus.

Figure 41:
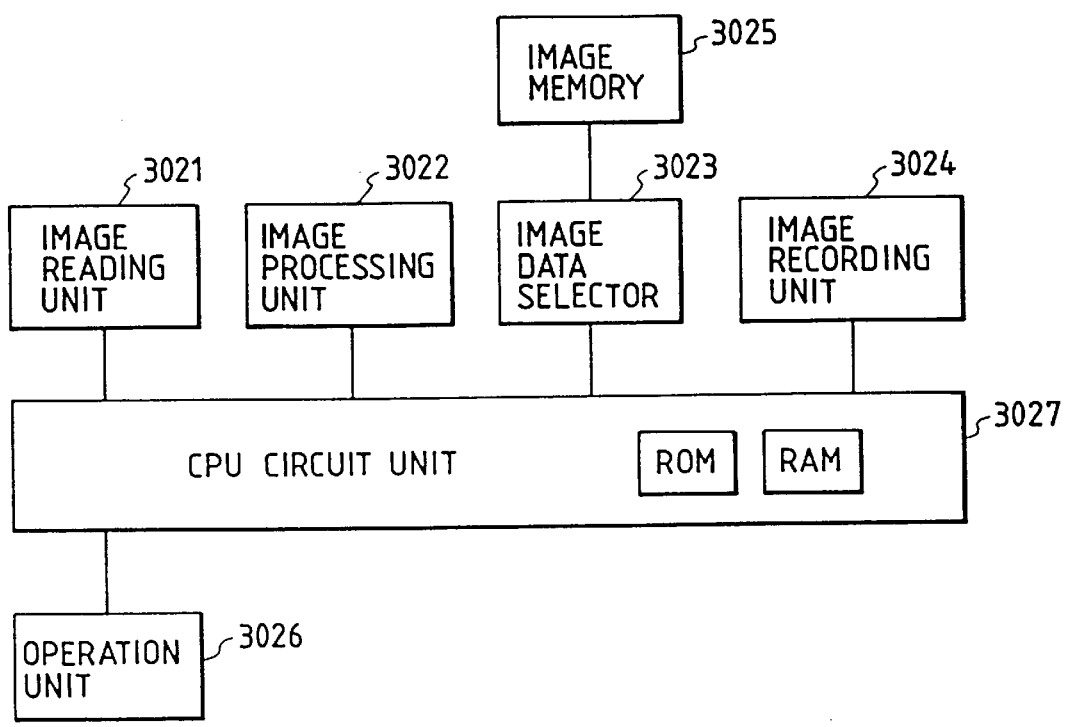
FIG. 41 is a block diagram of a reader unit 1 and a printer unit 2.

FIG. 41 is a block diagram for use in describing a control system of the image forming apparatus shown in FIG. 40. In this figure, an image reading unit 3021 comprises, for example, an optical system for receiving reflected light from the images on the original, a CCD for converting the reflected light from the optical system into an analog signal, and an A/D converter to convert the analog signal supplied from the CCD into a digital signal. The image reading unit 3021 reads an original and sends to an image processing unit 3022.

The image processing unit 3022 comprises, for example, a shading correction circuit, a light-to-density conversion circuit and an image editing circuit for use in magnifying, moving or decorating the image according to instructions made by a user. The image processing unit 3022 corrects and edits the image supplied from the image reading unit 3021. This image is then supplied to an image recording unit 3024 or an image memory unit 3025 for image storage through an image data selector 3023.

The image data selector 3023 comprises, for example, a switching circuit unit and a synthesizing circuit unit. The switching circuit unit serves to switch, in response to an instruction issued by the CPU circuit unit, a path for transmitting the received data to the image recording unit 3024, a path to the image memory 3025 and a path for transmitting the data read out of the image memory 3025 to the image recording unit 3024. The synthesizing circuit unit synthesizes image data supplied from the image processing unit 3022 and the image data read out of the image memory.

The image recording unit 3024 transfers the image to a recording paper in accordance with a density signal of the image data supplied from the image data selector unit 3023.

The image memory unit 3025 stores and reads, in response to instructions given by the CPU circuit unit, the image data supplied from the image data selector unit 3023 at a designated location in the image memory in a manner described later, thereby carrying out rotation processing on the image or synthesizing processing to synthesize the images in the memory.

The CPU circuit unit 3027 controls the entire structure of this apparatus. The CPU circuit unit 3027 comprises the ROM for storing a control program or an error processing program, the RAM used as the workarea for various programs and timer control units.

An operation unit 3026 comprises a group of keys used for indicating the contents of image edition to the image processing unit 3022 or the image forming operation such as the number of the copies, and a display unit for displaying the contents of operation.

Figure 42:
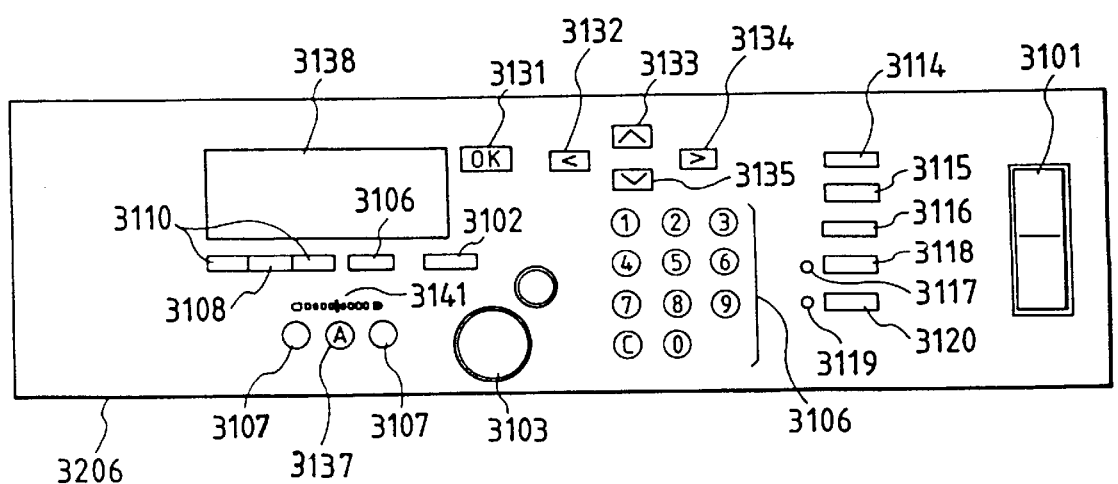
FIG. 42 shows an operation panel of the reader unit 1.

FIG. 42 is a view showing details of the operation unit of the image forming apparatus according to this embodiment. As shown in the figure, the operation panel comprises various keys and a display unit 3138 formed of a dot matrix of, for example, a liquid crystal display unit.

The liquid crystal display unit 3138 displays conditions and status of the apparatus, the number of copies, the magnification, the paper selected and other operation displays. The liquid crystal display unit 3138 is operated through control keys 3131 through 3135 or the like.

A start key 3103 is a key used to start copying operation. A return key 3102 is a key for use in returning a set mode to a normal condition. A key group 3105 comprises ten keys from 0 to 9 for entering the number of copies or a zoom and a clear key for clearing the input thereof. A density key 3107 is a key for heightening or lowering the density. The density adjusted with this key is displayed on the displaying unit 3141. A key 3137 is a key for turning ON and OFF an automatic density adjusting function and a display unit thereof. A key 3106 is a key used for selecting a feeder stage and an automatic paper selection. The status of them is displayed on the liquid crystal display unit 3138.

Keys 3108, and 3110 are keys for setting a equal-magnification and a fixed-size reduction/enlargement, respectively. The set conditions thereof are displayed on the liquid crystal display unit 3138.

A reduced layout key 3120 is for set a copy mode to produce two or more originals being synthesized as a single product. Set procedures are displayed on the liquid crystal display unit 3138 and the display unit 3119.

Figure 43A:
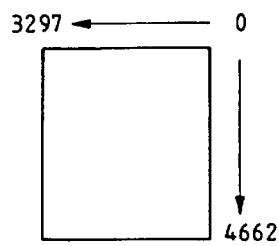
FIGS. 43A to 43E are views for use in describing a method of rotating images.
Figure 43B:
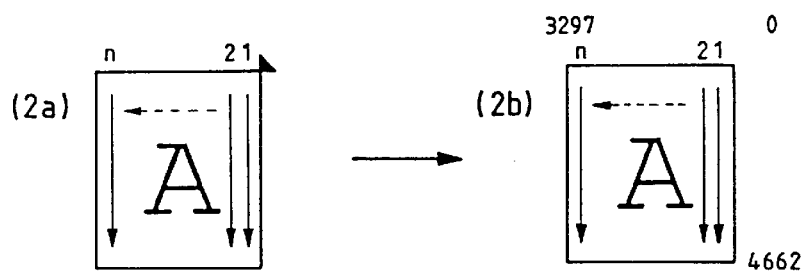
Figure 43C:
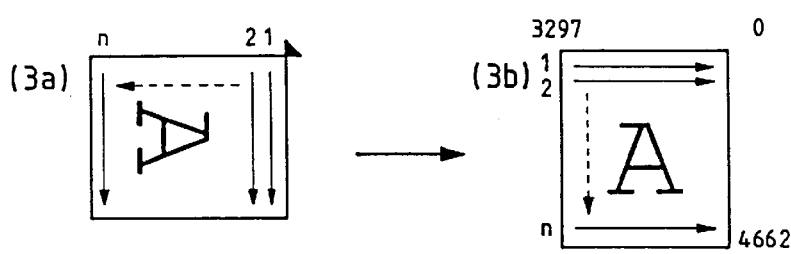

FIGS. 43A to 43E are views for use in illustrating and describing a method of storing and reading the image data in and out of the image memory unit 3025. The size of the image in this embodiment is a memory for the A4 size as shown in FIG. 43A. A (0, 0) address is provided with an upper right corner and the memory has a storing capacity of 4622×3298 bits. Referring to FIGS. 43B and 43C, a method of storing the original image into the image memory 3025 is described.

In FIG. 43B, being illustrated is a case where an A4 original mounted on the original glass platen 3002. The original of which short side is located at the front side as in (2a) is read by means of performing reading in a solid arrow toward a direction depicted by a dotted arrow. When the first line is read by set an X-direction counter in the CPU 3027 be incremented and a Y-direction counter in the same CPU 3027 be incremented with the (0, 0) address used as a start position as shown in (2b). When the first line is read, the Y-counter is incremented and written up to a (0, 4662) address. When the second line is read, the X-direction counter is incremented and written successively from (1, 0) address to the (1, 4662) address. Reading from the original and writing to the memory 3025 are repeated to write up to a (3298, 4662) address.

In FIG. 43C, being illustrated is a case where an A4 original mounted on the original glass platen 3002. The original of which long side is located at the front side as in (3a) is read by means of performing reading in a solid arrow toward a direction depicted by a dotted arrow. When the first line is read by set an X-direction counter in the CPU 3027 be decremented and a Y-direction counter in the same CPU 3027 be incremented with the (3298, 0) address used as a start position as shown in (3b). When the first line is read, the X-counter is decremented and written up in a direction of a (0, 0) address. When the second line is read, the Y-direction counter is incremented and written successively from (3297, 1) address to the (0, 1) address. Reading from the original and writing to the memory 3025 are repeated to write up to a (0, 4662) address.

Figure 43D:
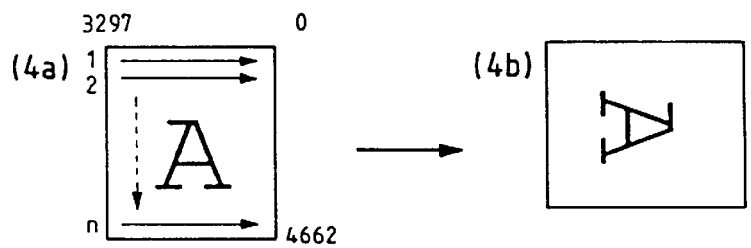
Figure 43E:
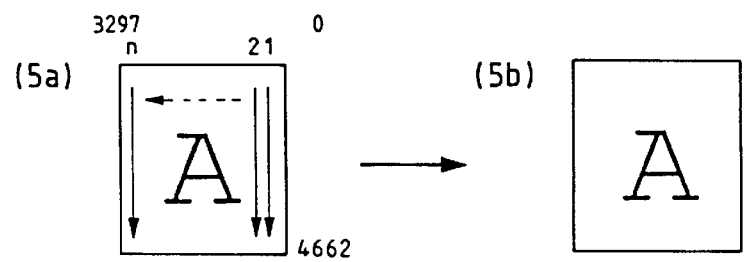

Referring to FIGS. 43D and 43E, described is processing to read the image data written in the memory in the manner shown in FIGS. 43B and 43C.

In FIG. 43D, for the data stored as in (4a), the first line is read with the (3297, 0) address used as the start position the X-direction counter in the CPU 3027 be set to count down and the Y-direction counter in the CPU 3027 be set to count up, to read in the X direction of (0, 0) while successively counting down the X counter. Next, the Y counter is counted up to read the second line from the (3297, 1) address in the (0, 1) direction. The image shown in (4b) can be obtained by means of reading successively in this way.

In FIG. 43E, for the data stored as in (5a), the first line is read with the (0, 0) address used as the start position the X-direction counter in the CPU 3027 be set to count up and the Y-direction counter in the CPU 3027 be set to count up, to read in the Y direction of (0, 4662) while successively counting up the Y counter. Next, the X counter is counted up to read the second line from the (1, 0) address in the (1, 4662) direction. The image shown in (5b) can be obtained by means of reading successively in this way.

Accordingly, the A4 original in the portrait orientation as shown in (2a) is stored in the image memory 3025 in the manner shown in FIG. 43B. To read this image out of the image memory 3025 in the manner shown in FIG. 43D permits rotation of the image. Likewise, the A4 original in the landscape orientation as shown in (3a) is stored in the image memory 3025 in the manner shown in FIG. 43C. To read this image out of the image memory 3025 in the manner shown in FIG. 43E permits rotation of the image.

Processing to set the reduced layout mode is described in conjunction with FIGS. 44A through 44C. When the reduced layout key 3120 is depressed, an original size input display as shown in FIG. 44A is displayed on the liquid crystal display unit 3138. A cursor is moved to an indication corresponding to the desired size by using the control keys 3131 through 3135. The OK key 3131 is then depressed to confirmation and set. After setting, the liquid crystal display unit 3138 displays a screen for setting a type of the layout and the number of the copies as shown in FIG. 44B. A desired layout and the number of copies are set by using the control keys 3131 through 3135. Subsequently, after completion of the setting, the liquid crystal display unit 3138 displays a screen for setting the output paper as shown in FIG. 44C. A desired output paper is set by using the control keys 3131 through 3135. The above mentioned settings are made under control of the CPU circuit unit 3027 and set in the RAM within the CPU circuit unit 3027.

Figure 45:
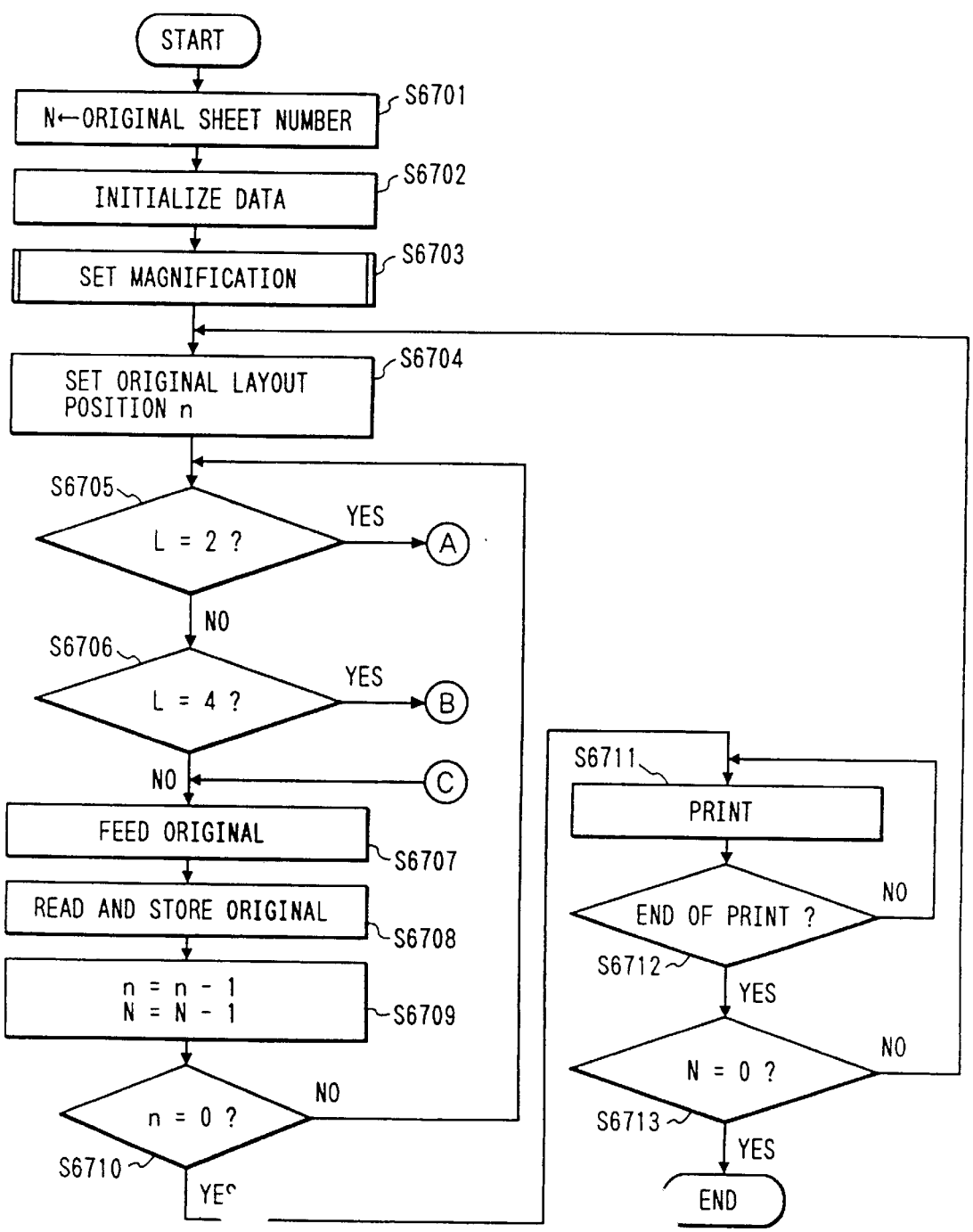
FIG. 45 is a flow chart on a copy when the reduced layout mode is set.

Copying operation during the reduced layout is described with reference to FIG. 45. At step S6701, the number N of the originals is determined. When the number of the originals is set through the operation unit 3026, the set number of the originals is substituted into a variable N. When a mode for setting the number of the originals automatically, the number of the originals is counted by the original feeder 1 and the counted result is substituted into the variable N. Alternatively, a sensor may be provided in the original feeder to determine the size and the orientation of the original during paper feeding.

At step S6702, predetermined data is set according to the above mentioned setting processing. In this event, a layout number (L) of the originals directed to the reduced layout, a transversal length (Px) of the paper, a longitudinal length (Py) of the paper, a longitudinal size of the original (Plong) as well as a transversal size of the original (Pshort) according to Px and Py, a transversal length of the original (Ox) and a longitudinal length of the original (Oy) are substituted.

Figure 46:
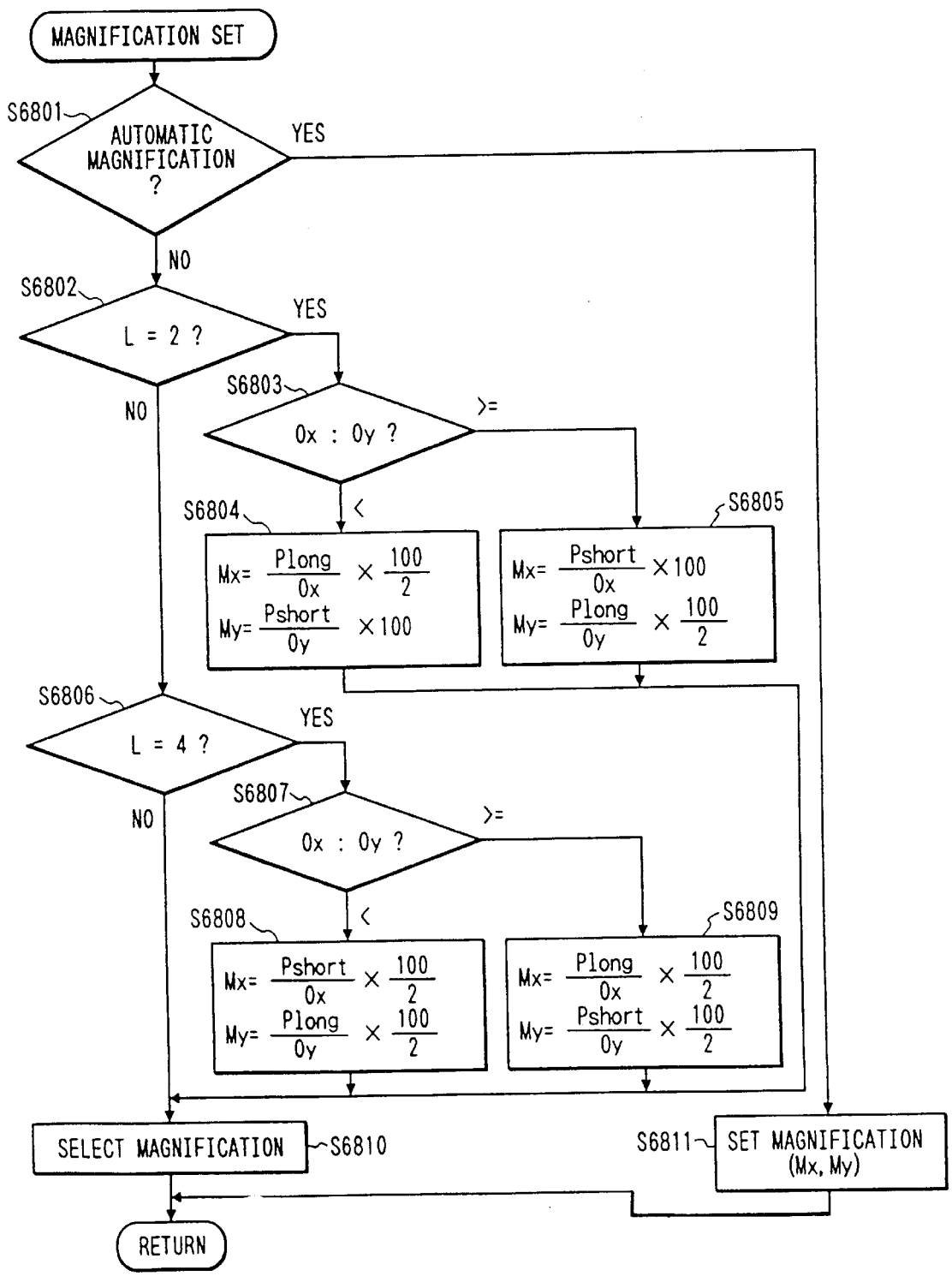
FIG. 46 is a flow chart on a magnification set when the reduced layout mode is set.

At step S6703, setting of a magnification (Mx, My) is described in conjunction with FIG. 46.

At step S6801, it is determined whether an automatic magnification mode is selected. If the automatic magnification mode is selected, step S6802 is carried out. If the automatic magnification mode is not selected, step S6811 is executed. At the step S6811, transversal and longitudinal magnifications set by the operation unit 3026 are supplied to Mx and My, respectively, to end this processing.

At the step S6802, it is determined whether the layout of the reduced layout is 2-layout. If it is the 2-layout, the step S6803 is carried out. On the other hand, if the layout is not the 2-layout, step S6804 is carried out to determine whether the layout is a 4-layout. If this step is affirmative, step S6807 is executed indicating that the layout is the 4-layout.

At the step S6803, longitudinal and transversal lengths of the original, Ox and Oy are compared with each other. If Ox is longer than Oy, i.e., if the original is landscape (FIG. 49B), step S6805 is executed to calculate the transversal magnification Mx and the longitudinal magnification My according to the following equation:

$Mx = (100 \times Pshort)/Ox$, and $My = (100 \times Plong)/(2 \times Oy)$.

When the longitudinal and transversal lengths of the original, Ox and Oy are compared with each other and Ox is longer than Oy, i.e., if the original is landscape (FIG. 49A), step S6804 is executed to calculate the transversal magnification Mx and the longitudinal magnification My according to the following equation:

$$Mx=(100\times Plong)/(2\times Ox), \text{ and}$$

$$My=(100\times Pshort)/Oy.$$

After the transversal and longitudinal magnifications Mx and My are calculated, step S6810 is executed to compare Mx with My. The smaller magnification is selected and terminated.

At step S6807, the longitudinal and transversal sizes of the original, Ox and oy, are compared with each other. If Ox is longer than Oy, i.e., if the original is landscape (FIG. 49D), step S6809 is executed to calculate the transversal magnification Mx and the longitudinal magnification My according to the following equation:

$$Mx=(100\times Plong)/(2\times Ox), \text{ and}$$

$$My=(100\times Pshort)/(2\times Oy).$$

When the longitudinal and transversal lengths of the original, Ox and Oy are compared with each other and Ox is longer than Oy, i.e., if the original is landscape (FIG. 49C), step S6808 is executed to calculate the transversal magnification Mx and the longitudinal magnification My according to the following equation:

$$Mx=(100\times Pshort)/(2\times Ox), \text{ and}$$

$$My=(100\times Plong)/(2\times Oy).$$

After the transversal and longitudinal magnifications Mx and My are calculated, step S6810 is executed to compare Mx with My. The smaller magnification is selected and terminated. After termination, processing is brought back to the step S6704.

At the step S6704, an arrangement position n of the original is calculated according to the number L of the layouts and the variable N. If the variable N divided by the number L of the layouts results in a remainder equal to zero, i.e., when N%L=0, n=L is set. On the other hand, when N%L≠0, n=N%L is set. As a result, the arrangement position as shown in FIG. 50 is obtained. In this event, the symbol % represents an operator to obtain the remainder of division.

At steps S6705 and S6706, the number L of the layouts is compared. If L=2, i.e., the 2-layout is selected, A is executed while B is executed when L=4, i.e., the 4-layout is selected.

Figure 47:
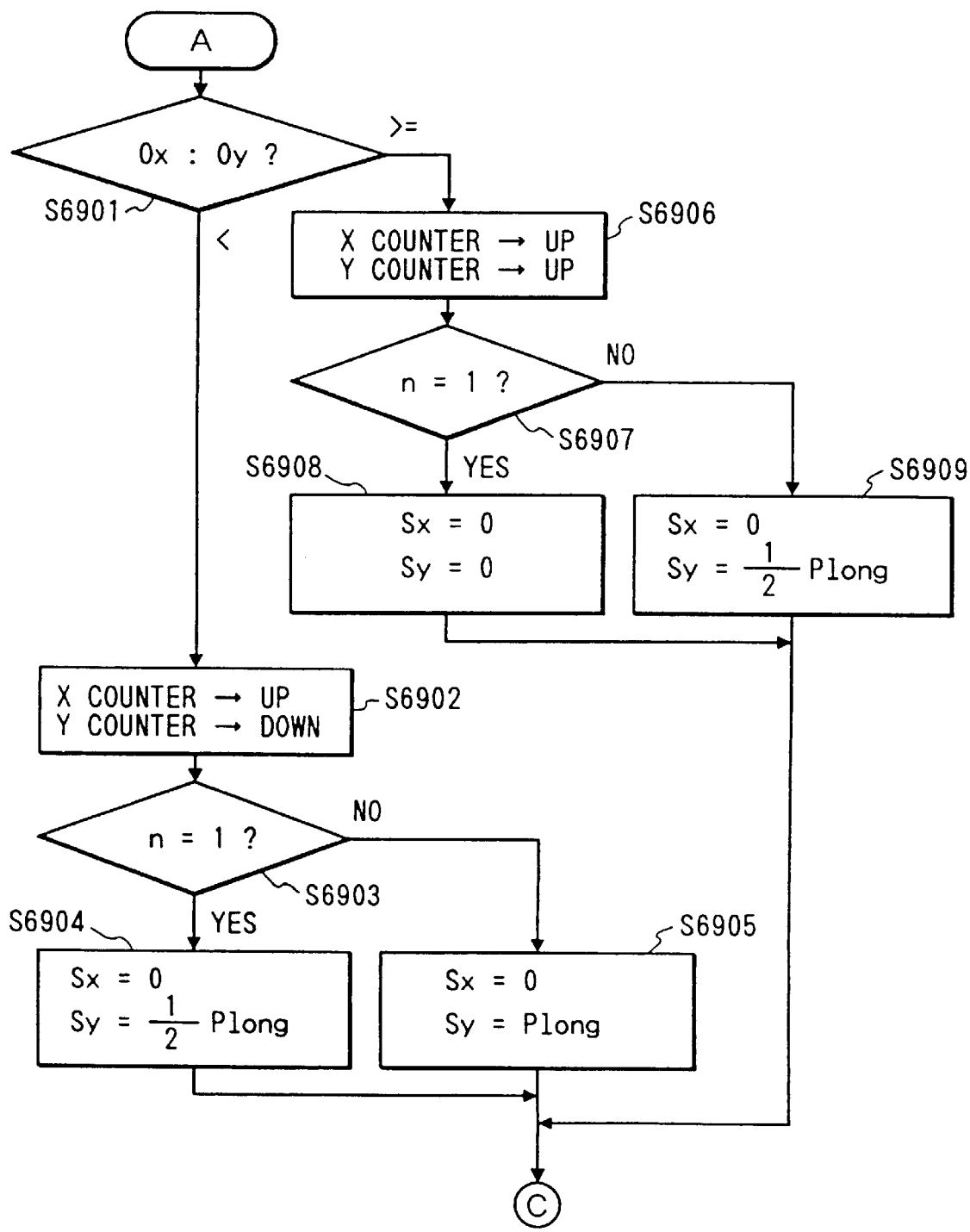
FIG. 47 is a flow chart on a memory writing position set when a 2 in 1 reduced layout mode is set.

Operation for the 2-layout, i.e., a routine A is described with reference to FIG. 47.

Figure 49A:
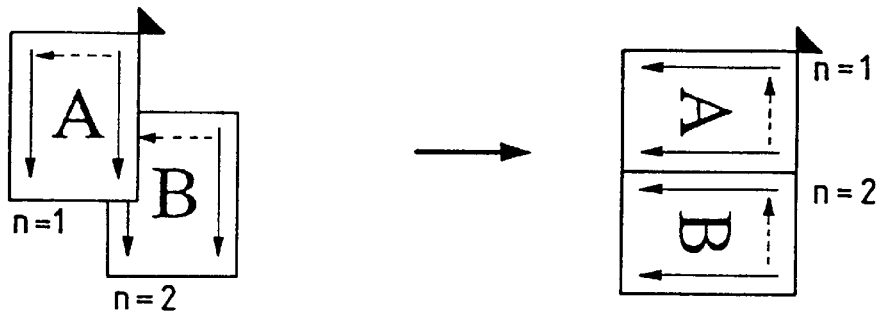
FIGS. 49A to 49D are views for use in describing a method of writing into a memory during the reduced layout.
Figure 49B:
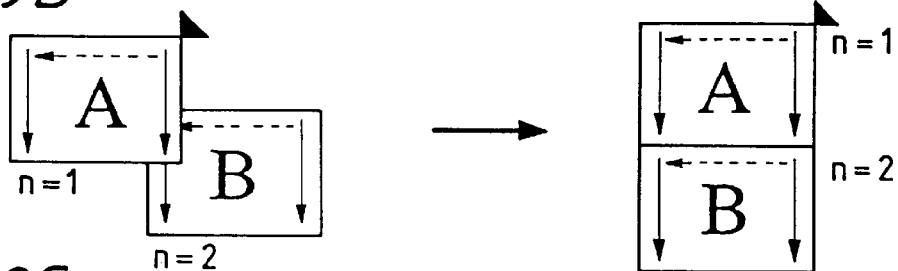

At step S6901, the longitudinal and the transversal lengths Ox and Oy of the original are compared with each other. When Ox is longer than Oy, i.e., when the original is in the landscape orientation as shown in FIG. 49B, step S6906 is executed. If Oy is longer than Ox, i.e., when the original is in the portrait orientation as shown in FIG. 49A, step S6902 is executed.

At the step S6902, it is designated to count up the X counter and to count down the Y counter to designate addresses during writing into the image memory 3025.

At the step S6903, the arrangement position is determined according to the original position n obtained at the step S6704. When n=1, a writing start position of for the image of "A" of n=1 in FIG. 49A is designated at the step S6904 according to Sx=0, Sy=½ Plong. When n=2, a writing start position of for the image of "B" of n=2 in FIG. 49A is designated at the step S6905 according to Sx=0, Sy=Plong.

At the step S6906, it is designated to count up the X counter and to count up the Y counter to designate addresses during writing into the image memory 3025.

At the step S6907, the arrangement position is determined according to the original position n obtained at the step S6704. When n=1, a writing start position of the image of "A" of n=1 in FIG. 49B is designated at the step S6908 according to Sx=0, Sy=0. When n=2, a writing start position of the image of "B" of n=2 in FIG. 49B is designated at the step S6909 according to Sx=0, Sy=½ Plong.

Then, step S707 is carried out.

Figure 48:
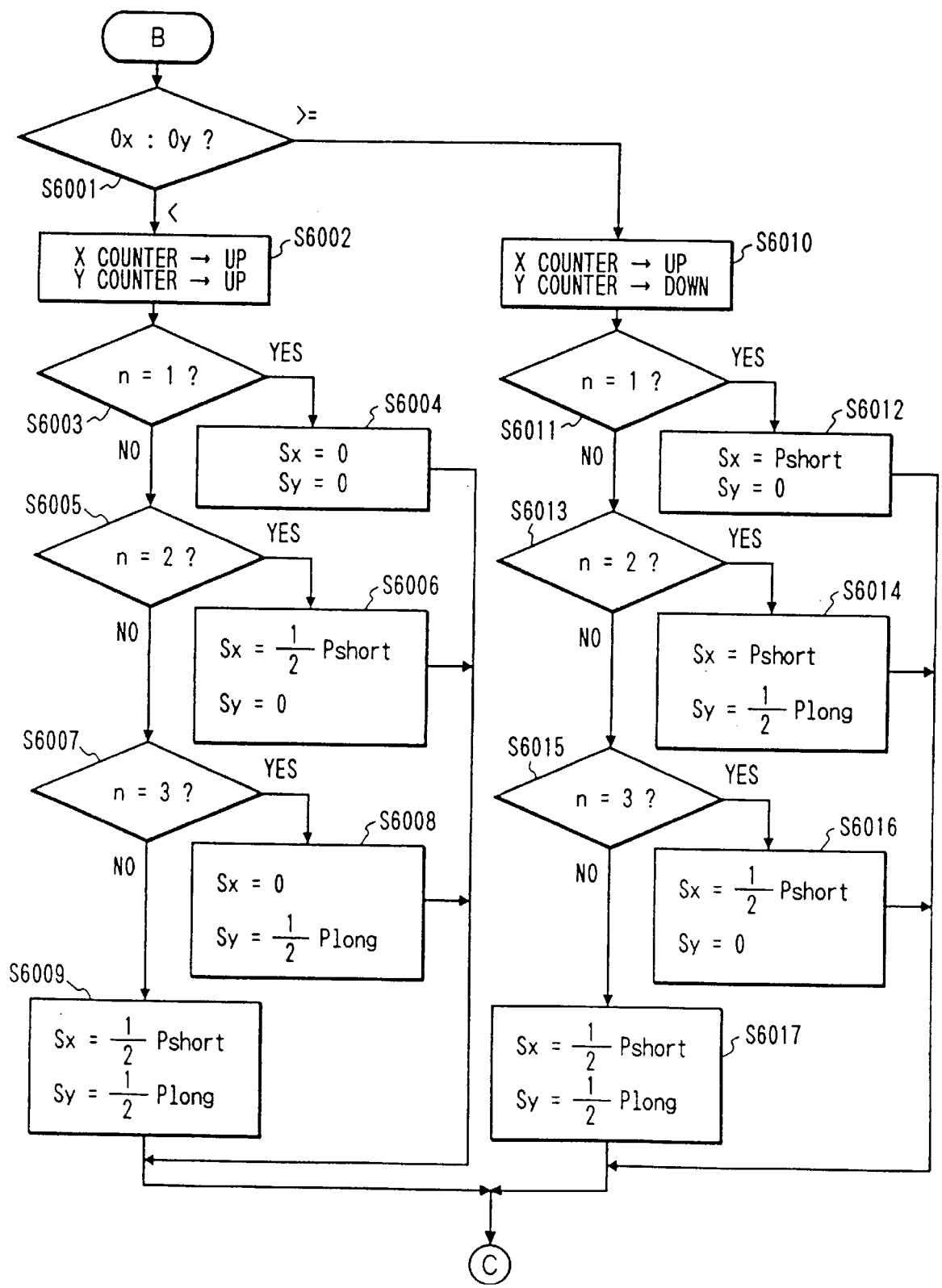
FIG. 48 is a flow chart on a memory writing position set when a 4 in 1 reduced layout mode is set.

Operation for the 4-layout, i.e., a routine B is described with reference to FIG. 48.

Figure 49C:
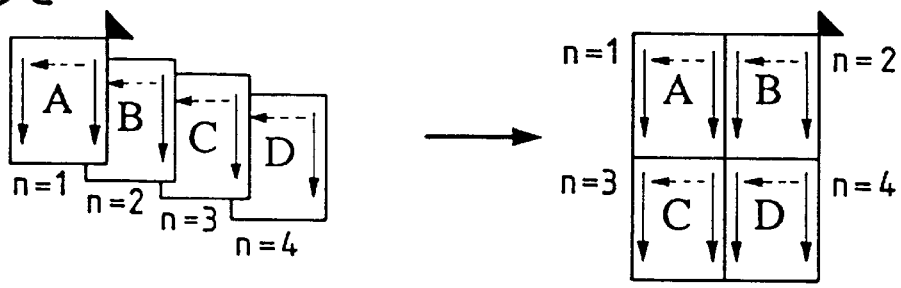

At step S6001, the longitudinal and the transversal lengths Ox and Oy of the original are compared with each other. When Ox is longer than Oy, i.e., when the original is in the landscape orientation as shown in left-hand side of FIG. 49D, step S6010 is executed. If Oy is longer than Ox, i.e., when the original is in the portrait orientation as shown in FIG. 49C, step S6002 is executed.

At the step S6002, it is designated to count up the X counter and to count up the Y counter to designate addresses during writing into the image memory 3025.

At the step S6003, the arrangement position is determined according to the original position n obtained at the step S6704. When n=1, a writing start position of the image of "A" of n=1 in FIG. 49C is designated at the step S6004 according to Sx=0, Sy=0. Then, the control passes to step S6707. If n=1 does not hold, step S6005 is executed.

At the step S6005, the arrangement position is determined according to the original position n obtained at the step S6704. When n=2, a writing start position of for the image of "B" of n=2 in FIG. 49C is designated at the step S6006 according to Sx=½ Pshort, Sy=0. Then, the control passes to the step S6707. If n=2 does not hold, step S6007 is executed.

At the step S6007, the arrangement position is determined according to the original position n obtained at the step S6704. When n=3, a writing start position of the image of "C" of n=3 in FIG. 49C is designated at the step S6006 according to Sx=0, Sy=½ Plong. Then, the control passes to the step S6707. If n=3 does not hold, step S6009 is executed.

At the step S6009, a writing start position of for the image of "D" of n=4 in FIG. 49C is designated according to Sx=½ Pshort, Sy=½ Plong. Then, the control passes to the step S6707.

At step S6010, it is designated to count up the X counter and to count down the Y counter to designate addresses during writing into the image memory 3025.

Figure 49D:
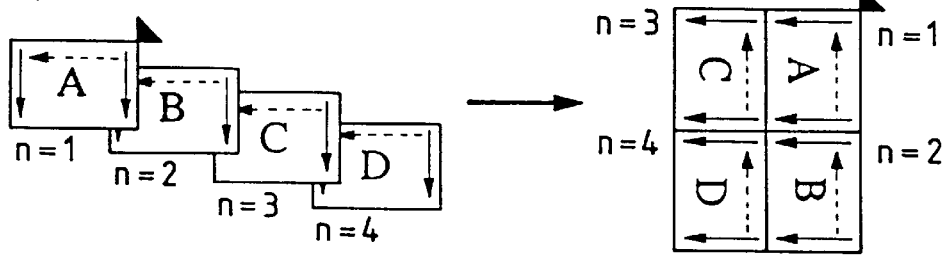
Figure 51A:
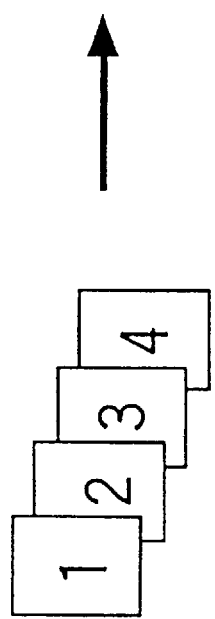
FIGS. 51A and 51B are views showing conventional examples.
Figure 51B:
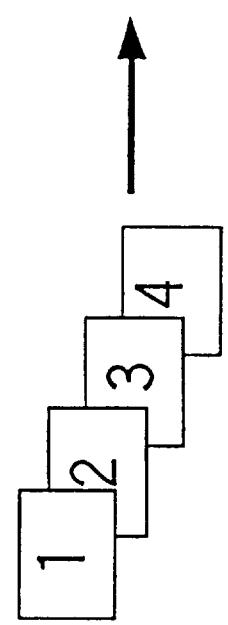

At step S6011, the arrangement position is determined according to the original position n obtained at the step S6704. When n=1, a writing start position of the image of "A" of n=1 in FIG. 49D is designated at the step S6004 according to Sx=Pshort, Sy=0. Then, the control passes to step S6707. If n=1 does not hold, step S6013 is executed.

At the step S6013, the arrangement position is determined according to the original position n obtained at the step S6704. When n=2, a writing start position of the image of "B" of n=2 in FIG. 49D is designated at the step S6014 according to Sx=½ Pshort, Sy=½ Plong. Then, the control passes to the step S6707. If n=2 does not hold, step S6015 is executed.

At the step S6015, the arrangement position is determined according to the original position n obtained at the step S6704. When n=3, a writing start position of for the image of "C" of n=3 in FIG. 49D is designated at the step S6016 according to Sx=½ Pshort, Sy=0. Then, the control passes to the step S6707. If n=3 does not hold, step S6017 is executed.

At the step S6017, a writing start position of for the image of "D" of n=4 in FIG. 49C is designated according to Sx=½ Pshort, Sy=½ Plong. Then, the control passes to the step S6707.

At the step S6707, the originals mounted on the automatic original feeder 1 are fed one by one to the original platen 3002. Subsequently, at step S6708, the original images are read and stored in the image memory unit 3025 according to the contents designated through the operation unit 3026, the magnification, the writing start address of the image memory 3025 set during the above mentioned processing.

At step S6709, the variable N of the original and the original arrangement position n are calculated according to n=n−1 and N=N−1. Subsequently, at step S6710, it is determined whether the original arrangement position n is equal to zero, i.e., n=0. If it is not equal to zero, the above mentioned processing at steps S6705 through S6709 is repeated. On the other hand, if n is equal to one, i.e., n=0, the image stored in the image memory 3025 is printed at step S6711. The image stored in the image memory 3025 is read out of it with or without rotation thereof as shown in FIGS. 43D and 43E depending on the orientation of the output paper or the like. Then, exposure and development are performed to transfer and fix the images on the transfer paper. Subsequently, at step S6712, it is determined whether the number of the printed copies is equal to the number designated through the operation unit 3026. If the designated number is not reached yet, the printing operation at the step S6711 is repeated. On the other hand, if the designated number is reached, step S6713 is executed to determine whether the variable N of the original is equal to zero, i.e., N=0. If it is not equal to zero, the above mentioned processing at steps S6704 through S6712 is repeated. On the other hand, if the variable is equal to zero indicating that all copies are completed, the processing ends.

FIG. 50 is a view showing the printed products obtained through the process described above.

In this way, it is possible to control the arrangement of the originals by means of changing the arrangement and orientation thereof depending on the orientation of the original as well as the type of the layout in which two or more originals are produced on a single sheet of paper.

It should be understood that the present invention is not limited to the particular embodiment shown and described above, and various changes and modifications may be made without departing from the spirit and scope of the appended claims.

What is claimed is:

1. A copying machine comprising:

original feeding means for feeding an original to a platen;

reading means for reading an image of the original fed by said original feeding means;

reducing means for reducing the image supplied from said reading means;

storing means for storing a plurality of images supplied from said reducing means in a predetermined area;

input means for entering information regarding an orientation of the images of the originals;

control means for changing an area where an image is to be stored by said storing means depending on the information regarding the orientation supplied from said input means; and recording means for recording said plurality of images stored in said storing means on a single sheet, wherein said recording means records images of four originals on a single sheet, and wherein said control means carries out control to record, when receiving from said input means that an image is present on a landscape original, pages in such a manner that the first page is located at the upper right, the second page is located at the lower right, the third page is located at the upper left and the fourth page is located at the lower left.

2. A copying machine according to claim 1, wherein said control means carries out control to record, when receiving from said input means that an image is present on a portrait original, pages in such a manner that the first page is located at the upper left, the second page is located at the upper right, the third page is located at the lower left and the fourth page is located at the lower right.

3. A copying machine comprising:

original feeding means for feeding an original to a platen;

reading means for reading an image of the original fed by said original feeding means;

reducing means for reducing the image supplied from said reading means;

storing means for storing a plurality of images supplied from said reducing means in a predetermined area;

detecting means for detecting orientation of the original fed by said original feeding means;

control means for changing an area where the image is to be stored by said storing means depending on the information regarding the orientation supplied from said detecting means; and recording means for recording the plurality of images stored in said storing means on a single sheet, wherein said recording means records images of four originals on a single sheet, and wherein said control means carries out control to record, when said detecting means detects that the original is a landscape original, pages in such a manner that the first page is located at the upper right, the second page is located at the lower right, the third page is located at the upper left and the fourth page is located at the lower left.

4. A copying machine according to claim 3, wherein said control means carries out control to record, when said detecting means detects that the original is a portrait original, pages in such a manner that the first page is located at the upper left, the second page is located at the upper right, the third page is located at the lower left and the fourth page is located at the lower right.

5. A copying machine comprising:

reading means for reading an image of the original;

storing means for storing a plurality of images supplied from said reading means in a predetermined area;

input means for entering information regarding an orientation of the original;

control means for changing an area where the image is to be stored by said storing means depending on the information regarding the orientation supplied from said input means; and recording means for recording the plurality of images stored in said storing means on a single sheet, wherein said recording means records images of four originals on a single sheet, and wherein said control means carries out control to record, when receiving from said input means that the original is a landscape original, pages in such a manner that the first page is located at the upper right, the second page is located at the lower right, the third page is located at the upper left and the fourth page is located at the lower left.

6. A copying machine according to claim 5, wherein said control means carries out control to record, when receiving from said input means that the original is a portrait original, pages in such a manner that the first page is located at the upper left, the second page is located at the upper right, the third page is located at the lower left and the fourth page is located at the lower right.

7. An image processing apparatus having an image memory for storing image information read from an original comprising:

memory control means for storing, in storing the image information of a plurality of originals in the image memory, the image information in a memory area suitable for a size of an output paper; and magnification means for reducing and enlarging the original, said magnification means magnifying the original when the image information read from the original is stored in the image memory, wherein said magnification means stores the original in a different magnification for each original when the image information read from the original is stored in the image memory.

8. An image processing apparatus according to claim 7 further comprising:

rotating means for rotating the images for storage when the image information read from the original is stored in the image memory.

9. An image processing apparatus according to claim 7 further comprising:

rotating means for rotating the images for output when the image information stored in the image memory is produced.

10. An image processing apparatus according to claim 7 further comprising:

output paper selecting means for allowing a user to select the output paper.

11. An image processing apparatus according to claim 7, wherein the original is mounted on a platen and the image information is read through an optical image pick-up device.

12. An image forming apparatus comprising:

first input means for inputting a plurality of pages of images;

second input means for inputting an indication as to whether each of the plurality of pages of images input by said first input means is of a portrait-type or of a landscape-type; and layout means for performing layout processes to arrange the plurality of pages of images, input by said first input means, onto a sheet;

wherein said layout means selects and executes a layout process to arrange the pages in a horizontal direction of the sheet or a layout process to arrange the pages in a vertical direction of the sheet, in response to the indication input by said second input means.

13. An image forming apparatus according to claim 16, wherein said layout means lays out images in an order of upper left, upper right, lower left, and lower right starting with a first page when the information inputted by said second input means is indicative of being vertically oriented.

14. An image forming apparatus according to claim 16, wherein said layout means lays out images in an order of upper right, lower right, upper left, and lower left starting with a first page.

15. An image forming apparatus according to claim 16, wherein said first input means reads an image of an original.

16. An image forming method comprising the steps of:

a first step of inputting a plurality of pages of images;

a second step of inputting confirmation indicating whether each of the plurality of pages of images input by said first input step is a portrait-type or a landscape-type;

a storing step of storing the plurality of pages of images;

a layout step of writing the plurality of pages of images input by said first input step in a layout in accordance with the confirmation input by said second input step, said layout step rendering arrangement of the images of the portrait-type different from arrangement of the images of the landscape-type; and a recording step of recording the plurality of pages of images written in said storing step on one sheet.

17. An image forming method according to claim 16, wherein said writing step orients images in an order of upper left, upper right, lower left, and lower right starting with a first page when the information inputted by said second input step is indicative of being vertically long.

18. An image forming method according to claim 16, wherein said writing step orients images in an order of upper right, lower right, upper left, and lower left starting with a first page.

19. An image forming method according to claim 16, wherein said first inputting step reads an image of an original.

20. An image processing apparatus comprising:

input means for inputting a plurality of pages of images;

detection means for detecting whether each of the plurality of pages of images input by said input means is of a portrait-type or of a landscape-type; and layout means for performing layout processes to arrange the plurality of pages of images, input by said first input means, onto a sheet, wherein said layout means selects and executes either a layout process to arrange the pages in a horizontal direction of the sheet or a layout process to arrange the pages in a vertical direction of the sheet, in response to a detection result of said detection means.

21. An image forming apparatus according to claim 20, wherein said layout means lays out images in an order of upper left, upper right, lower left, and lower right starting with a first page when the information inputted by said second input means is indicative of being vertically oriented.

22. An image forming apparatus according to claim 20, wherein said layout means lays out images in an order of upper right, lower right, upper left, and lower left starting with a first page.

23. An image forming apparatus according to claim 20, wherein said first input means reads an image of an original.

24. A copying machine comprising the steps of:

reading an image of an original;

storing a plurality of images supplied in said reading step in a predetermined area;

entering information regarding an orientation of the original;

changing the area where the image is to be stored depending on the information regarding the orientation; and recording a plurality of stored images on a single sheet, wherein said recording step records images of four originals on a single sheet, and wherein said control step carries out control to record, in response to information that the original is a landscape original, pages in such a manner that the first page is located at the upper right, the second page is located at the lower right, the third page is located at the upper left and the fourth page is located at the lower left.

25. An image processing method for storing image information read from an original, the method comprising the steps of:

memory control step for storing image information of a plurality of originals in a memory area suitable for a size of an output paper; and magnification step for use in reducing and enlarging an original, said magnification step magnifying the original when the image information read from the original is stored in the image memory, wherein said magnification step stores the originals in a different magnification for each original when the image information read from the original is stored in the image memory.

26. An image processing method according to claim 25, further comprising a step of rotating the images for storage when the image information read from the original is stored in the image memory.

27. An image processing method according to claim 25, further comprising a step of rotating the images for output when the image information stored in the image memory is produced.

28. An image processing method according to claim 25, further comprising an output paper selecting step for allowing a user to select the output paper.

29. An image forming method comprising the steps of:

first input step for inputting a plurality of pages of images in a predetermined order;

second input step for inputting an indication as to whether the input image input by said first input step is oriented vertically or horizontally;

storing step for storing the plurality of pages of images;

layout step for performing layout processes to arrange the plurality of pages of images, input by said first input step, onto a sheet; and recording step for recording the plurality of pages of images written in said storing step on one sheet, wherein said layout step selects and executes a layout process to arrange the pages in a horizontal direction of the sheet or a layout process to arrange the pages in a vertical direction of the sheet, in response to the indication input by said second input means.

30. An image forming method according to claim 29, wherein said layout step lays out images in an order of upper left, upper right, lower left, and lower right starting with a first page when the information inputted by said second input step is indicative of being vertically oriented.

31. An image forming method according to claim 29, wherein said layout step lays out images in an order of upper right, lower right, upper left, and lower left starting with a first page.

32. An image forming method according to claim 29, wherein said first input step reads an image of an original.

33. An image processing method comprising the steps of:

inputting a plurality of pages of images;

detecting whether each of the plurality of pages of images input by said input step is of a portrait-type or of a landscape-type; and a layout step for performing layout processes to layout on a sheet the input plurality of pages of images;

wherein said layout step selects and executes either a layout process to arrange the pages in a horizontal direction of the sheet or a layout process to arrange the pages in a vertical direction of the sheet, in response to a detection result of said detection step.

34. An image forming method according to claim 33, wherein said layout means lays out images in an order of upper left, upper right, lower left, and lower right starting with a first page when the information inputted by said second input step is indicative of being vertically oriented.

35. An image forming method according to claim 33, wherein said layout step lays out images in an order of upper right, lower right, upper left, and lower left starting with a first page.

36. An image forming method according to claim 33, wherein said first input step reads an image of an original.

* * * * *

UNITED STATES PATENT AND TRADEMARK OFFICE
CERTIFICATE OF CORRECTION

PATENT NO. : 5,867,279

DATED : February 2, 1999

INVENTORS : YOSHIHIRO FUNAMIZU, et al.

It is certified that error appears in the above-identified patent and that said Letters Patent is hereby corrected as shown below:

COLUMN 1

Line 20, "unable" should read --are unable--.

COLUMN 4

Line 2, "an" should read --a--.

COLUMN 8

Line 59, "hold" should read --held--.

COLUMN 13

Line 17, "With" should read --In--; and
   Line 26, "read with being" should be deleted.

COLUMN 14

Line 36, "4752th" should read --4752nd--;
   Line 42, "4752th" should read --4752nd--;
   Line 46, "4751th" should read --4751st--; and
   Line 47, "4752th" should read --4752nd--.

COLUMN 16

Line 1, "is" should read --are--; and
   Line 60, "1653th" should read --1653rd--.

UNITED STATES PATENT AND TRADEMARK OFFICE
CERTIFICATE OF CORRECTION

PATENT NO. : 5,867,279

DATED : February 2, 1999

INVENTORS : YOSHIHIRO FUNAMIZU, et al.

It is certified that error appears in the above-identified patent and that said Letters Patent is hereby corrected as shown below:

COLUMN 17

Line 60, "4693th" should read --4693rd--;

COLUMN 18

Line 2, "4693th" should read --4693rd--; and
   Line 36, "is" should read --are--.

COLUMN 19

Line 24, "they are" should read --it is--; and
   Line 31, "is" should read --are--.

COLUMN 20

Line 1, "t he i m age" should read --the image--;
   Line 10, "the e" should read --the--; and
   Line 29, "workarea" should read --work area--.

COLUMN 21

Line 9, "original" should read --original is--;
   Line 13, "read by set" should be deleted; and
   Line 28, "read by set" should be deleted.

COLUMN 24

Line 28, "of" should be deleted; and
   Line 60, "of" should be deleted.

UNITED STATES PATENT AND TRADEMARK OFFICE
CERTIFICATE OF CORRECTION

PATENT NO. : 5,867,279
DATED : February 2, 1999
INVENTORS : YOSHIHIRO FUNAMIZU, et al.

It is certified that error appears in the above-identified patent and that said Letters Patent is hereby corrected as shown below:

COLUMN 27

Line 19, "claim 7" should read --claim 7,--;
Line 24, "claim 7" should read --claim 7,--;
Line 29, "claim 7" should read --claim 7,--;
Line 52, "claim 16," should read --claim 12,--;

Line 56, "claim 16," should read --claim 12,--;
Line 60, "claim 16," should read --claim 12,--; and

COLUMN 30

Line 19, "layout" (third occurrence) should read --lay out--.

Signed and Sealed this

Twenty-third Day of November, 1999

Attest:

Q. TODD DICKINSON

*Attesting Officer*   *Acting Commissioner of Patents and Trademarks*